United States Patent [19]

Bucci et al.

[11] Patent Number: 5,647,329

[45] Date of Patent: Jul. 15, 1997

[54] IN-TANK FUEL PUMP AND RESERVOIR

[75] Inventors: George H. Bucci, South Windsor, Conn.; Kirk D. Fournier, Essexville, Mich.; Daniel A. Gilmour, West Hartford, Conn.; Wayne T. Lipinski, Essexville, Mich.; David E. Mroczka, Cromwell, Conn.; Charles H. Tuckey, Cass City, Mich.

[73] Assignee: Walbro Corporation, Cass City, Mich.

[21] Appl. No.: 643,634

[22] Filed: May 6, 1996

Related U.S. Application Data

[63] Continuation-in-part of Ser. No. 602,087, Feb. 15, 1996, which is a continuation-in-part of Ser. No. 587,852, Jan. 11, 1996, abandoned, which is a continuation-in-part of Ser. No. 496,950, Jun. 30, 1995, abandoned.

[51] Int. Cl.$^6$ ........................... F02M 37/04
[52] U.S. Cl. ........................... 123/509; 137/576
[58] Field of Search ........................... 123/509, 510, 123/511, 514; 137/571, 574, 575, 576

[56] References Cited

U.S. PATENT DOCUMENTS

| | | | |
|---|---|---|---|
| 4,546,750 | 10/1985 | Brunell et al. | 123/509 |
| 4,697,995 | 10/1987 | Tuckey | 418/15 |
| 4,747,388 | 5/1988 | Tuckey | 123/514 |
| 4,807,582 | 2/1989 | Tuckey | 123/514 |
| 4,831,990 | 5/1989 | Tuckey | 123/514 |
| 4,869,225 | 9/1989 | Nagata et al. | 123/509 |
| 4,878,816 | 11/1989 | Tuckey | 137/576 |
| 4,893,647 | 1/1990 | Tuckey | 123/576 |
| 4,919,103 | 4/1990 | Ishiguro et al. | 123/509 |
| 4,964,787 | 10/1990 | Hoover | 417/363 |
| 5,170,764 | 12/1992 | Tuckey | 123/509 |
| 5,220,941 | 6/1993 | Tuckey | 137/510 |
| 5,237,977 | 8/1993 | Tuckey | 123/510 |
| 5,257,916 | 11/1993 | Tuckey | 417/423.1 |
| 5,263,458 | 11/1993 | Fujino et al. | 137/574 |
| 5,289,810 | 3/1994 | Bauer et al. | 137/576 |
| 5,341,842 | 8/1994 | Chih et al. | 138/576 |
| 5,398,655 | 3/1995 | Tuckey | 123/456 |
| 5,415,146 | 5/1995 | Tuckey | 123/509 |
| 5,431,143 | 7/1995 | Brown | 137/576 |
| 5,560,342 | 10/1996 | Fournier et al. | 123/509 |

*Primary Examiner*—Thomas N. Moulis
*Attorney, Agent, or Firm*—Barnes, Kisselle, Raisch, Choate, Whittemore & Hulbert

[57] ABSTRACT

An in-tank fuel pump and reservoir canister module having a fuel filter mounted in the module base adjacent the bottom of the tank and defining a filter chamber having an outlet connected to the inlet of an electric fuel pump received directly in the tank exteriorly alongside of an upright overflow-type reserve fuel canister. A canister bottom outlet is closed by a flow controlling valve and/or by an always-open restricted orifice communicating with the filter chamber for returning engine bypassed reserve fuel from the canister reservoir to the pump inlet, either continuously and/or only when a low level supply of fuel in the tank to the filter is interrupted. The valve is operated by a diaphragm portion of the filter, base-mounted between the canister outlet and filter chamber and also communicating directly with the tank, the valve opening against the bias of a coil spring in response to pump suction acting on a capillary seal formed on the diaphragm filter to thereby allow reserve fuel to flow into the filter chamber. At system shut-down a filter backwash flow can occur from the canister reservoir. The pump rotary vane impeller chamber has an internal vapor purging passageway communicating at its outlet directly with the interior of the tank so as not to be subjected to any anti-purging gravity pressure head differential existing between the fuel level in the canister reservoir versus that of the main body of fuel in the tank.

120 Claims, 17 Drawing Sheets

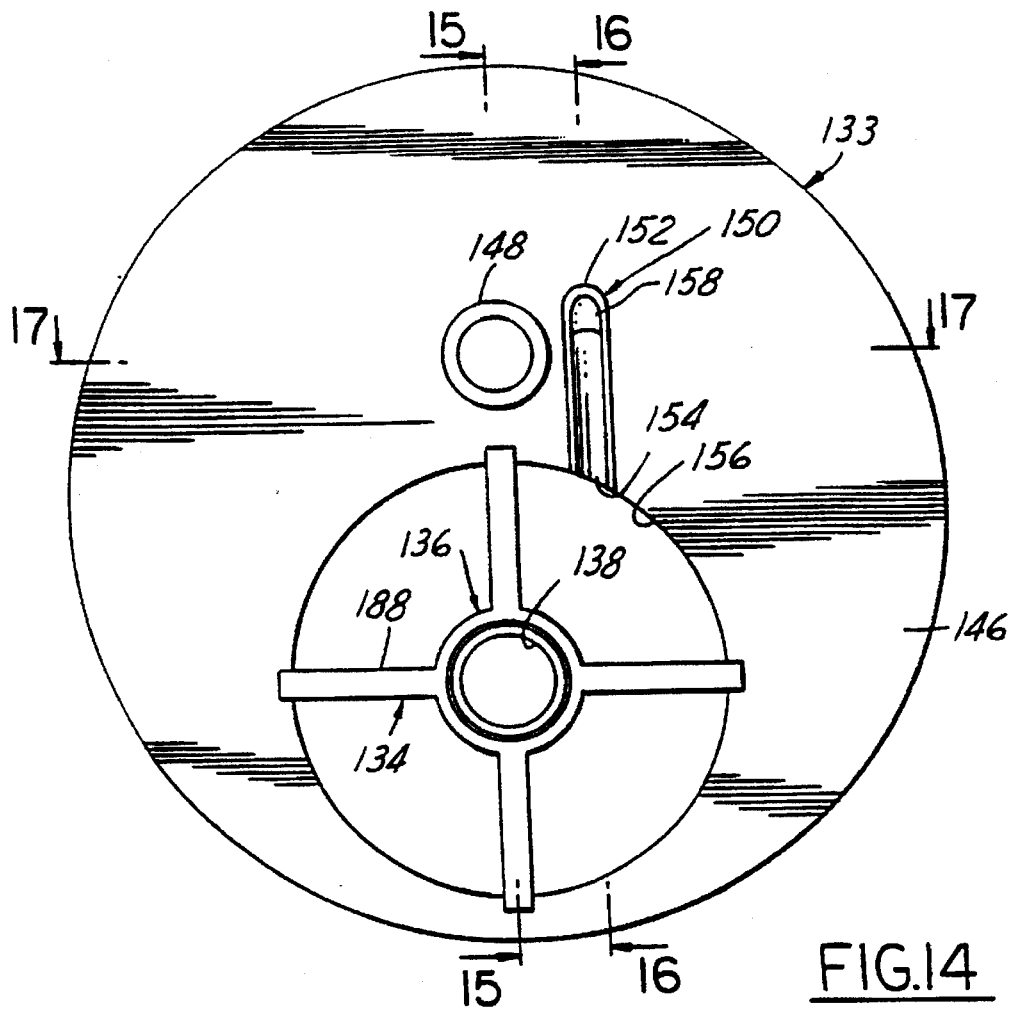
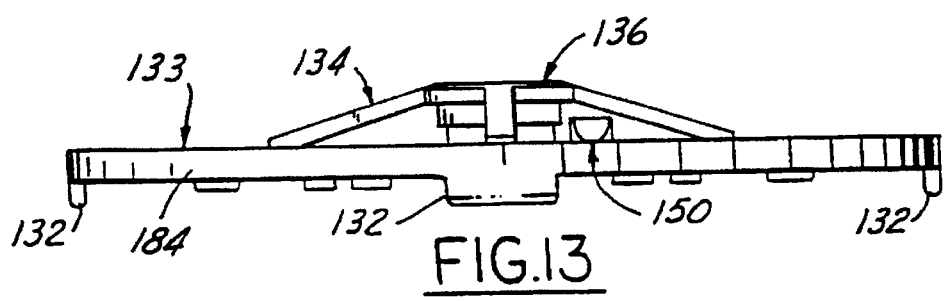
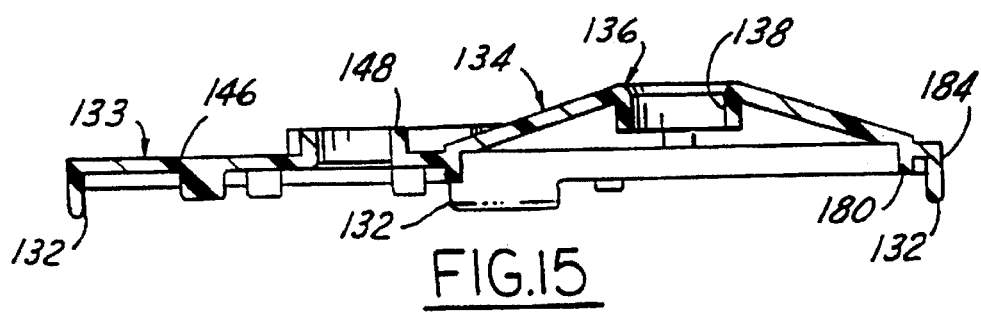

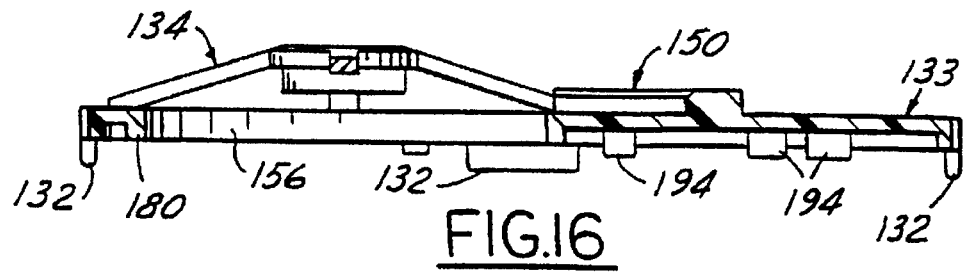
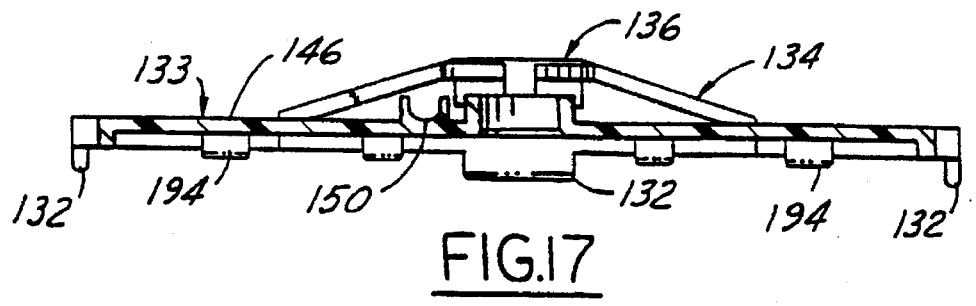
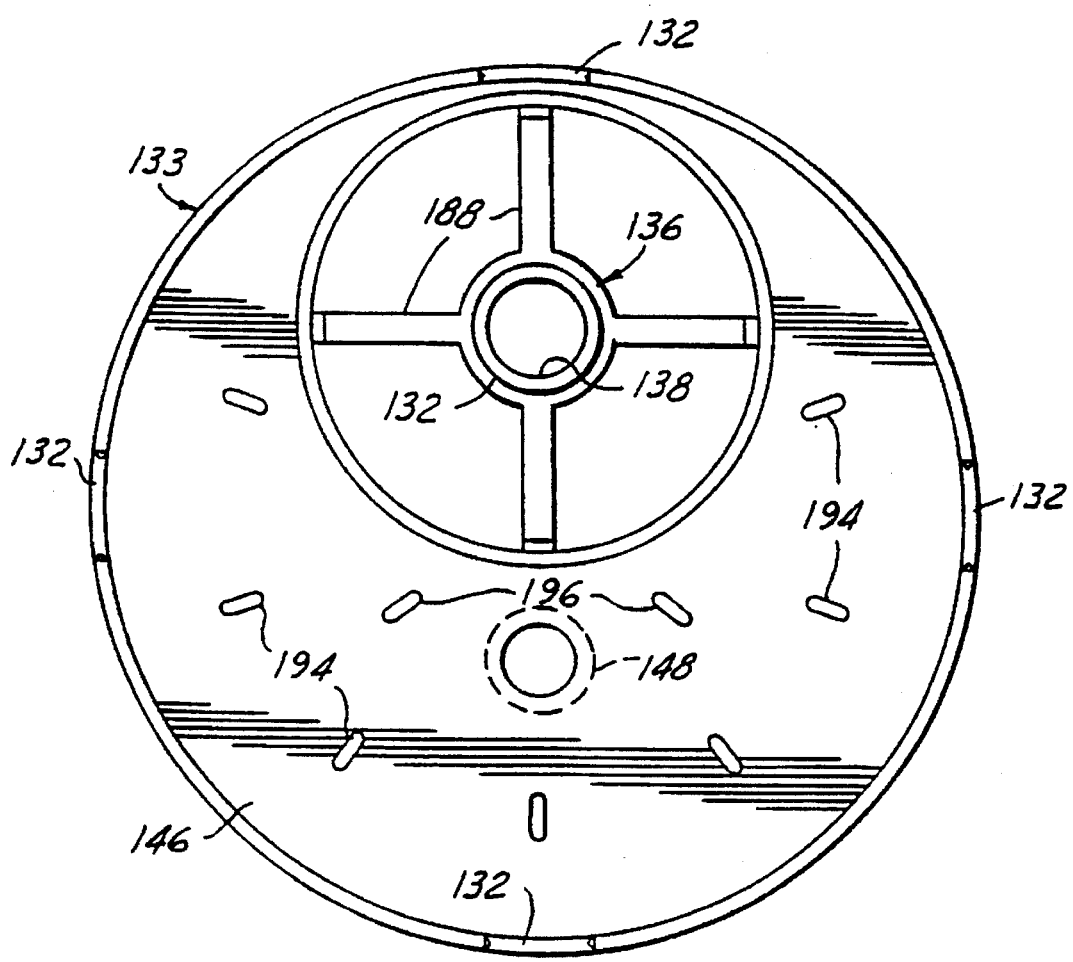

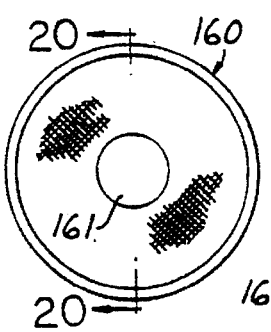 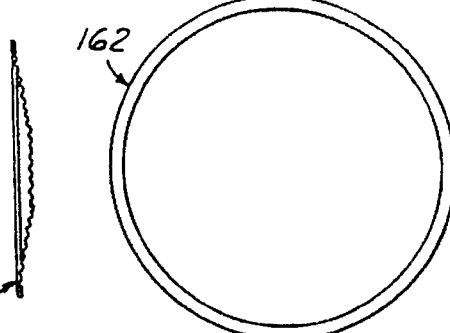 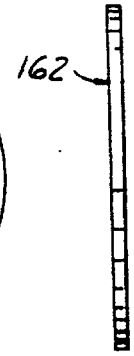
FIG.19　　FIG.20　　FIG.21　　FIG.22
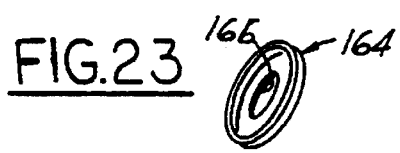
FIG.23
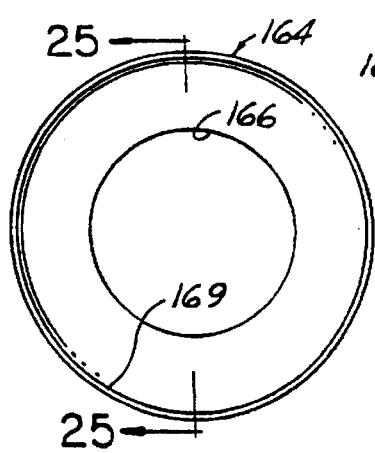 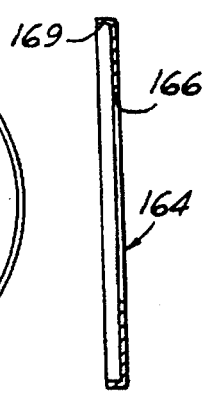 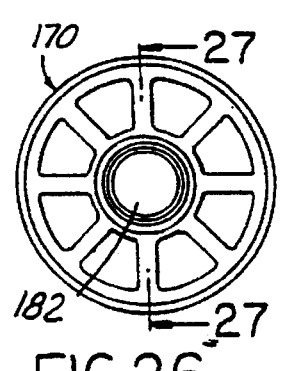 
FIG.24　　FIG.25　　FIG.26　　FIG.27
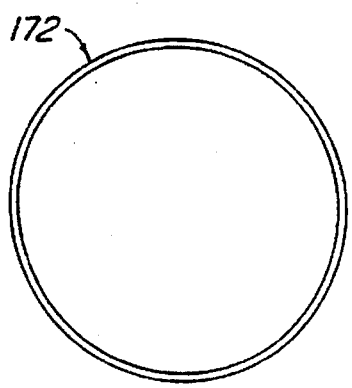  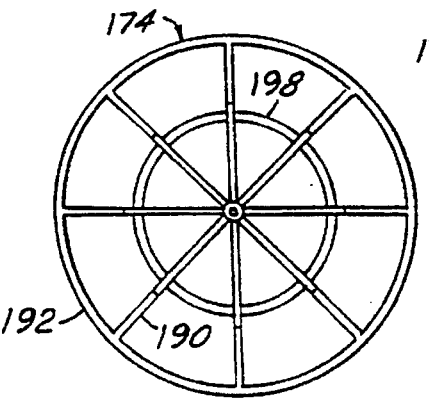 
FIG.28　　FIG.29　　FIG.30　　FIG.31

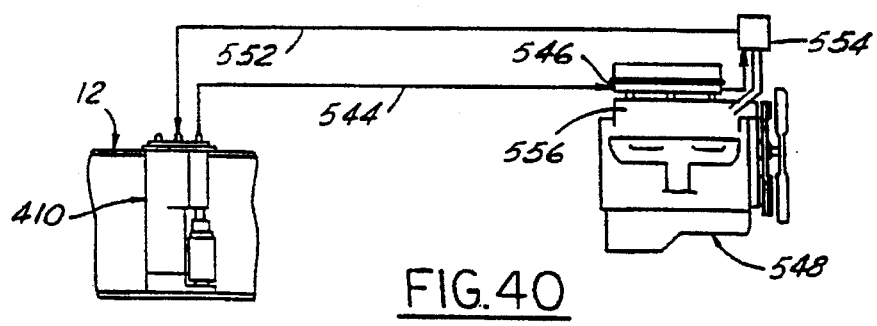
FIG.40
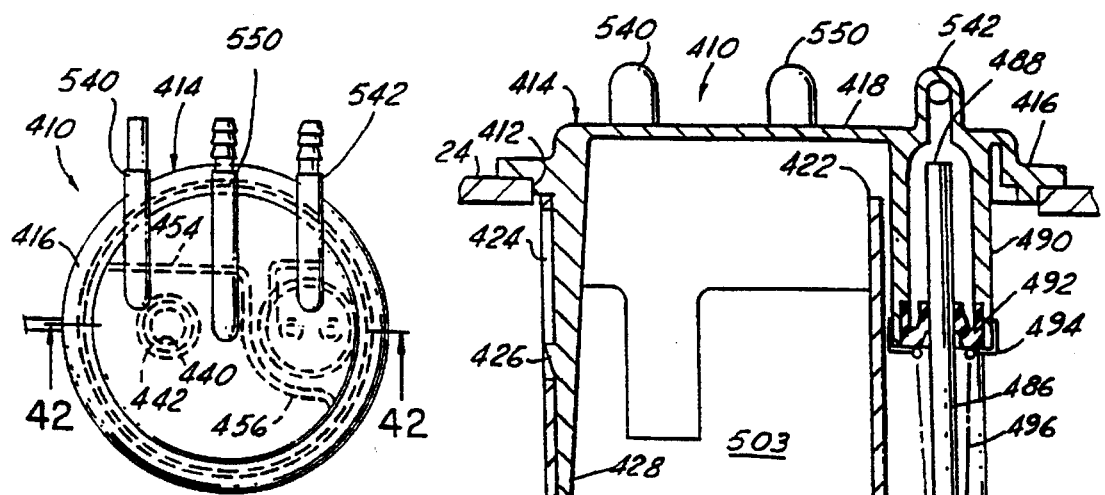
FIG.41
FIG.42

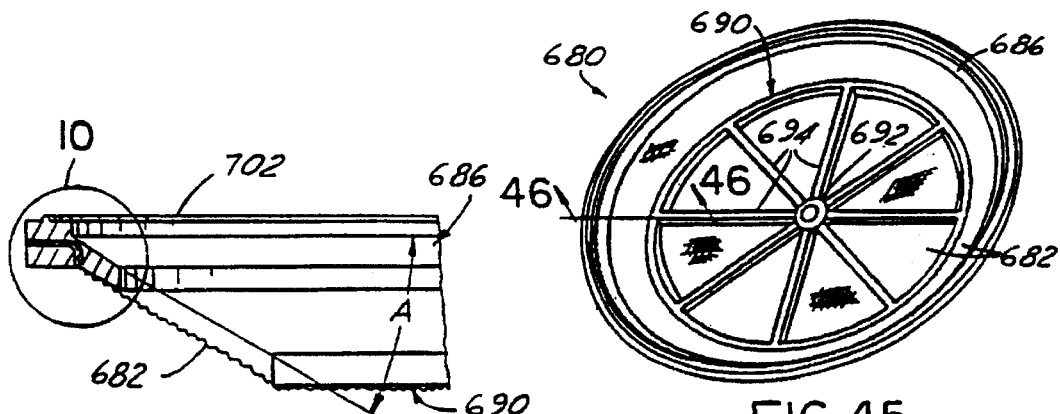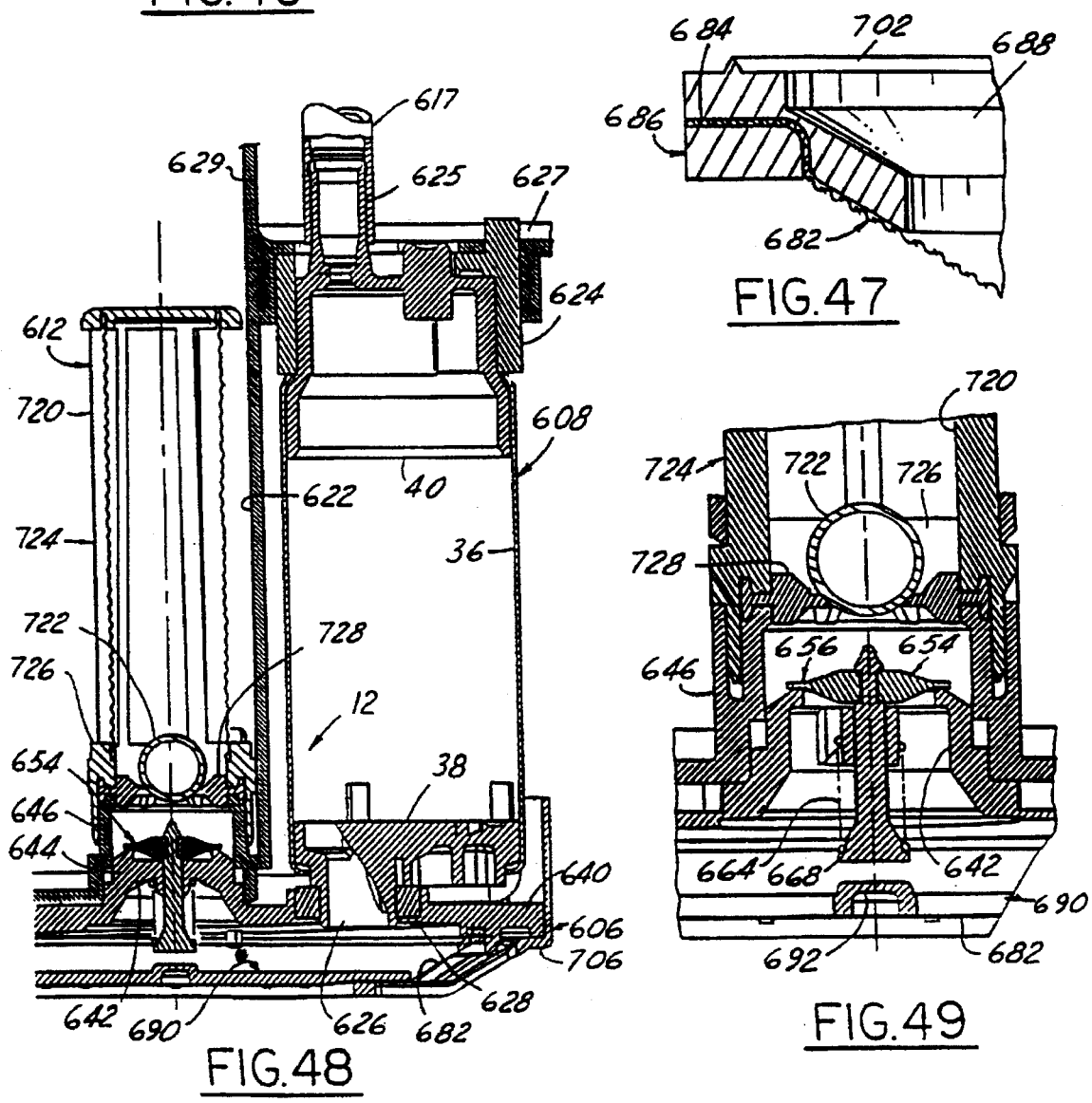

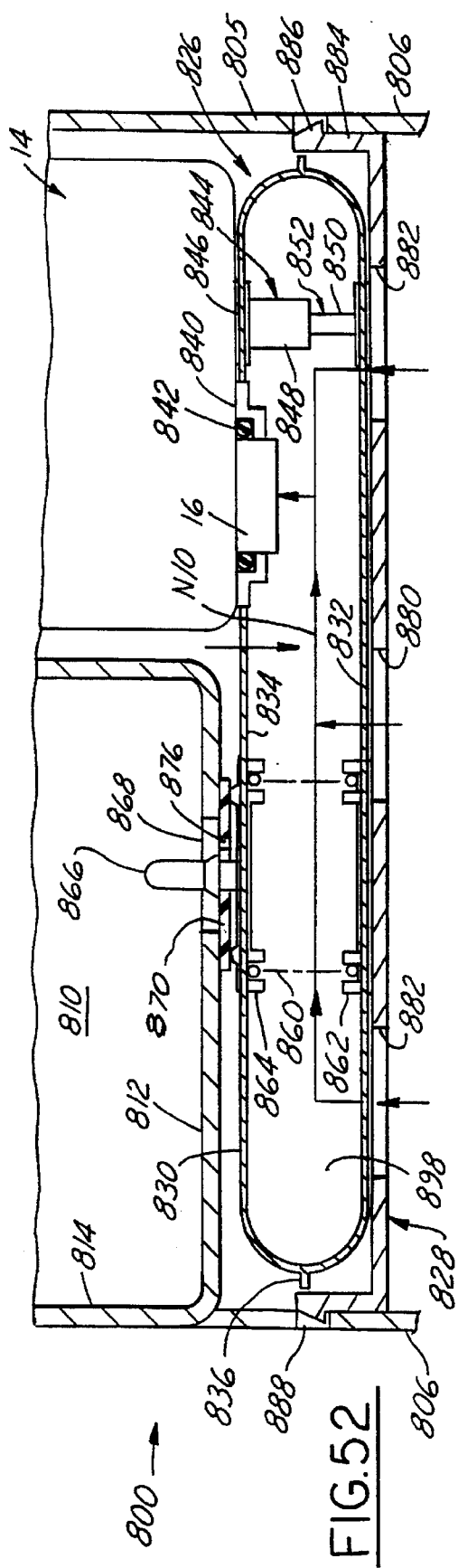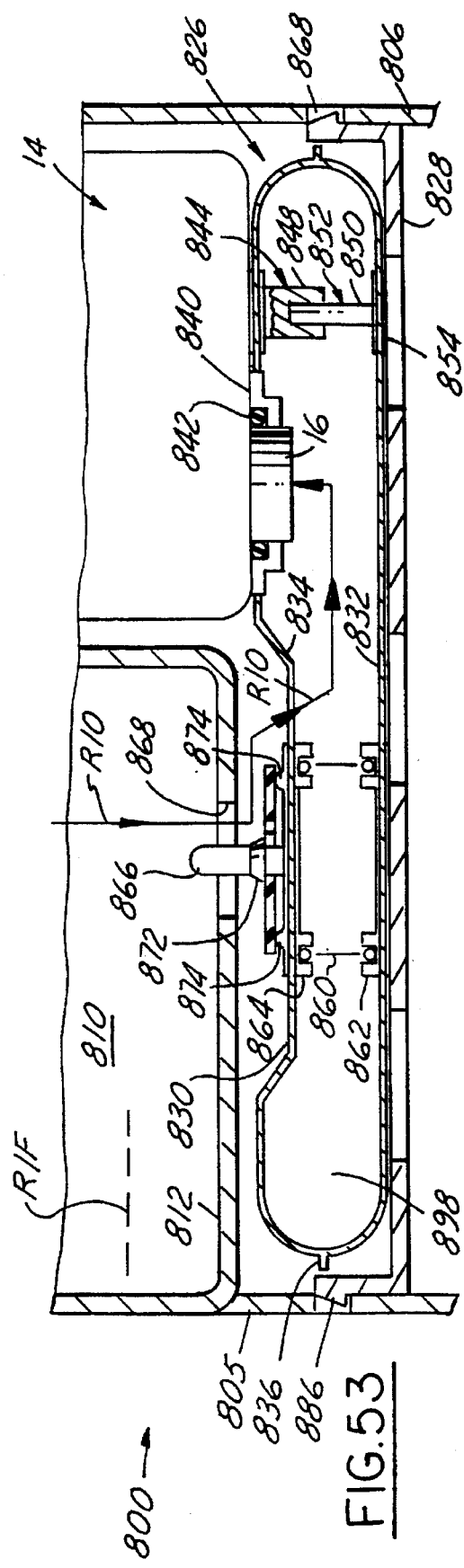

IN-TANK FUEL PUMP AND RESERVOIR

COPENDENCY BENEFIT APPLICATIONS

This application is a continuation-in-part of application Ser. No. 08/602,087, filed Feb. 15, 1996, which is a continuation-in-part of application Ser. No. 08/587,852, filed Jan. 11, 1996, abandoned, which is a continuation-in-part of co-pending application Ser. No. 08/496,950, filed Jun. 30, 1995, abandoned.

FIELD OF THE INVENTION

This invention relates to vehicle fuel systems and more particularly to an electric fuel pump and reservoir disposed in a main fuel tank of a vehicle.

BACKGROUND OF THE INVENTION

Modern fuel delivery systems for automotive vehicles with engines having fuel injectors have utilized an electrically driven fuel pump in the vehicle main fuel tank. Typically, the electric fuel pump is mounted either directly in the vehicle tank, or is mounted within a reservoir canister received in the tank as shown for example in U.S. Pat. Nos. 4,747,388; 4,807,582; 4,831,990; 4,893,647; and 4,964,787. The canister reservoir supplies fuel to the pump in the event there is an interruption in the availability of fuel from the tank, such as when, under low fuel level conditions, cornering of the vehicle causes sloshing or movement of the fuel away from the pump inlet and to one side or the other of the tank, and/or when the tank is excessively tilted by vehicle inclination on severe grades, or when essentially all of the fuel in the main tank has been consumed or used. Typically, the output of the fuel pump is greater than that required by the vehicle engine and the excess fuel is either returned from the fuel injectors to the tank or to the in-tank canister reservoir.

Typically, in a no-return fuel system, there is only one fuel supply line between the fuel pump module and an engine fuel rail or manifold distributing fuel to the individual fuel injectors, and downstream of the fuel injectors there is no line returning unused fuel from the rail or manifold to the fuel tank. In such non-return fuel systems excess fuel is bypassed directly to the tank or canister reservoir, typically by a pressure regulator usually located closely downstream of the pump outlet within the tank or canister, or by a return line to the tank or canister when the regulator is exteriorly remote from the tank.

Generally speaking two types of electrically driven rotary fuel pumps have hitherto been used in the vehicle main fuel tank for pumping liquid fuels to the fuel injectors of the automotive vehicle engine, namely a turbine type vane pump or a positive displacement pump. One preferred form of a positive displacement gear rotor type electric fuel pump is disclosed in U.S. Pat. No. 4,697,995, and a suitable turbine regenerative fuel pump is disclosed in U.S. Pat. No. 5,257,916.

Such in-tank vehicle fuel pumps must be capable of operating in a wide range of ambient temperatures. It is necessary that a low pressure be created in the entry to the pump chamber in order to draw fuel into the pumping chamber. This reduced pressure alone may cause a change in state of the fuel from liquid to vapor at elevated temperatures and significantly reduce the efficiency of the pump.

In another condition as, for example, when a vehicle has been operating and then the engine shut off for a period, the fuel line between the pump and fuel injectors full of liquid fuel under pressure whereas the fuel in the pump can be completely vaporized due to the elevated temperature in the fuel tank and pump itself. Thus, when the engine is restarted, the pump is full of vapor and even the fuel in the entrance filter may be vaporized. The pump cannot, under these conditions, generate enough pressure to move the fuel in the pressurized fuel supply line.

Accordingly, both of the aforementioned U.S. Pat. Nos. 4,697,995 and 5,257,916 disclose a rotary pump construction with a built-in vapor purging system which will enable the pump to operate under the conditions above described without interruption of the fuel supply, with one major exception. However, in accordance with the present invention it has been found that a turbine type vane pump when disposed within an in-tank canister reservoir does not operate satisfactorily to sufficiently purge itself of vapor under adverse temperature or other vapor-inducing conditions. Due to the preferred location and size of the vapor purge port in the first or pre-channel zone and the inherent operating characteristics of the turbine pump, only a small amount of vapor pressure build up can be produced by such a pump at the pump vapor purge port. Hence, unlike the positive displacement pumps employed within the in-tank canister reservoirs, it has been found that such a vane type pump cannot purge itself of vapor in the pumping channel if the pressure differential between the pump inlet and the vapor port outlet exceeds about 2½ inches of water.

This constraint as to self-purging of vapor does not apply to positive displacement gear rotor pumps of the aforementioned type since they characteristically pump both fuel vapor and air very well. Hence, when mounted inside an in-tank fuel reservoir canister and provided with a vapor purging port communicating with the column of fuel in the canister and located at approximately the elevation of the rotary pump chamber, such positive displacement pumps can purge vapor into the canister against a gravity fuel differential pressure head ranging from say six on up to ten or twelve inches, as when the canister reservoir is full and the gravity head at the pump inlet exerted by the body of fuel in the tank exterior to the canister reservoir is very low.

Nevertheless, some OEM automotive vehicle manufacturers have preferred turbine vane fuel pumps for use in fuel tanks over gear rotor positive displacement pumps for a variety of reasons, even though they have had to forsake the advantages of a canister reservoir-type reserve supply of fuel for preventing starvation of fuel supply to the turbine pump from the main tank in order to obtain vapor self-purging operation. In an attempt to make up for this lack of the preferred selectable alternative canister reserve supply of fuel, such as that provided in U.S. Pat. Nos. 4,747,388, some automotive manufacturers have mounted turbine vane fuel pumps in specially configured fuel tanks with the pump inlet submerged in a so-called "swirl pot", i.e., a molded-in basin in the tank bottom in an attempt to maintain an adequate body of fuel in the vicinity of the fuel pump inlet to prevent pump starvation. However such swirl pots are still subject to being emptied by severe vehicle cornering or excessive vehicle inclination, as well as when essentially all of the fuel of the main tank has been consumed or used. Such swirl pots also inherently must be limited in their length, width and depth dimensions, thereby imposing a further constraint on the bulk of the fuel pump and associated filter package which can be accommodated in such swirl pots.

Despite such hitherto prevailing limitations, some OEM automotive vehicle manufacturers have preferred to use turbine vane-type fuel pumps over gear rotor positive displacement pumps for in-tank mounting because such turbine vane pumps generally are quieter and smoother running, and also have low tank fuel level operation performance characteristics preferred by such vehicle manufacturers over those of gear rotor positive displacement pumps. With a typical positive displacement gear rotor fuel pump, such as that disclosed in the aforementioned U.S. Pat. No. 5,257,916, when the pump encounters like conditions with a large presence of vapor in the pump chamber, the positive displacement pump will continue to pump liquid fuel but will also pump vapor as well. When this condition occurs the fuel pumped to the engine contains vapor and/or air entrained with liquid fuel. This will cause the vehicle engine to spit and stumble or otherwise run rough even though the engine continues to run on this vapor and liquid fuel mixture. However, because of constraints imposed by engine control unit (ECU) operational characteristics and exhaust emission requirements, several vehicle manufacturers would prefer to see the instantaneous shut off characteristic under extreme low tank fuel level conditions of the turbine vane fuel pump, wherein the pump ceases pumping any fuel.

OBJECTS OF THE INVENTION

Accordingly an object of the present invention is to provide an in-tank fuel delivery system, method and module which solves the aforementioned problem of the existing trade-off hitherto required between utilizing a positive displacement pump housed in a reservoir canister, and thereby provided with an ample supply of reserve fuel under all tank fuel level conditions, versus a turbine vane type fuel pump having preferred performance characteristics and operable vapor purging system but lacking an adequate and selectable reserve body of fuel to prevent pump starvation under adverse tank fuel level conditions.

A further object of the invention is to provide a fuel delivery in-tank, system, method and module of the aforementioned character embodying both an in-tank fuel pump and a canister reservoir of the "bottom seeking type" which can be made in a compact subassembly small enough to fit within the existing confines of a fuel tank swirl pot and in which the fuel pump inlet can selectively draw from the main tank fuel body or the reserve body of fuel in the canister, and with the canister reservoir fuel reserve being maintained in a non-overflow state with bypass fuel return under normal operating conditions so that all of the advantages of in-tank canister reservoirs are obtained as well as all of the advantages of turbine vane fuel pump performance, while also enhancing the self-vapor-purging capability of the vapor purging system built into the pump and insuring return of twice-filtered bypass fuel to the pump inlet in preference to overflow return to the fuel tank.

Yet another object of the present invention is to provide a fuel delivery system of the aforementioned character in which the canister reservoir can be made in varying sizes and capacities as permitted by the vehicle tank configuration, while also being capable in some embodiments of utilizing existing canister reservoir diaphragm operated bottom outlet valves or, alternatively, utilizing improved canister outlet fuel flow control systems and constructions of the invention for preventing fuel starvation of the pump inlet and operable at pump shut down to backflush contaminants from the exterior of the main filter.

Additional objects, features and advantages of this invention are to provide a vehicle in-tank fuel delivery module of the aforementioned character with the fuel pump mounted directly in the main body of fuel in vehicle fuel tank and in which an associated in-tank canister reservoir supplies fuel to the pump through the interior of a main pump inlet filter when the flow of fuel from the main tank is interrupted, the fuel supplied during interruption is twice filtered, admission of air and fuel vapor to the pump inlet is inhibited during interruption of the supply of fuel from the tank, and the canister and pump assembly is compact, rugged, durable, reliable, of relatively simple design, economical manufacture and assembly, and in service has a long useful life.

BRIEF DESCRIPTION OF THE DRAWINGS

The foregoing and other objects, features and advantages will be apparent from the following detailed description of presently preferred embodiments and the best mode of making and using the invention, and from the appended claims and accompanying drawings (which are drawn to engineering scale unless otherwise indicated) in which:

FIG. 13 is a side elevational view of the flange component of the base subassembly of FIGS. 3–12 shown to engineering scale;

FIG. 14 is a top plan view of the flange component;

FIGS. 15, 16 and 17 are cross-sectional views taken respectively on the lines 15—15, 16—16 and 17—17 of FIG. 14;

FIG. 18 is a bottom plan view of the flange component;

FIGS. 19 is a plan view of the filter diaphragm component of the base subassembly;

FIG. 20 is a cross-sectional view taken on the line 20—20 of FIG. 19;

FIGS. 21 and 22 are plan and side elevation views respectively of the diaphragm retainer component of the base subassembly, shown on a slightly larger scale than the associated filter diaphragm of FIGS. 19 and 20;

FIG. 23 is a perspective view of the filter diaphragm spring cup component of the base subassembly as alternately provided with a central calibrated orifice;

FIG. 24 is a plan view of the spring cup greatly enlarged over the showing thereof in FIG. 23;

FIG. 25 is a cross-sectional view taken on the line 25—25 of FIG. 24;

FIG. 26 is a plan view of the spring retainer component of the base subassembly;

FIG. 27 is a cross-sectional view taken on the line 27—27 of FIG. 26;

FIGS. 28 and 29 are plan and side elevational views respectively of the main or primary filter retainer component of the base subassembly;

FIGS. 30 and 31 are plan and side elevational views of the filter support component of the base subassembly;

FIG. 40 is a simplified diagrammatic and fragmentary view of a fourth embodiment fuel delivery module of the invention and associated vehicle engine;

FIG. 41 is a top plan view of the fuel pump and reservoir canister module of the fourth embodiment shown by itself;

FIG. 42 is an enlarged side elevational view, with portions shown in center section on the line 42—42 of FIG. 41., of the canister and pump module assembly of FIGS. 40 and 41;

FIG. 45 is a perspective view of the diaphragm filter subassembly utilized in the module of FIGS. 43 and 44 and shown by itself;

FIG. 46 is a fragmentary center sectional view taken on the line 46—46 of FIG. 45 and greately enlarged thereover;

FIG. 47 is a fragmentary center sectional view of the portion of FIG. 46 encompassed by circle 10 in FIG. 46 and enlarged thereover;

FIG. 48 is a fragmentary center sectional (and more detailed) view of the lower right hand portion of the view of FIG. 43;

FIG. 49 is an enlarged view of a portion of FIG. 48.

FIG. 52 is a fragmentary sectional view of the lowermost portion of FIG. 50 and greatly enlarged thereover, illustrating the components in operation when the level of fuel in the main body of fuel in the fuel tank is sufficient to maintain the module filter submerged therein;

FIG. 53 is a view similar to FIG. 52 when the main body of fuel in the tank is not surrounding the filter of the module, as in low fuel or adverse vehicle maneuvering, pump-starvation, conditions;

DETAILED DESCRIPTION OF PREFERRED EMBODIMENTS

First Embodiment

Figure 1:
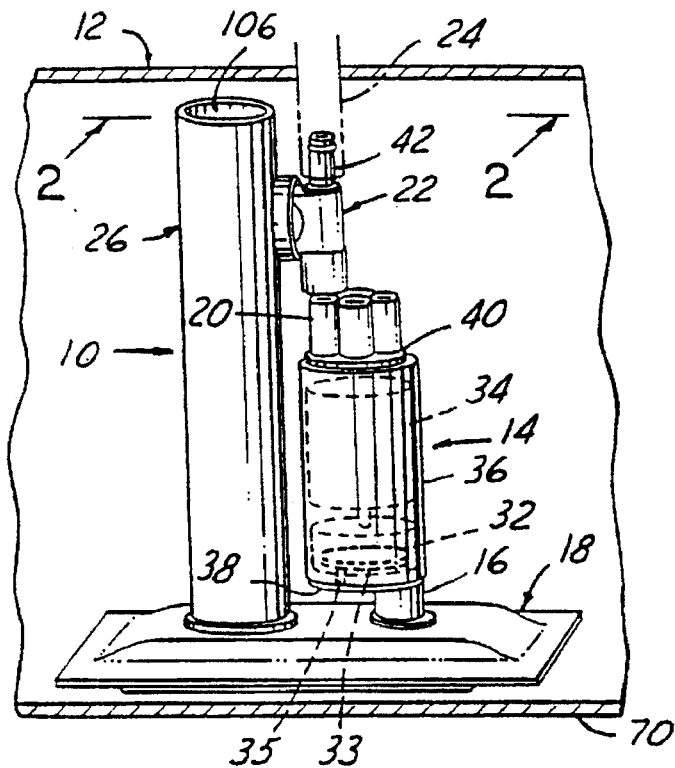
FIG. 1 is a perspective view of a first embodiment of a fuel delivery canister reservoir and pump module assembly embodying this invention mounted in a fuel tank of an automotive vehicle.

FIG. 1 illustrates a first embodiment of a fuel pump module assembly 10 embodying this invention mounted in a fuel tank 12 of a vehicle, such as an automobile, for supplying liquid hydrocarbon fuel, such as gasoline, to a vehicle engine which is typically fuel injected. The assembly has an electric fuel pump 14 with an inlet 16 connected to a primary or main fuel filter 18 and an outlet 20 connected to a bypass regulator 22 which regulates the pressure of fuel supplied to the engine through a conduit 24. A fuel reservoir canister 26 is connected adjacent its upper end to the bypassed fuel outlet 28 of the regulator 22 and at its lower end to the interior of filter 18 through an orifice plate 30.

Figure 2:
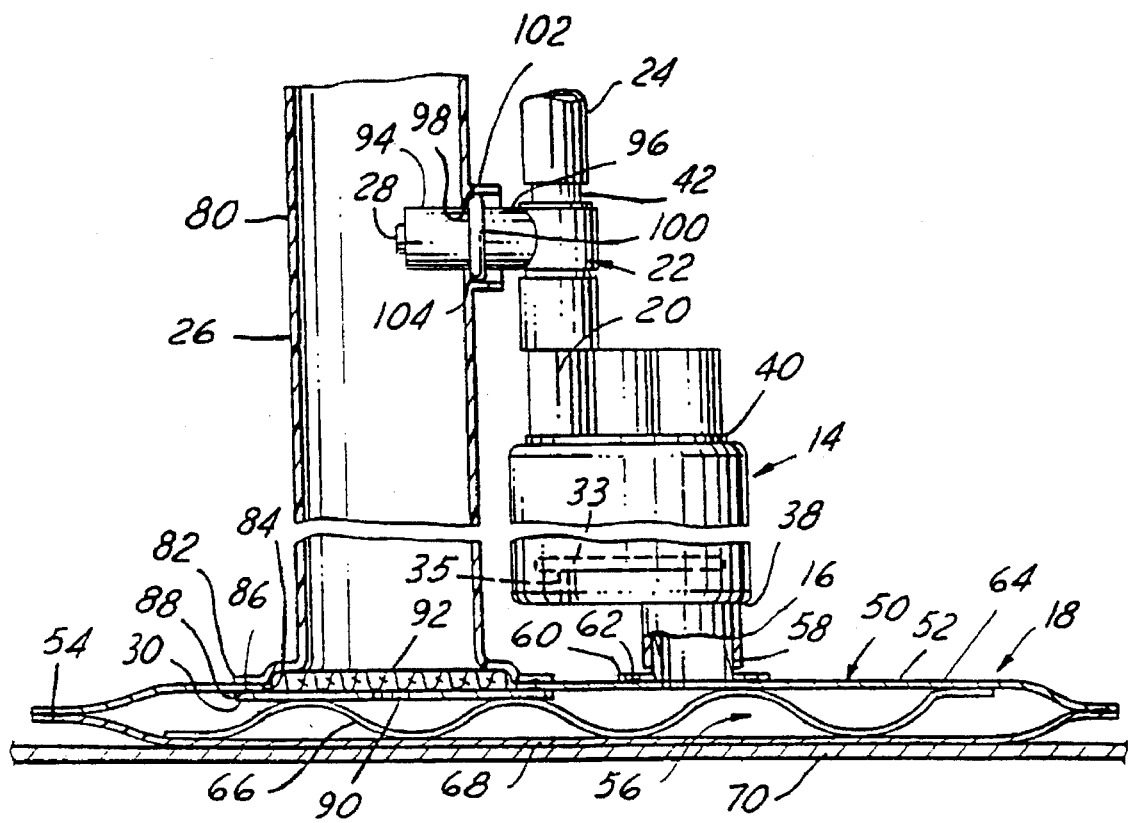
FIG. 2 is an enlarged fragmentary side view of the pump and canister assembly of FIG. 1 with portions broken away and shown in section.

The fuel pump 14 has a pump assembly 32 (FIG. 1) driven by an electric motor 34 both of which are sealed in a cylindrical housing 36 with a bottom inlet end cap 38 and top outlet end cap 40 (see also FIG. 2). The pump 32 is preferably a turbine type pump but alternatively it may be a positive displacement type pump. A suitable positive displacement gear rotor type electric fuel pump is disclosed in U.S. Pat. No. 4,697,995, and a suitable turbine regenerative fuel pump is shown in U.S. Pat. No. 5,257,916, the disclosures of which are incorporated herein by reference and hence the pump 14 will not be described in further detail. However, it is to be noted that each of these patents disclose rotary pumps with a built-in vapor purging system to allow purging of vapor from the pump to enable the pump to be self-priming and to pump against a pressurized fuel line under hot fuel conditions.

Thus in the electric motor-pump assembly 14 of FIGS. 1 and 2 herein, the rotary pump 32 of the assembly is shown diagrammatically with a pumping chamber 33 (shown with broken lines) and associated. vapor purge port passage 35 (also shown in broken lines) leading from pump chamber 33 down through end cap 38 to an outlet communicating directly with the interior of tank 12. Purge outlet 35 is disposed slightly above the elevation of the pump inlet 16 which in turn also communicates directly with the interior of the tank (through primary filter 18). Vapor port passage 35 thus corresponds to passage 110, 112 in the '995 patent and to vapor port 72 of the 916 patent, and functions in similar but enhanced manner in accordance with a further feature of the present invention because of the manner in which pump assembly 14 is exteriorly associated with the fuel reservoir canister 26 in accordance with the invention.

In normal operation, the pump 14 operates at constant speed and supplies a greater quantity of fuel to the pressure regulator 22 than is needed even to meet the maximum demand of the operating engine. Regulator 22 maintains a substantially constant pressure of fuel supplied through its outlet 42 to the engine by bypassing or discharging excess fuel through its bypass outlet 28 into the reserve fuel reservoir of canister 26 and at a variable flow rate inverse to that flowing in line 24 to the engine. Typically, the pressure regulator has a flow rate control valve actuated by a diaphragm in response to changing fuel demand of the engine to maintain a substantially constant output pressure. Typically, the regulator will maintain a substantially constant output pressure, such as 50psig, with a pressure drop of about 1 psi over the full range of variation of the fuel flow rate to the engine from 0 to 40 gallons per hour. Preferably, the fuel pump assembly 10 is used in a no-return fuel system which does not have any line returning fuel from the downstream side of the engine fuel injectors or the fuel rail to the fuel tank. Suitable pressure regulators 22 for no-return fuel systems are disclosed in U.S. Pat. Nos. 5,220,941 and 5,398,655, the disclosures of which are incorporated herein by reference and hence the pressure regulator 22 will not be described in greater detail.

The primary filter 18 has a bag or envelope 50 formed from a sheet 52 of a flexible filter material of a fine mesh, such as a plastic material, which is heat sealed together around its periphery 54. The interior chamber 56 of the envelope communicates through an outlet 58 with the inlet 16 of the pump into which it is slidably received and frictionally retained with an interference fit. Preferably, the outlet 58 is made of a plastic material and has a peripheral flange 60 secured and sealed by a heat seal 62 to the upper wall 64 of the sheet filter material 52. Preferably, a fuel-permeable spacer, such as a flexible corrugated baffle 66, which can be made of a resilient plastic material, is received in the envelope 50 to prevent the flexible bottom wall 68 of the filter material 52 from collapsing under the weight of the pump assembly, and from being forced upwardly by pump suction onto the outlet 58 in the upper wall 64 and thereby restricting flow of fuel through the outlet and into the pump inlet 16. As best seen in FIG. 1, the baffle 16 is narrower in width than envelope 18 to thereby enable free flow of fuel within the envelope around the side edges of the baffle so that the baffle can be made of imperforate material, if desired. In use, the filter 18 and the pump inlet 16 lie closely adjacent to the bottom of the fuel tank 12, and preferably the bottom wall 68 of the fuel filter lies on the bottom wall 70 of the lowermost portion of the fuel tank (e.g., within a tank swirl pot). For this purpose module assembly 10 is preferably vertically movably supported from a conventional tank top mounting flange (not shown) on a suitable conventional telescopic type support fixture (not shown) so as to be gravitationally biased, and also, if desired, spring biased and pressurized outlet hose biased, downwardly as a "bottom-seeking" type fuel sender module.

Preferably, reservoir canister 26 is formed by a tube 80, preferably made of a fuel-compatible plastic material such as Acetal, with a peripheral flange 82 at its lower end which overlies an opening 84 through the upper wall 64 of the filter material and is attached and sealed to it by a heat seal 86. The underlying orifice plate 30 is also secured and sealed to the flange and the adjoining filter wall by a heat seal 88 to close the bottom of the reservoir tube 80 so that fuel will flow from the bottom of the reservoir only through a calibrated orifice 90 in the plate. The orifice 90 is sized so that the reservoir tube 80 will be substantially completely filled with fuel discharged from the bypass outlet 28 of the pressure regulator 22 during normal operation of the pump. For fuel pumps having an output capacity under normal operating pressure conditions of up to about 40 gallons per hour, the orifice 90 typically has a diameter in the range of about 0.10 to 0.20 of an inch. In other words, the flow controlling cross section of orifice 90 is thus correlated with pump output and engine fuel demand parameters to obtain a reserve fuel flow "balance" between bypass fuel input to canister 26, and reserve fuel canister outflow via orifice 90 and back through main filter chamber 56 to the pump inlet 16, to establish a maximum gravity reserve head of fuel in the canister with minimum, if any, overflow from the open top of canister 26 back into the main tank.

Preferably, to further filter fuel supplied from the reservoir 26, a secondary filter 92 is disposed in the bottom of the tube 80 and overlying the orifice 90. Preferably, filter 92 has a finer mesh or openings size than the primary filter 18 and typically has an opening average size not greater than about 60 microns. Preferably, the secondary filter has an average opening or pore size of about 30 to 40 microns and the primary filter has an average opening or pore size of about 60 to 70 microns. To insure that any air or gaseous vapor in the liquid reserve fuel does not block or restrict the flow through the orifice 90, the filter 92 is disposed above the orifice rather than below it so vapor can indirectly escape to the tank headspace upwardly through the body reserve fuel in the canister. In use, the baffle 66 also insures that the flexible bottom wall 68 of the filter material is not forced or collapsed onto the orifice 90 which would block the flow of reserve fuel down through the orifice and via the interior chamber 56 of the filter to the pump inlet 16.

Adjacent the upper end of reservoir tube 80, a cylindrical portion 94 of the housing 96 of the pressure regulator 22 projects through a bore 98 in the sidewall of the tube 80. A peripheral annular flange 100 is pressed with an interference fit into a collar 102 coaxial with and encircling the bore and integral with the tube. Preferably, an O-ring 104 provides a seal between the regulator housing 96 and the tube 80. The upper end 106 of the reservoir tube 80 opens into the fuel tank headspace and thus prevents any pressure build-up from bypass fuel flow input that would occur if the canister top were sealed, and thus permits excess reserve bypass fuel to flow out of the top of the reservoir tube into the fuel tank. The open-top canister also permits any air or vapor in the fuel in the reservoir tube to rise and separate from the reserve fuel and pass through the open end 106 into the vapor dome headspace in the fuel tank.

Figure 3:
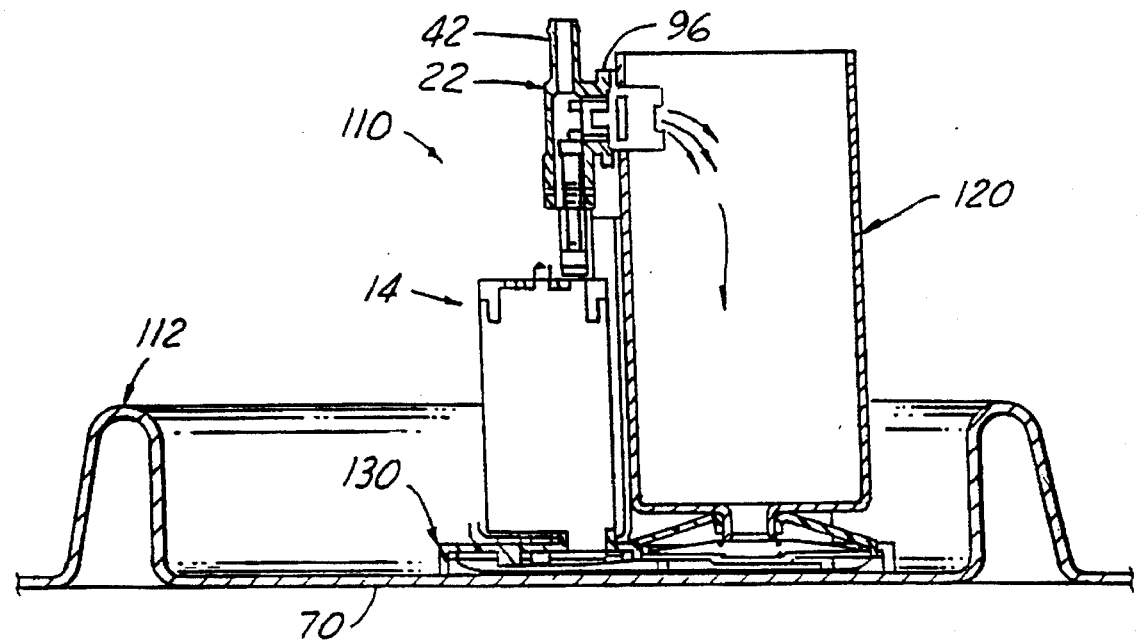
FIG. 3 is a simplified and fragmentary view of a second embodiment fuel delivery canister reservoir and pump module assembly of the invention.
Figure 4:
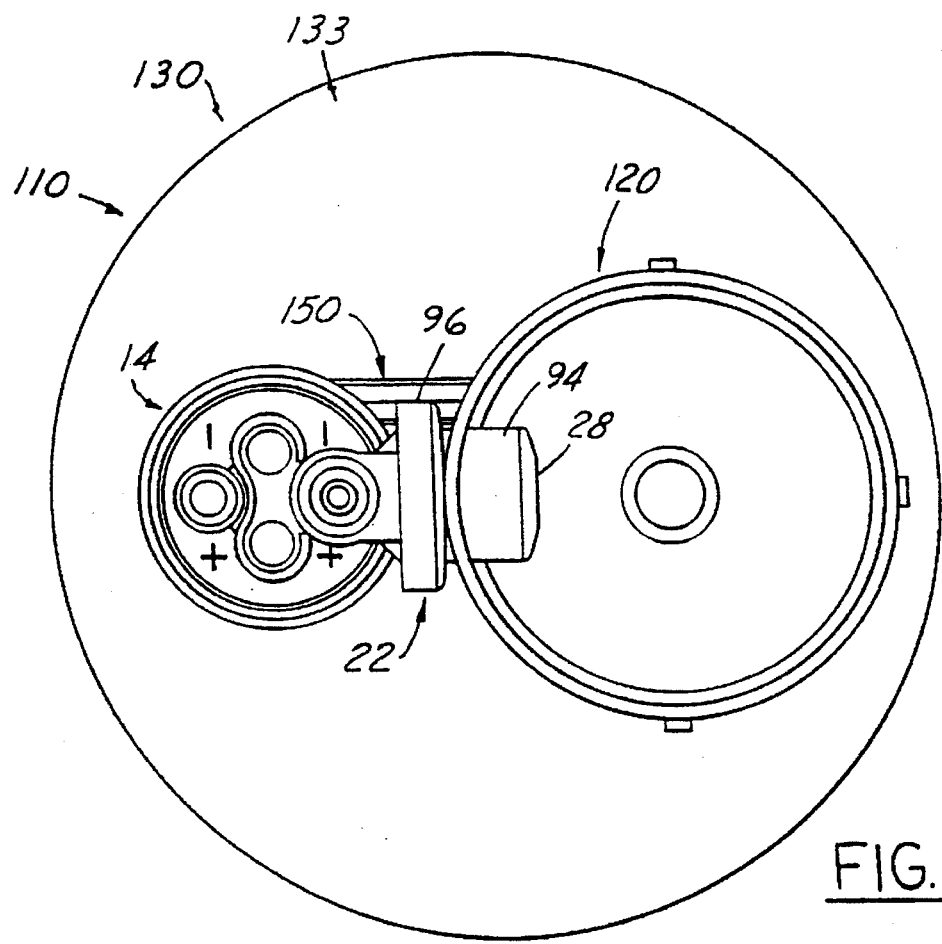
FIG. 4 is a top plan view of the fuel pump and reservoir canister of the second embodiment shown by itself.

In use, the fuel pump module 10 is mounted in the fuel tank with the reservoir canister tube 80 extending generally vertically and the fuel filter 18 immediately adjacent the lowermost bottom portion 70 of the fuel tank and preferably resting on the bottom 70 of the tank as a "bottom-seeking" module. In fuel tanks provided with a molded-in or stamped-in "swirl pot" in the lowermost region of the tank (see FIG. 3), the relatively compact lateral dimensions of module 10 with its elongate filter 18 enable the same to fit within the sometimes narrow confines of such a swirl pot. In normal use, the fuel tank is at least partially full of a liquid fuel, such as gasoline, to a level above the filter 18 so that the filter and the pump inlet 16 are completely immersed in fuel.

In normal operation of the electric fuel pump 14, fuel is drawn from the main body of fuel in the tank through the filter 18 into the inlet 16 of the pump and discharged from the outlet 20 of the pump into the inlet of the pressure regulator 22 which supplies through its outlet 42 fuel to the engine at a substantially constant pressure, such as 50 psig and at a variable flow rate established by variable engine fuel demand. Regulator 22 maintains a substantially constant output pressure by bypassing a portion of the fuel supplied to its inlet and discharges the bypassed fuel through its bypass outlet 44 into the reservoir canister 26. In normal operation of the pump, due to the aforementioned canister reserve fuel head balance with calibrated orifice 90, fuel in the reservoir tube 80 rises to a level which is usually adjacent to or above the bypass outlet 28. In some normal operating conditions, such as extended periods of the engine idling or operating under a low load, the fuel level can rise to the top of tube 80 and overflow into the tank through the open upper end 106 of the tube. Thus, in normal operation, some of the fuel entering the reservoir also flows continuously out of the bottom of the tube through the secondary filter 92 and calibrated orifice 90, passes through the interior chamber 56 of the primary filter 18 and reenters the pump inlet 16 along with fuel drawn from the tank through the primary filter. Preferably, the maximum canister head reserve fuel level is maintained below canister overflow level so that as much as possible of the bypassed fuel, which has already been once filtered by passing through filter 18 to the pump inlet, is returned to the pump inlet after being again filtered through the secondary filter 92. This reduces the overall or average rate of fuel draw from tank 12 through filter 18 and hence reduces the rate of tank contaminant clogging of filter 18. It also maximizes the amount of twice-filtered fuel delivered to the engine.

When the fuel level in the tank becomes low enough, during normal operation of the vehicle, such as when turning corners or going up and down, or while parked on, a steep hill or incline, the remaining fuel in the tank will move away from the primary filter 18, thereby momentarily interrupting ("starving") the supply of fuel from the tank through the filter to the inlet 16 of the pump. During these fuel interruptions, the pump receives fuel from the reserve supply in reservoir canister 26 at a greater flow rate than when tank fuel is available at filter 18 due to the increase in negative pressure at orifice 90 exerted by pump suction under these adverse conditions. The reserve fuel thus flows through the secondary filter 92, calibrated orifice 90, interior chamber 56 of filter 18 and into the inlet 16 of the fuel pump at a sufficient rate to satisfy pump and engine fuel demand and thereby avoid fuel starvation interruption under such adverse conditions. Meanwhile, fuel in excess of engine demand continues to be returned into tube 80 from bypass regulator 22 to thereby prolong the availability of reserve fuel during such adverse conditions.

During the "starvation" interruption of fuel from the tank, the capillary action of the wet sheet of filter material 52 forming top and bottom envelope walls 64 and 68 prevents air and fuel vapor from passing through the filter material into the interior chamber 56 of the filter bag or envelope 50 and into the pump inlet. If the interruption of the fuel in the tank is of sufficient duration so that all of the reserve fuel in the reservoir canister 26 is consumed, then the filter envelope chamber 56 itself provides an additional reservoir or reserve of fuel which is supplied to the pump. Preferably, as this fuel is depleted, the walls 64 and 68 of the flexible filter material 52 collapse inwardly, but the baffle 66 prevents the filter material from restricting or closing off the pump inlet 16. This also insures that the filter material continues to be wetted by the remaining small quantity of fuel so that air and fuel vapor do not enter the pump inlet 16 until essentially all of the fuel has been consumed. The baffle also insures that when an essentially completely empty fuel tank is refilled, the walls of the filter 18 will be expanded into their normal operating position, thereby insuring that the inlet 16 of the fuel pump will be unrestricted when the engine is restarted.

It will also now be apparent from the foregoing description and drawings that, under normal operating conditions, tube 80 will normally be almost if not completely full of reserve fuel at engine shut-down. Although the reserve fuel during such engine-off periods can drain from tube 80 via calibrated orifice 90 and filter 18 and thus leak back into the main body of fuel in tank 12, this leakage will occur only to the extent that a gravity head pressure differential exists between fuel tank level, relative to orifice 90, and the reservoir fuel level in tube 80. Because this gravity-induced pressure differential is small as compared to the pump suction induced pressure differential when pump 32 is drawing reserve fuel via orifice 90, this engine-off "leak" flow rate is much less than "reserve pump draw" flow rate. Hence a reserve supply of fuel can be maintained in tube 80 available for engine re-start for a predetermined prolonged period even under pump inlet starvation conditions, e.g., the vehicle parked on a steep incline with a low level of fuel in tank 12.

In addition, it will be seen that such canister leakage occurring during engine (and hence pump) shut-down and low tank level conditions provides a backflow reserve fuel stream from orifice 90 into filter chamber 56 and then out through the pores of the filter envelope 50 into the main tank. This off-period backflow produces a backwashing action on filter 18 to cause much, if not all, of any contaminant particles clinging to the exterior surface of the filter to be flow carried off of the this surface and to re-settle or disperse in the tank. Clogging of filter 18 over its operational life is thus greatly reduced.

It will also now be apparent from the foregoing description and drawings that fuel delivery module 10 now enables use of a turbine type rotary vane fuel pump, such as that set forth in the aforementioned U.S. Pat. No. 5,257,916, in association with a reserve fuel reservoir canister without thereby disabling the operation of the vapor purging system 35 of the pump 32. As set forth previously, such disablement could occur if the turbine pump were disposed within the interior of the reservoir canister, and the outlet of pump purge port 35 were subjected to a gravity pressure head of reserve fuel in the canister exceeding the gravity pressure head of the main body of fuel in tank 12 by some given disabling amount, say two and half inches of water. However, in accordance with this feature of the invention, it will be seen that the outlet of the purge port communicates directly with the interior of tank 12, outside of reservoir canister 26. It will also be seen that the elevation of the outlet of purge passage 35 is generally at the same elevation of pump inlet 16 where it communicates with tank fuel, or only slightly vertically spaced from one another, but preferably with the outlet of purge passage 35 being slightly above the opening of pump inlet 16 to the tank. Hence the pressure differential existing between outlet of purge passage 35 and the pump inlet is minimized because they are both exposed directly at about the same elevation to only the same main body of fuel in the tank.

Moreover, with purge outlet 35 at about the same level as the opening of pump inlet 16 to the tank, the pressure differential therebetween is reversed relative to that which would exist in the case of pump 32 being submerged within the body of reserve fuel in a pump-within-canister system. Of course, once the tank level is low enough to drop below the lower end cap 38 of pump casing 36, the purge passage 35 will be exposed directly to the ambient air or vapor in the fuel tank. Thus, under such low fuel level conditions in the tank, when filter envelope 18 is starved of fuel as described previously and the envelope is acting as a capillary seal to the tank interior, the pressure head of reserve fuel in canister 26 will likewise not adversely effect the vapor purging action of the pump.

From the foregoing it will also now be appreciated that the same favorable vapor purging operational characteristics also could be obtained in accordance with the invention by mounting a turbine vane type regenerative fuel pump of the type disclosed in the aforementioned U.S. Pat. No. 5,257,916 within a suitably sized reservoir canister, such as that disclosed in the aforementioned U.S. Pat. No. 4,747,388 (also incorporated herein by reference), provided that the outlet of the purge port passage of the in canister pump is communicated directly to the exterior of the canister and hence to the tank interior at about pump inlet elevation while being isolated from the pressure head of the reserve fuel in the canister. This can be accomplished by inserting a small flexible plastic vent tube (not shown) at one end into the outlet of port passage 35 and leading the other outlet end of the tube in sealed relation and generally horizontally from port 35 out through a suitable aperture in the wall of the canister and out into the tank so that the vent tube outlet is at about the same elevation as the pump inlet.

However, with the preferred mounting of pump assembly 14 outside canister 26 and closely adjacent thereto, as illustrated in the first embodiment of FIGS. 1 and 2, there is no need for such a vapor purge vent tube connection to the tank interior. In addition, when the fuel pump is counted directly in the tank interior, outside the reservoir canister, and utilized with a return-type fuel delivery system, the pump is not exposed to the hot fuel returned from the engine to the canister but rather is cooled by the main body of fuel in the tank, thereby tending to reduce flash vaporization of fuel in the pump chamber because of reduced temperature of the pump components.

Second Embodiment

FIGS. 3–33 illustrate a second embodiment of the invention that also utilizes the feature of the invention of mounting a turbine vane fuel pump assembly 14, having the aforementioned built-in vapor purging system 33, 35, 38, outside of, but closely adjacent to a canister reservoir so that the pump 32 and its vapor purge outlet 35 are mounted directly in the main body of fuel in the tank. In the second embodiment, a fuel pump/reservoir/canister base module assembly 110 is provided, preferably tank mounted and suspended in a conventional manner so as to be of the bottom seeking type, and adapted dimensionally for a drop-in installation through an opening in the top wall 24 of tank 12 to rest on its base at the bottom of a swivel pot basis 112 in tank 12.

Module 110 also includes a reservoir canister 120 (see particularly FIGS. 7–10) open at its upper end to communicate with the headspace or vapor dome in the interior of tank 12. Canister 120 is provided with a circular opening 124 which receives the cylindrical portion 94 of the housing 96 of pressure regulator 22 which is mounted to the canister in the manner of the first embodiment assembly 10 described previously.

Module 110 further includes a base subassembly 130 (shown generally in FIGS. 3–6 and in detail in FIGS. 11–18) of generally cylindrical configuration diametrically sized to slip through a tank mounting opening (not shown) when inserting the module into and through this opening in tank top wall 24. Base 130 is open at the bottom and provided at its outer periphery with four equally circumferentially spaced legs 132 adapted to seat on the swivel pot or tank bottom wall 70. Base 130 has a disc-like flange component 133 from which protrudes integrally upwardly a specially configured open spider leg mounting boss 134. Boss 134 carries a central raised canister mounting ring 136 with an internal bore 138 which receives a downwardly protruding neck 140 of the bottom wall 142 of canister 120 which forms the counter bottom outlet 144. Base 130 is snap-fit assembled to the lower end of canister 122 by fitting canister neck 140 in ring 136.

Module assembly 110 additionally includes the turbine type fuel pump 14. Canister 120 is specially shaped (i.e., tall cylinder of narrow diameter) and laterally offset on base 130 to provide an exterior side nesting space for accommodating pump 14 in nested relation along one side of canister 120. Pump 14 in assembly thus does not protrude beyond the exterior dimensions of base 130 to permit module 110 to be fitted within the tank top wall opening when pump 14 is in assembled relation as part of module 110.

The flat wall 146 of flange 133 in the pump recess area adjacent canister 120 is provided with an upwardly flanged neck 148 to receive an anti-rotation rubber grommet seal (not shown). When base 130 is snap fit to canister 120, the pump inlet boss 16 is also sealably received with a press fit in the grommet and flange neck 148 to thereby mount the lower end of the pump on base 130 after pump 14 has been preassembled to canister 120. Wall 146 of flange 133 is also provided with an upwardly protruding horizontally elongated open top drain trough 150 constructed as shown in detail in FIGS. 13–17 which extends from a curved end wall 152 to an open end outlet 154 leading to the edge of a circular opening 156 in flange wall 146. When pump 14 is mounted on flange 133 its vapor purge outlet port 35 is aligned over an inclined ramp 158 of trough 150 so that fuel expelled from the pump chamber 33 of pump 32 via the purge port 35 is directed into trough 150 and is channeled by the trough into flange opening 156.

Figure 11:
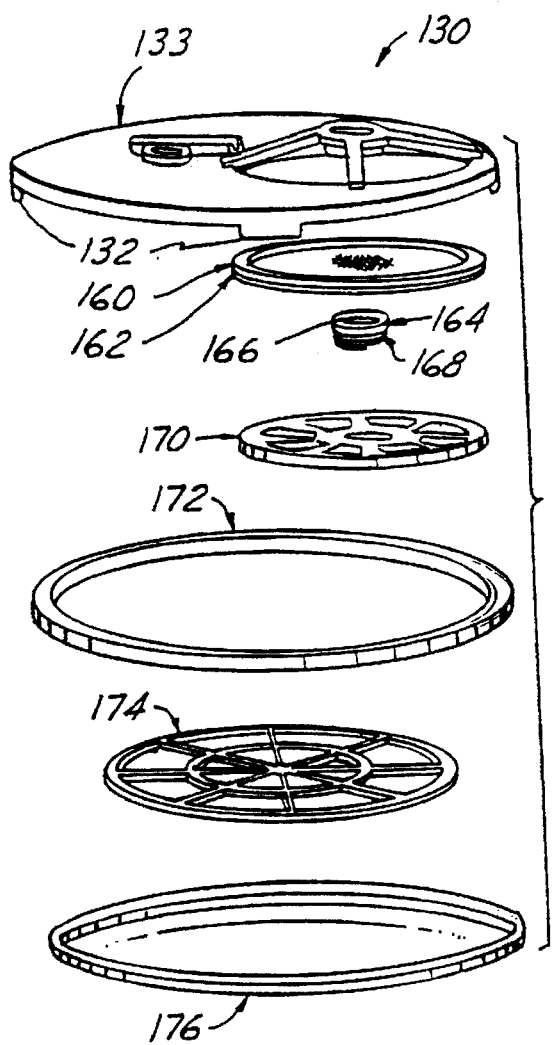
FIG. 11 is an exploded perspective view of the base subassembly of the module assembly of FIGS. 3–10.
Figure 12:
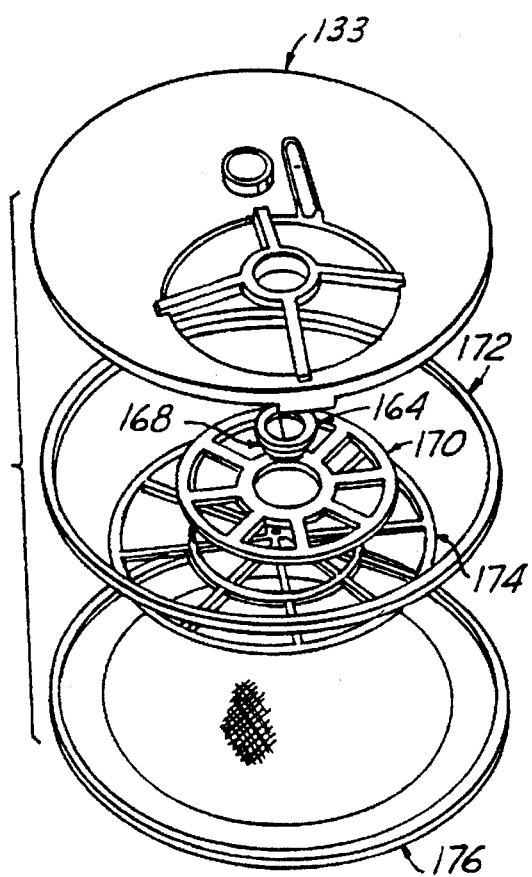
FIG. 12 is another exploded perspective view of the base subassembly shown in FIG. 11 but viewed at a different perspective angle.
Figure 32:
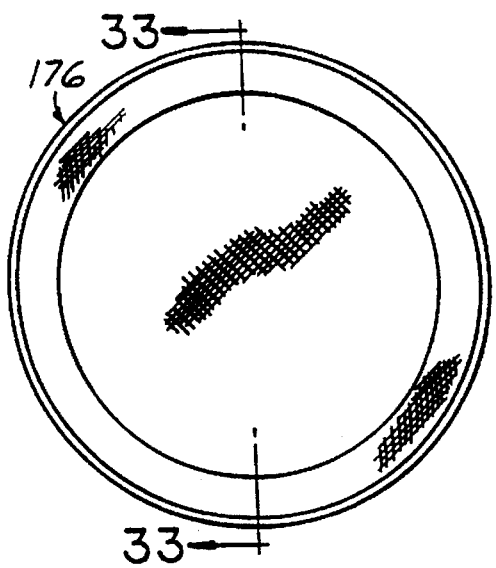
FIG. 32 is a plan view of the main filter component of the base subassembly.
Figure 33:
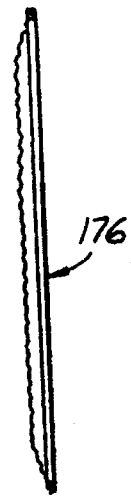
FIG. 33 is a cross-sectional view taken on the line 33—33 of FIG. 32.

As best seen in the exploded perspective views of FIGS. 11 and 12 and in the detail views of FIGS. 19–33, the remaining components of base assembly 130, in addition to flange 133, include a filter diaphragm 160, a ring-like diaphragm retainer 162 which overlies and is heat sealed to the outer peripheral edge of filter diaphragm 160, a spring cup 164 provided with a central calibrated orifice 166, a coil compression spring 168 having its upper coil nested in the turned-down flange 170 of cup 164, a spring retainer 170, a ring-like main filter retainer 172, a main filter support 174 and a disc-like main filter 176. The foregoing components of base assembly 130 are constructed to the configuration and geometry shown in the detail engineering views of FIGS. 19–33 and are scaled relative to one another as shown in perspective views of FIGS. 11 and 12, which also illustrate the order of their stack-up assembled relationship with flange 133. The base components are shown in final assembly in FIGS. 5 and 6.

Figure 5:
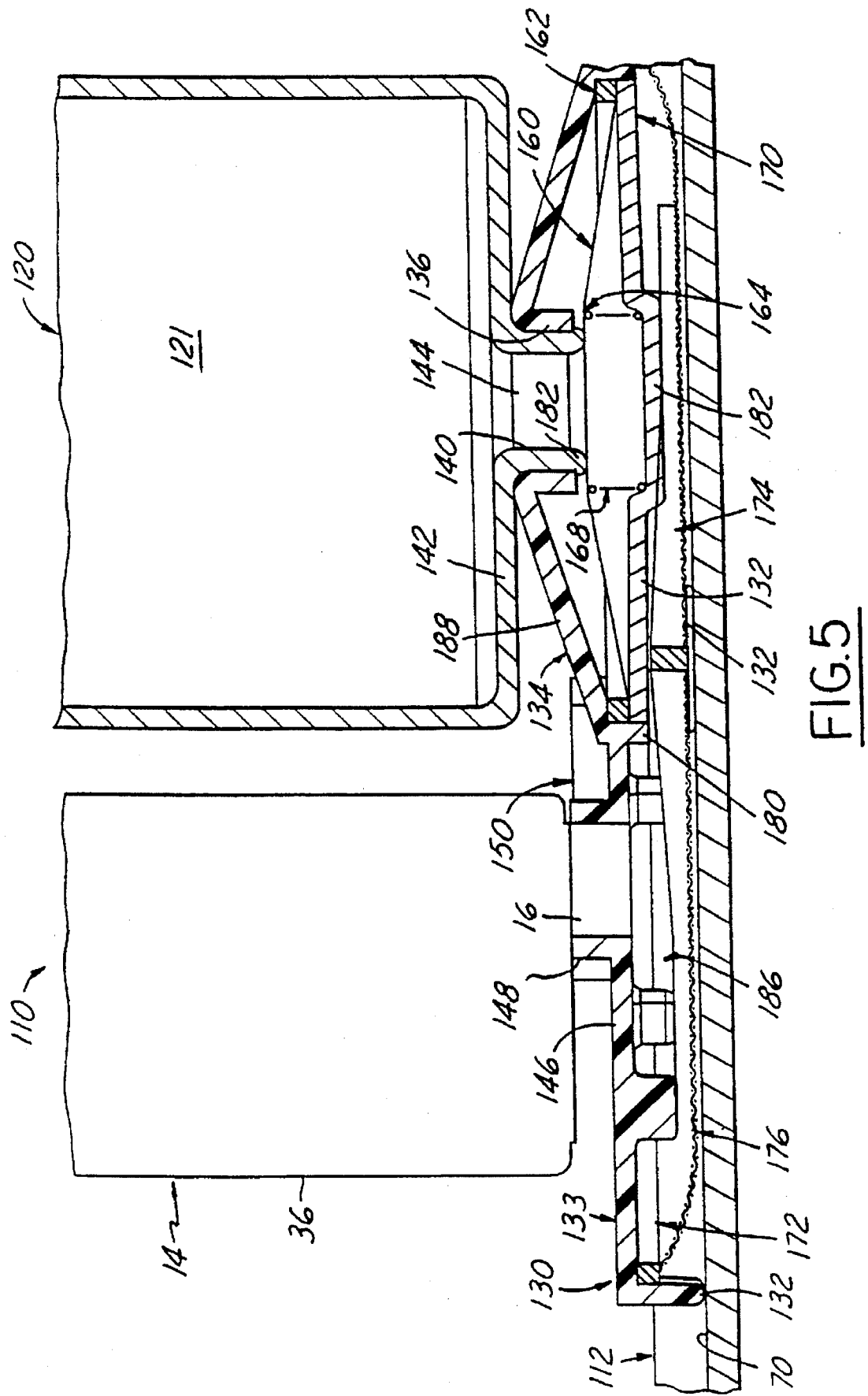
FIG. 5 is an enlarged fragmentary side elevational view, with portions shown in center section, of the canister and pump module assembly of FIGS. 3 and 4 with a canister bottom outlet filter diaphragm regulating valve shown in closed position.

Referring to FIG. 5, in conjunction with FIGS. 11–33, it will be seen that base 133 has a circular flange 180 (see also FIGS. 15 and 16) that defines the throughopening 156 in flange wall 146. Diaphragm retainer 162, with filter diaphragm 160 attached thereto at its outer edge, is press fit into flange 180 so that filter diaphragm 160 spans across opening 156 immediately beneath the outwardly flared lower annular edge 182 of canister neck 140. Spring retainer 170 is subassembled with spring 168, the spring bottom coil being seated on a downwardly indented central imperforate spring seat portion 182 of spring retainer 170. Spring cup 164 rests on the top coil of spring 168 with its peripheral flange 169 oriented downwardly. This subassembly is then inserted with a press fit upwardly into flange 180 in clamping relation with diaphragm retainer 162, to the position shown in FIG. 5.

Figure 6:
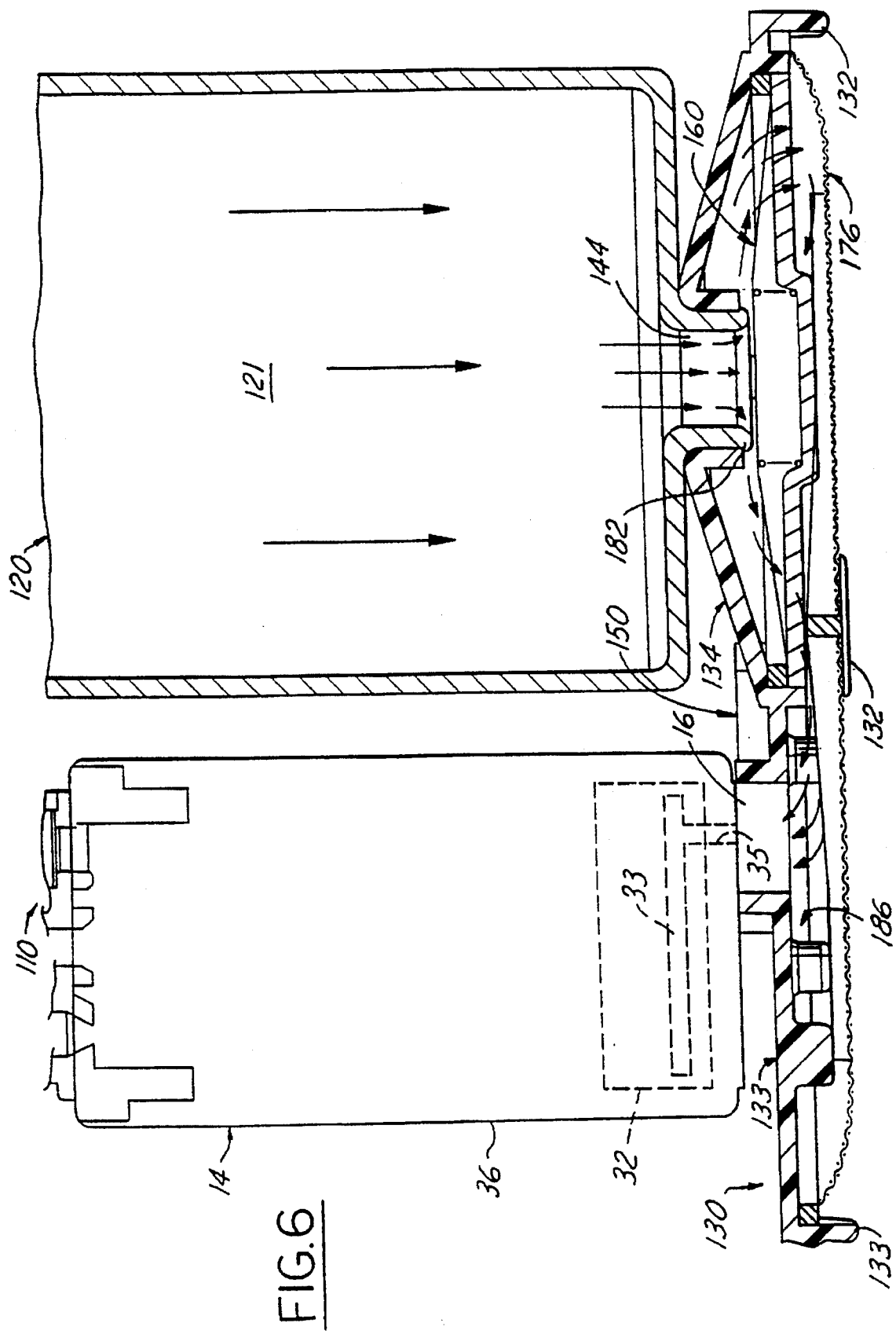
FIG. 6 is a view similar to that of FIG. 5 showing the valve in open position.
Figure 7:
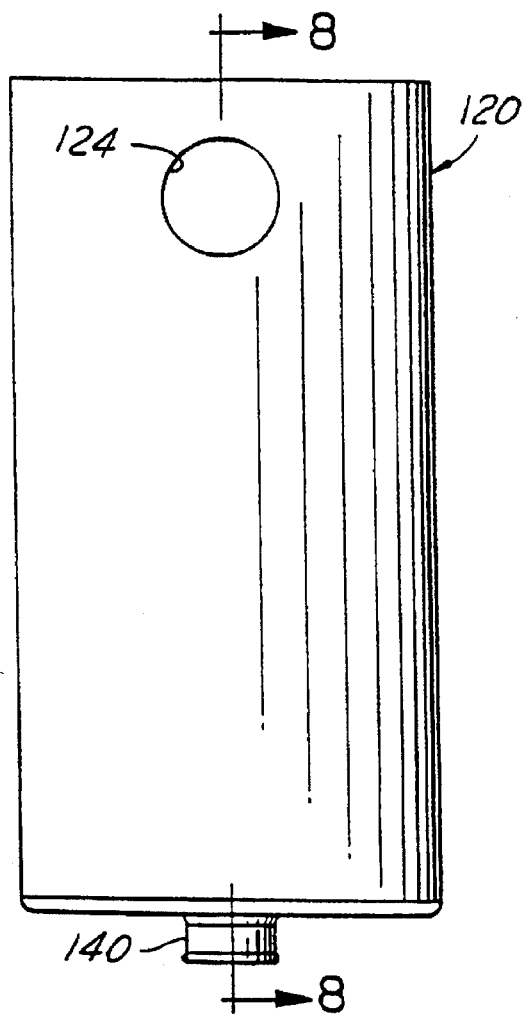
FIG. 7 is a side elevational view of the reservoir canister of FIGS. 3–6.
Figure 8:
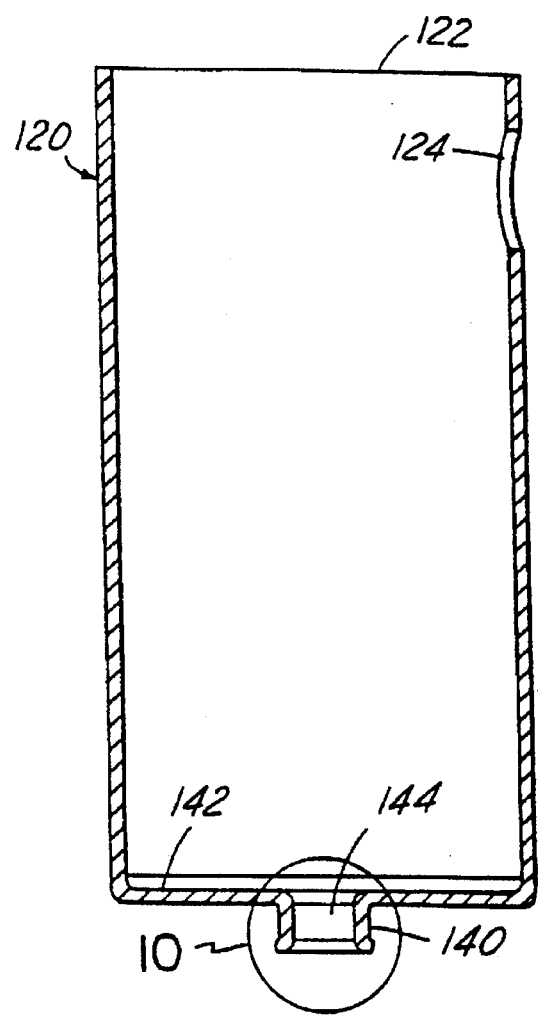
FIG. 8 is a cross sectional view taken on the line 8—8 of FIG. 7.
Figure 9:
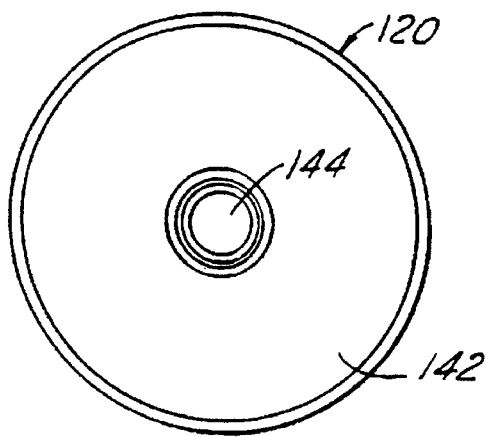
FIG. 9 is a bottom plan view of the reservoir canister shown in FIG. 7.
Figure 10:
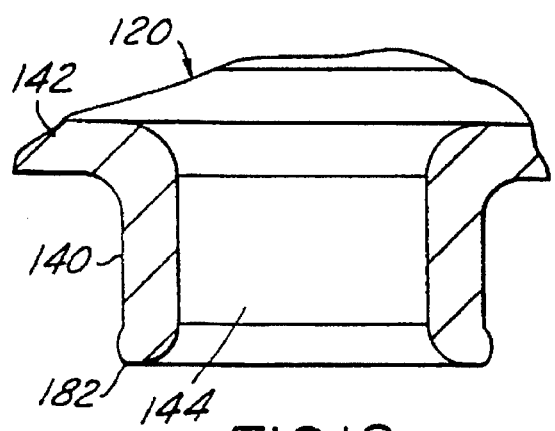
FIG. 10 is an enlarged fragmentary view of the portion of FIG. 8 encircled by the circle 10 therein.

The main or primary filter 176 is heat sealed or otherwise suitably fixedly bonded at its outer edge to the underside of filter retainer 172. Filter support 174 is a wagon wheel type open grid with dual concentric rim and inner rings 192 and 198, and is suitably centered on and fixed to the upper surface of filter 176 as shown in FIGS. 5 and 6. This main filter subassembly is telescopically press fit into the mating annular seat provided by the peripheral flange rim or skirt 184 which encircles the outer periphery of wall 146. The assembled position of primary filter 176, associated retainer 172 and filter support 174 is shown in FIGS. 5 and 6.

As so final assembled, base 130 of module assembly 110 in operative position rests on bottom wall 70 of the swirl pot 112 (or similarly on the conventional fuel tank bottom wall), and defines a main filter chamber 186 in the space beneath flange wall 146 and above primary or main filter 176. Chamber 186 communicates with both the fuel pump inlet 116 and with the space beneath the secondary filter diaphragm 160 through the open spokes of spring retainer 170. The primary fuel flow path from the fuel in swirl pot 112 into chamber 186 is through the clearance spaces between stand-off feet 132 and the under edge of skirt 184, and thence through main filter 176 into chamber 186. A parallel or secondary fuel flow path from the tank and swirl pot to main filter chamber 186 is provided by the four wide openings existing between the four spider legs 188 of canister support boss 134 of base 130, thence through the filter screen material of the filter diaphragm 160 and thence through the spaces between wagon wheel spokes 190 of filter support 174. In addition, as indicated previously, vapor purge bypass fuel exiting via purge port 35 is channeled by trough 150 into opening 156 to flow downwardly through filter diaphragm 160 into main filter chamber 186.

Upward movement of main filter 176 is limited by filter support 174 abutting at its outer rim 192 against the underside of a row of seven stand-off feet 194, and by inner ring 198 of filter support 170 abutting spring seat 182 of spring retainer 170.

In one alternative version of module assembly 110, spring cup 164 is provided with the calibrated central orifice 166 which registers with the circular central region 161 of diaphragm 160. Thus when orifice 166 is present it will also be seen that there is an always-open fuel flow path from the reserve fuel reservoir 121 of canister 120 downwardly through neck outlet 144, through the central region 161 of filter diaphragm 160, then downwardly through cup orifice 166 and thence out through the spaced coils of spring 168 into main filter chamber 186.

Alternatively, spring cup 164 can be made completely imperforate by elimination of calibrated orifice 166 therein so that the same operates to completely close and seal outlet 144 when spring 168 is biasing diaphragm filter 160 against the canister outlet annular valve seat formed by neck edge 182. This full sealing valve action can also be obtained by molding in a suitable rubber sealant material to thereby embed the mesh filter material of filter diaphragm 160 in this imperforate rubber material. The central region 161 of filter diaphragm 160 will thereby serve as an imperforate valve closure member overlying spring cup 164. Either form of spring cup 164 also functions to protect the material of diaphragm filter 160 from undue wear or being torn by the spring end coil.

In use, the fuel pump and canister module 110 is mounted in the fuel tank 12 with the reservoir canister 120 extending generally vertically so that primary fuel filter 176 is disposed immediately adjacent the bottom wall 70 of swivel pot 112 or the fuel tank and preferably resting thereon. In normal use the fuel tank is at least partially full of liquid fuel, such as gasoline, to a level above both primary filter 176 as well as secondary diaphragm filter 160 so that these filters and the pump inlet 16 are completely submerged in the main body of tank fuel or at least the body of fuel in swirl pot 112.

In the normal operation of pump assembly 14, fuel is drawn from the main body of fuel in the tank via both filters 176 and 160 into main filter chamber 186 and thence into pump inlet 16. A variable fuel flow is discharged from the pump outlet 42 and via line 24 to the engine fuel rail (not shown) at substantially constant pressure, such as 50 psig. Again regulator 22 maintains a substantially constant output pressure by return-bypassing a portion of the fuel supplied in excess of engine demand, the regulator discharging the excess bypassed fuel through its outlet 28 into the upper region of reservoir chamber 121 of canister 120. In normal operation of the pump, fuel in the reservoir canister 120 rises to a level which is usually adjacent or somewhat below the open upper end 122 of canister 120. In some normal operating conditions, such as extended periods of the engine idling or operating under a lower load, the fuel rises to the top of canister 120 and overflows through the open upper end 122 of the canister into the main body of fuel in the swivel pot 112 or into the fuel level is above the swivel pot tank.

Under low tank fuel level conditions the pump inlet 16 can be starved when the remaining fuel in the tank moves away from both the primary filter 176 as well as secondary diaphragm filter 160, such as during the aforementioned cornering of the vehicle and/or severe inclination of the tank. The filter screen mesh material of both diaphragm filter 160 and main filter 176 will likewise be starved of fuel but will remain wet with fuel. Under these conditions, air in the main tank being drawn toward the pump inlet by pump suction will try to pass through these filter materials. However these wet filters will reject the passage of air due to the liquid capillary seal of these wet filter materials. The pressure drop in chamber 186 below diaphragm filter 160 created by the pump will then cause the filter to act as a diaphragm to move it downwardly. This motion will compress spring 168 and lower the material of filter 160 downwardly off its neck seat 182 to thereby open communication via the relatively large diameter outlet 144 between reservoir chamber 121 and the area over the upper surface of filter 160. Reserve fuel may then flow rapidly downwardly from the reservoir canister outlet and laterally over and through diaphragm 160 into main filter chamber 186, and thence to the pump inlet to thereby keep fuel flowing to the engine, and without breaking the capillary sealing effect across filters 176 and 160 due to system balancing of forces. When fuel is again available from the main body of fuel into the tank to again submerge main filter 176 the capillary seal effect will be broken across filter 176, thereby allowing fuel to pass through primary filter 176 and into chamber 186 to feed the pump inlet. This inflow also reduces the downwardly acting pressure differential on secondary filter diaphragm 160. Also, if diaphragm 160 is likewise re-immersed in tank fuel the capillary seal effect across filter 160 will also be broken. This allows spring 168 to force the filter 160 upwardly back to its normal position adjacent canister outlet seat 182. If rubber seal 161 is present on diaphragm 160 it will be reclosed on seat 182 by spring 168 to thus stop the flow of reserve fuel from reservoir 121 to the pump inlet 16.

If seal 161 is not present on filter 160, canister outlet 144 will still be closed, but not sealed, by the mesh filter material forced across seat 182. Hence a controlled but continuous flow of reserve fuel will occur from reservoir 121 through the center portion of permeable zone 161, through spring cup orifice 166 and through the spaces between the coil of spring 168 into main filter chamber 186. Thus when tank fuel level is below the top of the canister, the pump will draw from the reservoir and tank in an inverse ratio to maintain by the pressure balancing effect a reserve head of fuel in the canister.

As in the first embodiment of FIGS. 1 and 2, cup orifice 166 is calibrated (e.g., 0.40 mm diameter) to provide the aforementioned "balance" to maintain a maximum head of reserve fuel in canister 120 and a minimum overflow from a canister during normal fuel delivery system operation. This assures that a sufficient quantity of reserve bypass fuel will be available for pump input draw when the pump inlet is starved of fuel from the main tank, while also maximizing return of twice filtered bypassed fuel during normal pump operation under non-starvation conditions.

In addition, at system shut-down, when the vehicle engine is turned off, and whenever a gravity head pressure differential exists due to the level of fuel in reservoir 120 being above that of the main body of fuel in the tank, the reserve fuel will drain from reservoir 121 through filter 160 and cup orifice 166 into the main filter chamber 186 and then out through primary filter 176 and secondary filter 160 into the tank. This reverse fuel flow through these filters will produce a backwash effect on both filters 160 and 176 tending to wash away tank contaminant particles clinging to the exterior surfaces of these filters. Therefore the rate at which these filters can become clogged over the operational life of the system is greatly reduced.

When diaphragm 160 is made imperforate in its central region 161 by the provision of the aforementioned rubber sealing material for engagement with canister valve seat 182, and/or by the provision of an imperforate spring cup 164 (orifice 166 not provided therein) system shut down gravity differential flow of reserve fuel via bottom outlet 144 can be substantially if not completely prevented by spring 168 closing the filter diaphragm valve structure. In this event the quantity of reserve fuel available for system start up can be preserved for greatly prolonged periods of shut down even under low main tank fuel level conditions.

Moreover, with either type of canister valve closing mode (i.e., with or without always-open canister fuel flow through outlet 144 and calibrated orifice 166), whenever the pump-induced fluid pressure differential acting between main filter chamber 186 and filter diaphragm 160 becomes operable to pull diaphragm 160 downwardly to unseat the same from outlet valve seat 182 (as when filter 176 and 160 are starved of main tank fuel) the resultant increased flow of fuel from outlet 144 onto the upper surface of diaphragm 160 (which can be at a much higher flow rate than that through orifice 166), as indicated by the arrows in FIG. 6, has a "fountain-washing" effect on the upper exterior surface of filter 160. This effect is enhanced by the cooperative geometry of filter diaphragm 160, i.e., being raised in the center by spring 168 and recessed downwardly therefrom in a conical formation out to the periphery of the filter at diaphragm retainer 162. This down-flow of fuel as it exits outlet 144 tends to radially spread out in a full circle pattern as it is initially flowing along the exterior surface of filter 160 radially outwardly of the central area 161, and as it is being drawn by the pressure differential through filter 160 into chamber 186. Hence this fountain flow tends to keep the exterior surface of filter 160 washed free of contaminant clogging, particularly in an annular zone immediately adjacent and surrounding central region 161. Secondary filter 160 therefore tends to remain unclogged by tank contaminants for a longer period than primary filter 176 because of this fountain washing effect, and also due to the disposition of secondary filter 160 at a higher elevation than primary filter 176, i.e., on the top side of base 130 versus the underside thereof. This system operational effect provides an enhanced fail-safe feature insofar as it provides an auxiliary fuel inflow path from the main tank body of fuel through secondary filter 160 in parallel with that through primary filter 176 to main filter chamber 186 and thence to pump inlet 16. Hence even when primary filter 176 is severely clogged with tank contaminants the fuel delivery system can remain operable for a prolonged period by drawing fuel from the main body of fuel in the tank through only secondary filter 160.

It is also possible with the system of the second embodiment of the invention to vary by empirical design the balance between the upward bias of spring 168 versus the forces generated by fluid pressure differential between canister fuel head versus that of the tank, and the forces generated by pump suction, so that there is a supplementary and variable canister outflow of reserve fuel passing through filter 160 into chamber 186 additive to the flow through cup orifice 166 and at a much greater flow rate. Such fuel draw from canister reservoir 121 thus can be designed to occur in parallel balance with, and concurrently with, pump fuel draw from the tank through filters 176 and 160 under non-starvation conditions.

It will be noted that the valve structure of filter diaphragm 160 is arranged to open in the direction of flow out of canister outlet 144 into main chamber 186, and likewise to open in the direction of flow from the main body of fuel tank through filter diaphragm 160 into chamber 186, and to merge toward the pump inlet 16, under both starvation and non-starvation conditions. Hence operation of pump 14 will tend to open canister outlet 144 under both conditions but with varying effect depending on which of these conditions are effective or controlling at any given time. Thus the variable flow rate control provided by the fixed calibrated orifice 166 can be modulated and augmented by the variable downwardly opening action of diaphragm 160. Thus orifice 161 and spring 168 can be designed to work together to better achieve canister bypass fuel head balancing conditions in order to match system operational and performance parameters in achieving the aforementioned maximization of return of bypass fuel to pump inlet during normal system operation under non-starvation conditions.

Indeed, even when orifice 166 is omitted and spring cup 164 made imperforate, and/or an imperforate rubber seal is provided in the central region 161 of filter diaphragm 160, this balancing of canister head level to minimize canister overflow and maximize return of canister bypass fuel to the pump can be obtained by design and selection by spring 168. Thus spring 168 can be selected to exert a very light upwardly biasing force on filter diaphragm 160, i.e., only sufficient to maintain outlet 144 closed and sealed at system shut down when opening pressure differential across the valve is created only by gravity head differential between canister head and main tank head. This at most may only be 4 to 8 inches of fuel in canister 120 when the main tank is empty. When the fuel delivery system is operational with the vehicle engine running the increased pressure differential acting on diaphragm 160 in response to the effect of pump suction at inlet 16 will be additive to such gravity head generated pressure differential, and spring 168 can be designed to then yield in a downwardly valve opening direction under such conditions.

It is also possible to still obtain the filter backwash effect even with an imperforate valve member provided on or in association with filter diaphragm 160 and central region 161. Thus at system shut down spring 168 can be selected to allow leakage of bypass fuel from reservoir 121 from say completely full to half full whenever the main tank is empty or at some very low level condition. Although this backwashing effect may thus not occur very often during the service life of the vehicle and fuel delivery system, even creating the possibility of such an event occurring infrequently can enhance operational life of the fuel delivery system. Moreover, it is precisely at these very low tank fuel level conditions that filter clogging conditions become aggravated because contaminant concentration at the filters increases for a fixed quantity of contaminant particles in the fuel tank as the volume of the main fuel body in the tank decreases. Also for this reason maximizing use of twice-filtered fuel through the pump becomes more beneficial in proportion to the drop in main tank fuel level in preventing fuel injector clogging and/or downstream fuel line filter clogging.

Hence the second embodiment of the invention readily can be made operable, as in the system of the aforementioned U.S. Pat. No. 4,747,388 such that reserve fuel is drawn from the canister reservoir 121 only as and when needed to keep fuel flowing to the engine under main tank pump starvation conditions. Module 120 can thus provide a large reserve fuel capacity to ensure extended vehicle operation under tank empty conditions, or for restarting the vehicle when parked on incline with a low tank fuel level. On the other hand, when the aforementioned filter backwashing capability at system shut-down is provided, and hence canister 120 loses some volumetric capacity reserve duration by loss to backwash outflow, it still is possible to obtain both beneficial effects, albeit each to a lesser extent. Again, mounting pump 140 directly in the main body of the fuel of the tank, outside of canister 120, enhances pump cooling and isolates it from any hot fuel conditions which may occur within the canister reservoir.

Also, in accordance with another one of the aforementioned features of the invention, the second embodiment enables the use of a turbine vane type rotary pump with a built-in vapor purging system to be operable as intended and in an enhanced manner, while still providing all of the advantages of a large reserve supply of fuel selectable as needed from the associated canister reservoir. Again it will be seen that the outlet of vapor purge port passage 35 is only slightly above the elevation of the pump inlet 162, as well as being laterally adjacent the bottom region of the reservoir chamber 121 of canister 120. In addition at least once-filtered fuel exiting pump chamber 33 via purge port 35 is returned to the main filter chamber 186 via trough 150 and filter diaphragm 160. Hence this now twice-filtered additional bypass fuel is returned to the pump inlet instead of being wasted by uncontrolled outflow to the tank fuel body. This further conservation of bypass fuel use again becomes particularly beneficial under very low tank level and/or pump starvation vehicle operational conditions.

The spoked spring retainer disc 170, filter diaphragm valve 160 and spring 168 provide a simple and economical valve actuating mechanism for opening and closing flow of reserve fuel to pump 14. In one mode of operation of valve 160 no reserve fuel will be lost to the tank when not needed by pump 14. On the other hand, since the pressure head of fuel in canister 120 acts in the direction tending to unseat valve 160, spring 226 can be made inexpensively as a light spring exerting minimal biasing force to allow diaphragm valve 160 to augment orifice flow and/or provide filter backwash flow.

In addition, locating the pump vapor purge passageways outside the reservoir canister also removes this reserve fuel reverse leak path through the pump when it is shut down, thereby eliminating the need for a pump inlet back check valve or foot valve type canister containment structure otherwise required to prevent such canister leak down through the pump vapor purge passageway.

Base 130, due to its use of flat, circular geometry in its multiple components, as herein disclosed in the form of the engineering scale views of FIGS. 11–33, is readily and economically manufacturable with plastic injection molding processes and equipment from a suitable fuel-compatible plastic, such as Acetal (except for the filter screen material of filters 160 and 176). Preferably the filter screen material is 70 micron mesh nylon 6 square weave for primary filter 176, and 62 micron mesh nylon 6 square weave for secondary filter diaphragm 160. The telescopic stack-up array of components 160, 162, 168 and 170 upwardly into base flange 133, and similarly the telescopic insertion of main fuel filter components 172, 184 and 176 into base flange 184, provide economies in part and assembly costs as well as service costs. The snap-together assembly of the pump and canister components on base 130 also contribute to manufacturing cost reduction.

Third Embodiment

Figure 34:
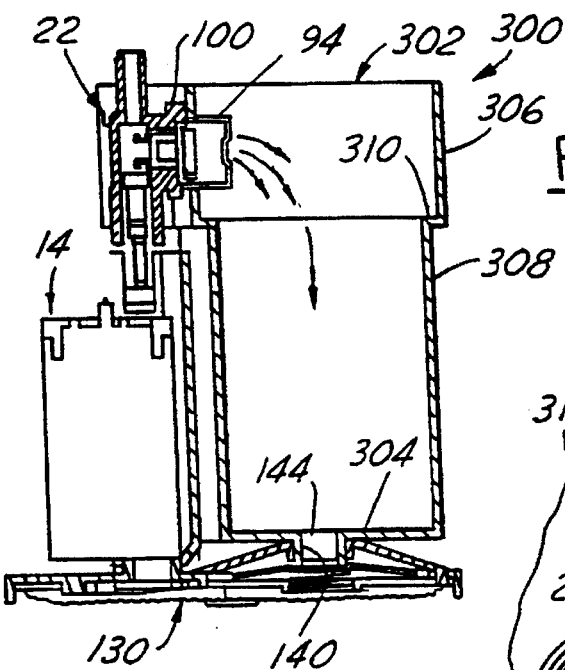
FIG. 34 is a simplified, part elevational and part center sectional view of a third embodiment fuel pump and reservoir canister module assembly of the invention utilizing the fuel pump and base subassembly of the second embodiment.
Figure 35:
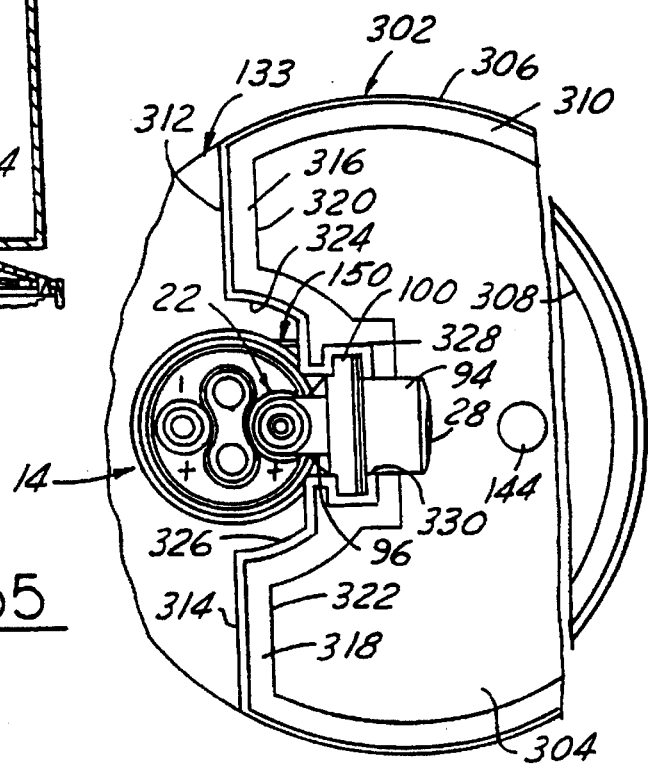
FIG. 35 is a top plan view of the assembly of FIG. 34, greatly enlarged thereover and with a portion of the base broken away.
Figure 38:
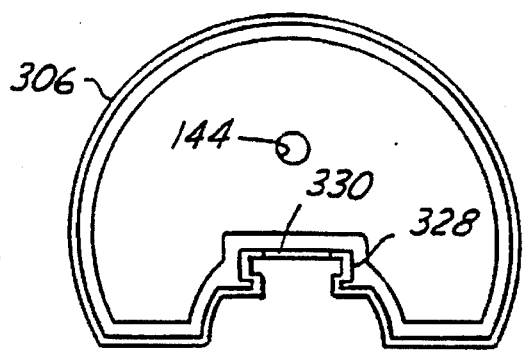
FIGS. 38 and 39 are top and bottom plan views respectively of the reservoir canister of FIGS. 34-37.
Figure 37:
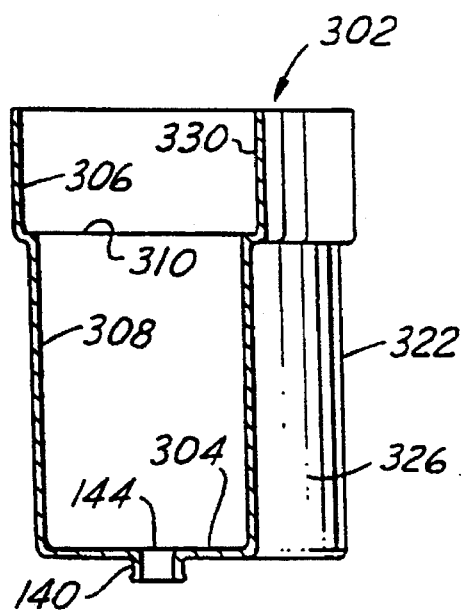
FIG. 37 is a cross-sectional view taken on the line 37—37 of FIG. 36.
Figure 36:
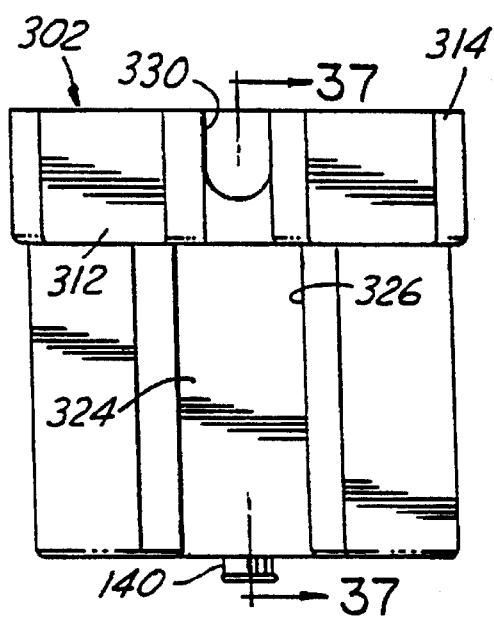
FIG. 36 is a side elevational view of the reservoir canister of the assembly of FIG. 34.
Figure 39:
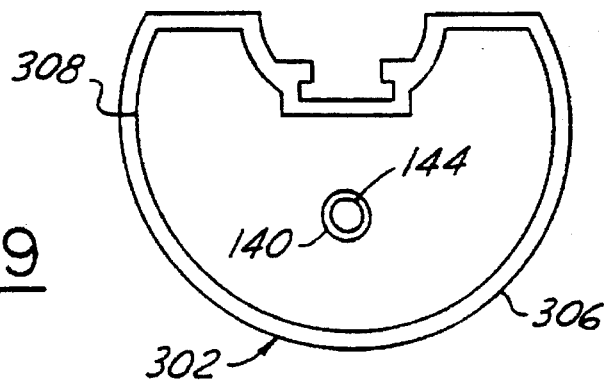

FIGS. 34–39 illustrate a third embodiment pump/canister/base module assembly 300 of the invention that utilizes the same pump assembly 14, bypass regulator subassembly 22 and base subassembly 130 as module assembly 110. However module assembly 300 uses a modified canister reservoir 302 constructed as shown to scale in FIGS. 34–39. Canister 302 has a generally "D-shape" in horizontal cross section, as best seen in FIGS. 35, 38 and 39. The bottom wall 304 of canister 302 is again provided with the neck outlet 140 to snap fit with mounting neck 136 of base spider 134 (FIG. 34). A major portion of the vertically oriented side wall of canister 302 is made up of cylindrically shaped upper and lower wall sections 306 and 308 integrally joined by a horizontal shelf wall section 310. The outside diameter of upper wall section 306 is made to the same as that of flange 133 so that the overall horizontal dimension of canister 302 does not increase the overall diameter of module assembly 300. Canister 302 is indented in its side wall formation in the area of pump 14 so that the pump has a recessed mounting relative to canister 302. For this purpose canister 302 has two upper chordal wall sections 312 and 314 joined by shelf wall sections 316 and 318 respectively to complemental lower chordal wall sections 320 and 322, wall sections 312 and 314 being generally coplanar with the axis of pump 14. The canister side wall indentation adjacent pump 14 is formed by pocket walls 324 and 326 of concave curvature facing pump 14, and these are joined by a T-cross section wall section 328 (FIGS. 35, 38 and 39).

Pump 14 nests in the space between wall sections 324 and 326 and is mounted on base 130 in the same manner and location as in module assembly 110. However flange 100 of the bypass regulator 122 has a complemental downwardly sliding insertion fit into the T-section cavity of the T-wall 328, as best seen in FIG. 35. This sliding insertion T-lock interengagement between regulator flange 100 and canister wall T-section 328 provides the upper module support interconnection for the pump and canister. Their snap-in mounting on base 130 provides the lower module support interconnection. Wall T-section 328 is provided with an upwardly opening notch 330 for receiving the cylindrical portion 94 of pressure regulating housing 96. The regulator outlet 28 thus protrudes into the uppermost region of canister 302 with maximum spacing from the opposed face of upper wall section 306 and is generally vertically aligned above canister outlet 144.

It will thus be seen that canister 302 maximizes the space available above base 130 to thereby increase bypass reserve fuel capacity of module assembly 300. For example when base flange 133 has an outside diameter of 5 inches and canister 302 is constructed to the scale of FIGS. 34–39 relative to base 130, the canister may have a reservoir capacity of approximately 700 to 750 millimeters. By contrast, canister 120 when configured as shown in FIGS. 3–6 and constructed to the scale of FIGS. 7–10 relative to the same diameter base 133 has a capacity of approximately 300 millimeters. Thus although canister 302 is slightly more costly in terms of material and tooling costs than canister 120, the large increase in reserve capacity provides an economical cost/benefit ratio in many applications that still require a relatively small outside diameter module to fit within relatively small tank openings. In addition, all of the previously described features and advantages of module assembly 110 are still obtained with module assembly 300.

Fourth Embodiment

FIGS. 40, 41 and 42 illustrate a fourth embodiment of the invention that also utilizes the feature of the invention of mounting a turbine vane fuel pump, having a built-in vapor purging system, outside of, but closely adjacent to a canister reservoir so that the pump and its vapor purge outlet are mounted directly in the main body of fuel in the tank. In the fourth embodiment, a fuel pump/canister module 410 is provided of the bottom seeking type and adapted for a drop-in installation through an opening 412 in the top wall 24 of tank 12. Module 410 thus comprises a generally cylindrical tank flange cover assembly 414 which serves as a mounting head for module 410. Cover 414 has a peripheral flange 416 which seats on and is suitably removably and sealably secured to tank top wall 24, and is closed at its upper end by a top wall 418.

Module 410 also includes a reservoir canister 420 telescopically received at its open upper end on end 422 to the interior head space of cover 414 which in turn communicates with the head space or vapor dome in the interior of tank 12. Canister 420 is provided with a slot 424 which receives an angled barb 426 of a guide finger 428 of cover 414 to thereby circumferentially orient canister 420 with cover 414 while permitting vertical telescopic travel during tank bottom seeking movement of canister 420 relative to head 414.

Module 410 further includes a base subassembly 430 of generally cylindrical configuration diametrically sized to slip through opening 412 when inserting the module into opening 412 of tank top wall 24. Base 430 is open at the bottom and provided with a ported rim or legs 432 adapted to seat on the tank bottom wall 70. Base 430 has a septum or midwall 433 from which protrudes integrally upwardly a specially configured mounting boss 434. Base 434 carries a cap piece 436 on internal shoulder 438, and a sheet of secondary filter material 438 is captured between cap 436 and shoulder 438 so as to span a canister outlet opening 440 formed by an upwardly protruding neck 442 of cap 436. Base 430 is snap-fit assembled to the lower end of canister shell 420.

Module 410 additionally includes a turbine type fuel pump 450. Canister 420 is specially shaped to provide an exterior side nesting space for accommodating pump 450 in nested relation along one side of canister 420 such that pump 450 in assembly does not protrude beyond the exterior dimensions of base 430 to thereby fit module 410 within tank top wall opening 412 when pump 450 is in assembled relation as part of module 410. Canister 420 thus is formed with a lower reservoir portion 452 of reduced cross sectional area having a side wall with a flat indented portion 454 and an exteriorly concavely curved portion 456 (FIG. 41) extending below a midlevel shelf 458 (FIG. 42). Indented wall portion 454 forms a convenient nested surface for mounting thereon a conventional fuel level sensing sender unit 458 (FIG. 42). Sender unit 458 has the usual level sensing float 460 mounted on an arm 462 pivoted to unit 458 in the usual manner. Arm 462 can swing so float 460 can be dropped below module 410 when inserting the same through tank wall opening 412. The lower end of reservoir portion 452 has a bottom wall 464 shaped to seat on end cap 436 and a central neck 466 receiving cap neck 440 therein. Boss 434 is provided with slots 468 and 470 which receive barbs 472 and 474 of shell portion 452 when the bottom end of canister 420 is telescopically snap fit into base boss 434.

Base wall 434 in the pump recess area of canister 420 is provided with a flanged opening 479 to receive an anti-rotation rubber grommet seal 480. When base 430 is snap fit to canister 420, a pump inlet boss 482 is also sealably received with a press fit in grommet 480 to thereby mount the lower end of the pump on base 430 (after pump 450 has been pre-assembled to cover 414).

Pump 450 has a pump outlet extension tube 484 protruding upwardly from its upper end and fitted with a reduced diameter tubular stem 486 open at its upper end 488 (FIG. 42). Cover 414 is provided with a downwardly protruding cylindrical boss 490 which carries a U-cup seal 492 retained on the lower end of the boss by a seal retainer cup 494 press fit onto the lower end of boss 490. A compression coil spring is sleeved on stem 486 and abuts at its opposite end coils against retainer 494 and a shoulder 498 formed at the junction of outlet tube 484 and stem 486. Spring 496 provides the tank bottom seeking biasing force for telescoping canister shell 420 downwardly relative to cover 414 and the biasing force for yieldably holding the canister bottomed in the tank.

The space in base 430 between cap 436 and septum 433 in assembly defines a valve chamber 500 communicating via opening 440 with the lower reservoir chamber 502 of canister 420. The space below septum 433 and above tank bottom wall 70 defines a diaphragm filter flow chamber 504 communicating with pump inlet 482. A conventional plastic mesh filter membrane 506 is affixed at its periphery to the inner surface of rim 432 and spans across the bottom of chamber 504. A reinforcing perforated circular disc overlies most of the area of filter 506 centrally thereof but allows fuel to pass through the major area of the filter. Disc 508 preferably is in the form of a open spoked wagon wheel with a hub 510 connected by spokes 512 to an encircling rim 514. A canister reservoir outlet valve 520 is disposed in chamber 500 and has a rim forming a valve member which seats on an annular valve seat 522 formed as an upward protrusion of base wall 434. Valve 520 has a stem 524 abuttingly engageable on disc hub 510 so that the valve and disc move as a unit in response to up and down flexing of filter 506. A conical coil spring 526 is abutted between a shoulder seat on the underside of wall 434 and the upper surface of hub 510 to yieldably bias disc 508 and hence filter 506 downwardly against tank wall 70 under normal operating conditions when the body of tank fuel surrounds at least the lower end of module 410.

As best seen in FIGS. 41 and 42, cover 414 has three integral fluid flow connection fittings protruding upwardly and laterally from its upper surface at the tank exterior adapted for a return-type fuel delivery system. A tank vent fitting 540 contains a conventional roll-over stop valve (not shown) and provides exterior venting communication for the tank vapor dome via the interior head space of cover 414. A fuel pump outlet fitting 542 communicates at its interior end with the interior of cover boss 490 and has a nipple to receive the inlet end of a suitable fuel line hose 544 leading to the fuel rail 546 of vehicle engine 548 (FIG. 40). A fuel return fitting 550 connects a by-pass fuel return line hose 552 to the head space of module 410. A conventional by pass pressure regulator 554 is connected between fuel delivery line 544 and bypass line 552 downstream of rail 546 and preferably is mounted to the intake manifold 556 of engine 548. Regulator 554 operates in the manner of regulator 22 as described previously to regulate fuel pressure delivered to fuel rail 546 and to bypass fuel via line 552 back to reservoir canister 420 of module 410. A suitable electrical connector for the electric motor of pump assembly 450 and for the fuel level sensor 458 is also provided in the tank flange cover assembly 410 (not shown).

Fuel pump assembly 450, like pump assembly 14, contains a turbine vane type rotary pump containing the pumping chamber 33 and purge outlet passage 35 (shown schematically in broken lines in FIG. 42) which operate in the manner described previously in conjunction with pump assembly 14.

In use, the fuel pump and canister module 410 is mounted in the fuel tank 12 with the reservoir canister 420 extending generally vertically so that primary fuel filter 506 is disposed immediately adjacent the bottom wall 70 of the fuel tank and preferably resting thereon. In normal use the fuel tank is at least partially full of liquid fuel, such as gasoline, to a level above filter 506 so that the filter and the pump inlet 482 are completely submerged in the main body of tank fuel.

As in the first embodiment, in the normal operation of pump 450, fuel is drawn from the main body of fuel in the tank via filter 506 into pump inlet 482 and discharged from the pump outlet extension tube into the sealed cavity of boss 490 and thence via fitting 542 and line 544 to fuel rail 546 at substantially constant pressure, such as 50 psig. Again regulator 554 maintains a substantially constant output pressure by return-bypassing a portion of the fuel supplied in excess to engine 548, the regulator discharging the excess bypassed fuel through its outlet and via line 552 and fitting 550 into the upper reservoir chamber 503 of canister 420. In normal operation of the pump, fuel in the reservoir canister 420 rises to a level which is usually adjacent or somewhat below the open upper end 422 of canister 420. In some normal operating conditions, such as extended periods of the engine idling or operating under a lower load, the fuel rises to the top of canister 420 and overflows through the upper end 422 of the canister, and then flows downwardly between the wide clearance between the canister portion 452 and the wall of cover 414 and thus into the main body of fuel in the tank.

Under low tank fuel level conditions the pump inlet 482 can be starved when the remaining fuel in the tank moves away from the primary filter 506 such as during the aforementioned cornering of the vehicle and/or severe inclination of the tank. Filter screen diaphragm 506 will likewise be starved of fuel but will remain wet with fuel. Under these conditions, air in the main tank being drawn toward the pump inlet by pump suction will try to pass through the filter material. However the wet filter will reject the passage of air due to the liquid capillary seal of the wet filter material. The pressure drop above filter 506 created by the pump will then cause the filter to act as a diaphragm to move it upwardly. This motion will compress spring 526 and lift valve 520 off of its seat 22 to thereby open communication between valve chamber 500 and filter chamber 504. Reserve fuel may then flow downwardly from the reservoir canister and laterally through chamber 504 to the pump inlet 482 to keep fuel flowing to the engine. When fuel is again available from the main body of fuel in the tank to again submerge filter diaphragm 506 the capillary seal effect will be broken, thereby allowing spring 526 to force the filter diaphragm 506 back to its normal position adjacent tank bottom wall 70, thereby also allowing valve 520 to be reclosed on seat 522 by reservoir fuel head pressure to thus stop the flow of reserve fuel to the pump inlet and to prevent loss of reserve fuel from the reservoir to the tank via filter 506 when not needed by the pump.

Hence in the fourth embodiment of the invention, as in the system of the aforementioned U.S. Pat. No. 4,747,388, reserve fuel is drawn from the canister reservoir only as and when needed to keep fuel flowing to the engine under main tank pump starvation conditions. In addition, module 410 may still have a large reserve fuel capacity, such as one liter, to provide extended vehicle operation under tank empty conditions, or for restarting the vehicle when parked on incline with a low tank fuel level. Even though canister 420 loses some volumetric capacity by the indenting of the side walls to accommodate nesting of pump 450 and sensor 458, mounting pump 450 on the outside of the canister substantially makes up for this canister capacity loss by the removing the pump displacement present in an in-canister pump mounting. Again, mounting pump 450 directly in the main body of the fuel of the tank enhances pump cooling and isolates it from hot fuel conditions within the canister reservoir.

Also, in accordance with one of the aforementioned principal features of the invention, the second embodiment enables the use of a turbine vane type rotary pump with a built-in vapor purging system to be operable as intended and in an enhanced manner, while still providing all of the advantages of a large reserve supply of fuel selectable as needed from the associated canister reservoir. Again it will be seen that the outlet of vapor purge port passage 35 is only slightly above the elevation of the pump inlet 482, as well as being laterally adjacent the bottom region of the reservoir chamber 502 of canister 420. In addition, locating the pump vapor purge passageways outside the reservoir canister also removes this reserve fuel reverse leak path through the pump when it is shut down, thereby eliminating the need for a pump inlet back check valve or foot valve type canister containment structure otherwise required to prevent such canister leak down through the pump vapor purge passageway.

The spoked disc 508, valve 520 and spring 526 provide a simple and economical valve actuating mechanism for opening and closing flow of reserve fuel to pump 450. Due to the operation of valve 520 no reserve fuel will be lost to the tank when not needed by pump 450. Since the pressure head of fuel in canister 420 acts in the direction tending to seat valve 520 closed, spring 526 can be made inexpensively as a light spring exerting minimal biasing force.

Fifth Embodiment

FIGS. 43–49 illustrate a fifth embodiment of a fuel pump/reservoir canister module assembly 600 of the invention adapted for use in no-return type fuel delivery system. Module 600 includes a suitable tank flange cover assembly 602, which may be constructed similar to previously described cover 414, a reservoir canister 604, a base subassembly 606, a turbine-vane type electrically driven fuel pump assembly 608 mounted exteriorly of but on canister 604 and base 606, a conventional bypass pressure regulator 610 mounted on the outlet of pump assembly 608 and a floating ball back check valve and filter cage subassembly 612 mounted within the reservoir of canister 604. Canister 604 is telescopically mounted in cover 602 as before for tank bottom seeking. The outlet tube 614 of regulator 610 may be sealingly and slidably received within a boss receptor 616 of cover 602, similar to that of cover 414, or a flexible loop of base 617 (FIG. 48) may be used to connect the pump outlet to a fuel delivery fitting in cover 602. Bypass regulator 610 has a bypass outlet 618 oriented to discharge bypass fuel from pump assembly 608 into the reservoir chamber 620 of canister 604, similar to the operation of bypass regulator 22 of the first embodiment.

Canister 604, like canister 420, is constructed with an indented side wall 622 for nested mounting of pump assembly 608 within the overall lateral outside dimensions of module 600. The upper end cap 40 of pump assembly 608 is mounted by a suitable sealing grommet 624 (see also FIG. 48) such that the upper outlet 625 of the pump protrudes above a canister recess shelf 627 into the interior of a weir wall 629 of the canister. The pump inlet fitting 626 of lower end cap 38 is sealably inserted with a press fit into a grommet 628 of base subassembly 606 when the base subassembly is assembled to the bottom of canister 604. As before pump assembly 608 includes a rotary pump 630, with a pumping chamber 632 and associated purge port passage 634, all shown semi-diagrammatically by hidden lines in FIG. 43.

In accordance with the one feature of the fifth embodiment module 600, base subassembly 606 is adapted for press fit assembly to canister 604 and pump assembly 608. Base 606 is designed for economical mass production from injection molded plastic parts and is also the preferred construction for use in module 410 in place of base 430. Base 606 includes a circular imperforate top wall body 640 having an upwardly protruding valve seat boss 642 adapted to slide with a press fit within the annular rim 644 of an upwardly protruding annular boss 646 integrally formed in the bottom wall 648 of canister 604. An O-ring 650 encircles boss 642 and is captured between the rim 644 and a shoulder 652 of boss 642. A poppet type valve 654, similar to valve 520, has a flange 656 which operates as the valve member to close downwardly on valve seat 658 of boss 642. Valve 654 has a valve stem 660 slidably in a central bore 662 of boss 642. A coil spring 664 is sleeved at its upper end on a keeper protrusion 666 of boss 642, encircles valve stem 660 and bottoms at its lower end on a shoulder of an enlarged conical head 668 of valve stem 660. The upper end of stem 660 may be attached to head 670 of valve 654 after assembly of the valve stem and spring to body 640.

Base subassembly 606 also includes a primary filter subassembly 680 shown by itself in FIG. 45 and in the associated fragmentary enlargements thereof in FIGS. 46 and 470. Filter subassembly 680 includes a circular plastic mesh filter screen sheet 682 which may be constructed of the material and with the pore size of the filter sheets of primary filters 506 and 50 described previously. Preferably the outer peripheral portion 684 of filter screen 682 is embedment molded into an annular plastic mounting ring 686 in a plastic injection molding process. Mounting ring 686 has a radially inwardly directed and downwardly inclined integral lip 688 which overlies the annular portion of sheet 682 leading out to its entrance into the plastic material of ring 686. The cone angle A with lip 688 (FIG. 46) is preferably about 30°.

A wagon wheel type disc retainer 690, similar to retainer 508, is centered on and overlies the major area of filter screen 682. Disc 690 has a hub boss 692 protruding upwardly from its center for operable abutment in assembly with the lower end head 668 of valve stem 660. Each of the eight disc spokes 694 radiate from hub 692 and are integrally joined to a circular rim 696 of disc 690 (FIG. 45). Preferably the material of filter screen 682 is 30 micron mesh nylon 6/12 square weave and the material of mounting ring 686 as well as that of disc 690 is also nylon 6/12. Disc 690 has stand off projections 696 protruding downwardly, one from each leg 694 which are inserted through screen 682 when disc 690 is heat sealed or suitably welded plastically to filter screen 682.

The underside of body 640 has a slightly concave configuration inclined upwardly toward pump inlet 626 and is provided with an annular groove 700 (FIG. 44) into which mounting ring 680 is received with a press fit. Preferably mating plastic weld projections 702 and 704 are provided respectively on ring 686 and the upper surface of groove 700 adapted for axially overlapping interengagement and ultrasonic welding of ring 686 to body 640.

Figures 43, 44:
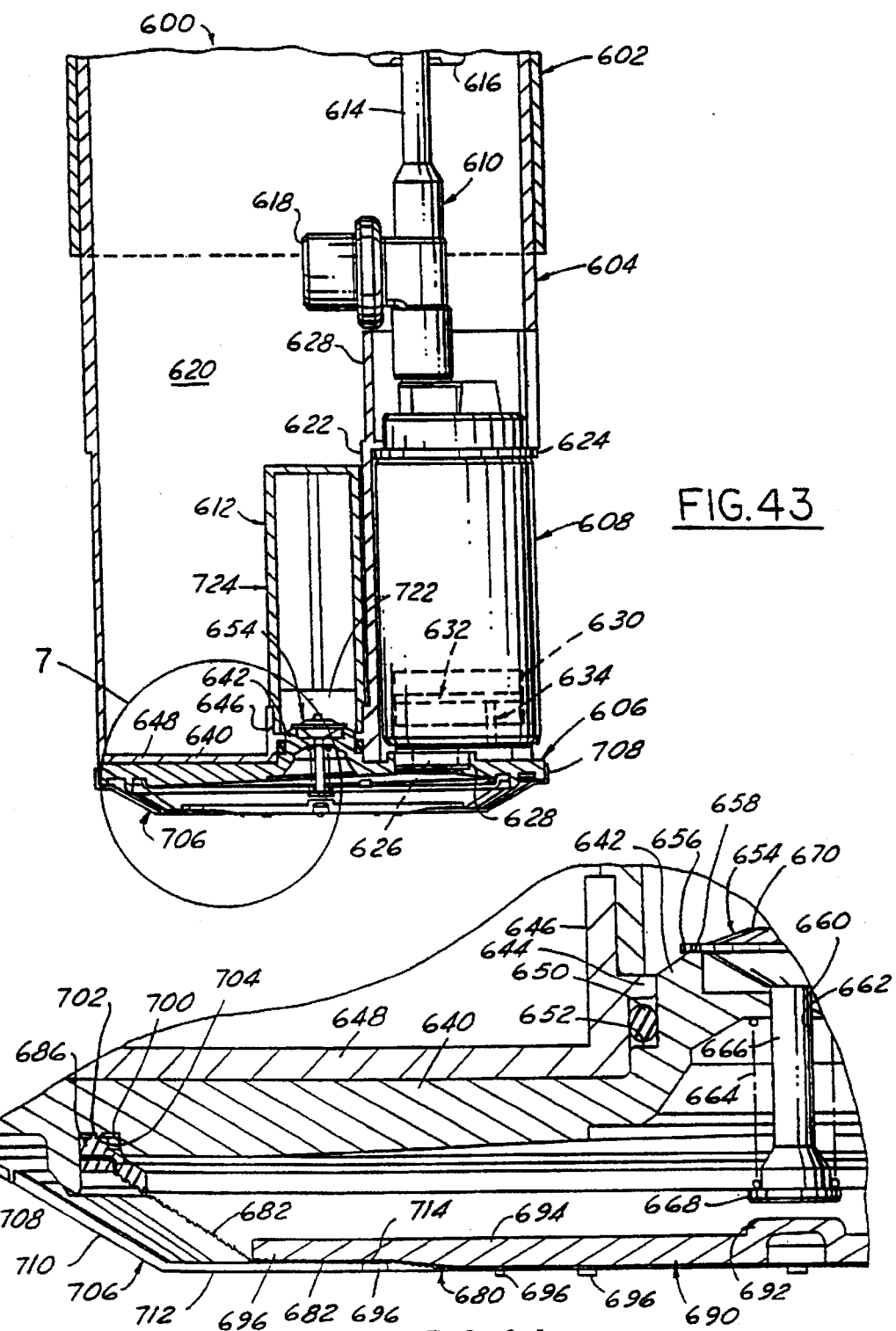
FIG. 43 is a fragmentary center sectional (and somewhat simplified) view of a fifth embodiment a fuel pump and reservoir canister module of the invention.
FIG. 44 is a fragmentary center sectional view of the portion of FIG. 43 encompassed by circle 7 of FIG. 43 and greaterly enlarged thereover.
Figure 50:
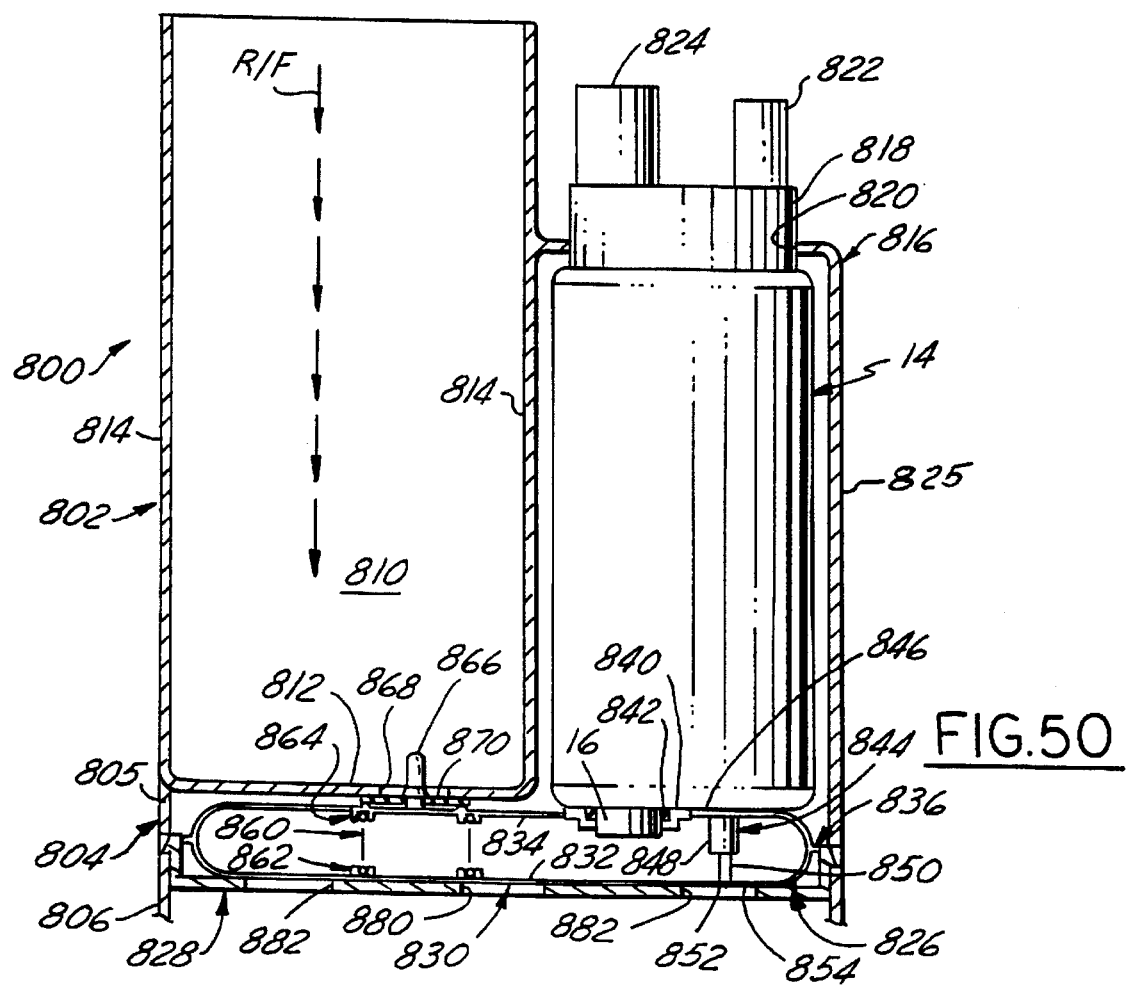
FIG. 50 is a center sectional (and somewhat simplified) view taken on the line 50—50 of FIG. 51 of a sixth embodiment of a fuel pump and reservoir canister module of the invention.

Base assembly 606 also includes a plastic injection molded guard ring 706 that underlies filter screen 682 to provide a rigid support for module 600 when resting on the bottom wall 70 of the fuel tank. Guard ring 706 is in the form of an annular grating with an encircling peripheral L-flange 708 adapted for press-fit assembly to the perimeter of body 640 (FIG. 43). Guard ring 706 has an array of downwardly inclined spokes or ribs 710 which extend radially inwardly from flange portion 708 at an angle complemental to angle A which merge at their radially inward ends with an integral flat annular disc portion 712 that underlies and radially overlaps the outer periphery of disc 690 and terminates at a radially inner edge 714 spaced radially outwardly of stand off protrusions 696.

In assembly of base 606 to canister 604 and pump assembly 608, the base is held by the press fit of boss 642 into canister protrusion 646 and by the press fit of grommet 628 onto pump inlet 626.

As best seen in FIGS. 48 and 49, the filter and back check valve subassembly 612 of module 600 preferably includes a secondary cylindrical filter screen 720 and bouyant back check valve ball 722 housed within a ribbed age 724 having a closed top and a cylindrical open base 726 adapted for press fit onto the upper end of mounting boss 646 with a valve seat disc 728 captured therebetween, and located upstream of valve 654.

The operation of fifth embodiment module 600 is similar to that of module 410 except that bypass pressure regulator 610 is mounted internally of canister 604 to discharge directly into canister reservoir 620 in a manner similar to the operation of regulator 22 of the first embodiment module 10. Reservoir valve 654 is operated on demand by the diaphragm filter 682 and associated reinforcing disc 690 in the manner of diaphragm 506, disc 508 and valve 520 of module 110 described previously.

However, with the addition of back check valve subassembly 612 in the interior of reservoir chamber 620, when the level of fuel in the reservoir drops sufficiently to allow the floating valve ball 722 to engage its seat 728 no further fuel and/or air can be drawn by pump assembly 608 from reservoir chamber 620. Hence even if conditions are such as to cause filter diaphragm 682 to lift valve 654 open pump assembly 608 cannot then draw air into the pump from an otherwise completely empty reservoir 620.

For example, assume the vehicle had been disabled by "running out of gas", i.e., run until both the main fuel tank 12 and canister 604 were empty of fuel, and then a small amount of fuel were poured into the tank (such as from one gallon spare gas can). Assume also that filter screen 682 was partially clogged by tank dirt or debris. Upon re-starting of pump assembly 608, filter 682 possibly then could be drawn upwardly far enough to crack open reservoir valve 654.

If the reservoir back check valve 722 were not present to close communication between the pump and canister chamber 620, under such conditions the pump would then draw air from the canister and would not prime itself to start pumping liquid fuel from the main tank.

Sixth Embodiment

FIGS. 50–53 illustrate a sixth embodiment of the invention that also utilizes the feature of the invention of mounting a fuel pump assembly, preferably the aforementioned turbine vane type fuel pump and/or a fuel pump preferably having the built-in vapor purging system 33, 35 (not shown in FIGS. 50–53) as described in the previous embodiments, located outside of, but closely adjacent to a canister reservoir so that the pump and its vapor purge outlet are located generally at the same elevation and mounted directly in the main body of fuel in the tank. In the sixth embodiment, a fuel pump/canister reservoir-base/module assembly 800 is provided somewhat similar functionally to the third and fourth embodiments of FIGS. 3–33 and FIGS. 34–39 respectively. Module 800 is likewise preferably tank mounted and suspended in a conventional manner so as to be of the bottom seeking type, and adapted dimensionally for a drop-installation through opening in the top wall 24 of tank 12 to rest on its base at the bottom wall of the tank or the bottom wall of a swivel pot basin 112 disposed in the tank.

Figure 51:
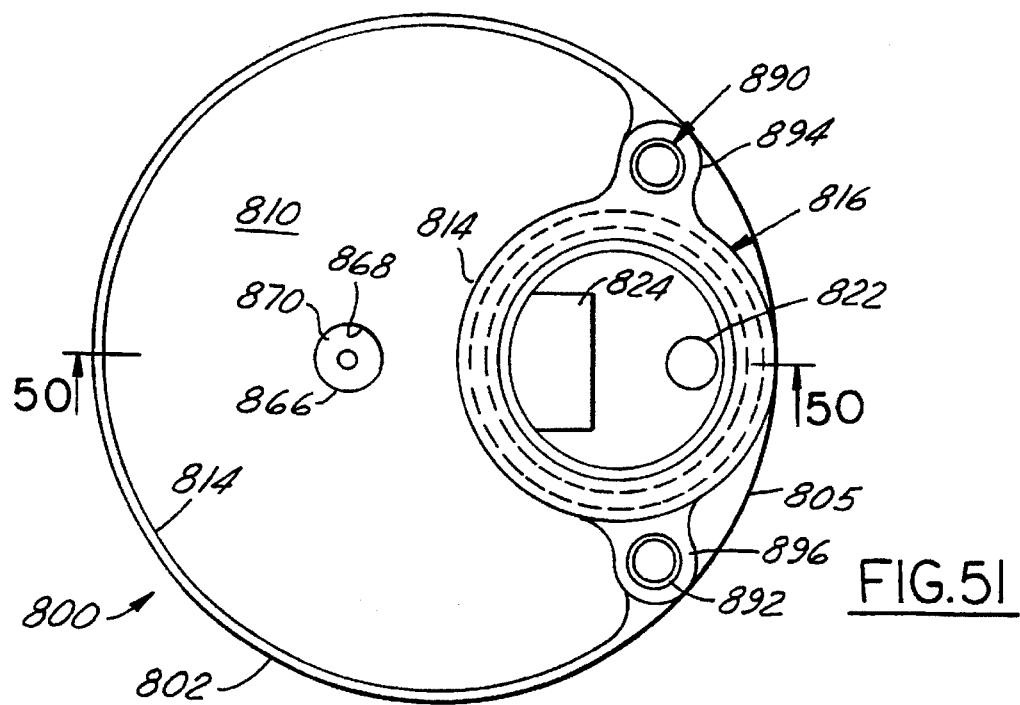
FIG. 51 is a top plan view of the module of FIG. 50.

Module 800 thus comprises a reservoir canister 802 (FIGS. 50 and 51) open at its upper end to communicate with the head space or vapor dome in the interior of tank 12. A base portion 804 of canister 802 has an integrally molded cylindrical wall portion 805 provided with three or four circumferentially spaced apart stand off feet 806 protruding downwardly from its lower edge. The reserve fuel reservoir 810 of canister 802 is defined by a bottom or septum wall 812 and is generally "C"-shaped in horizontal cross section, as best seen in FIG. 51. The side wall of 814 of the reservoir is cylindrical through about 270° of its circumference and then is indented to provide nesting space for a cylindrical pump housing 816 molded integrally with wall 814. Pump 14 is supported at its upper end by a conventional resilient mounting grommet (not shown) surrounding the upper end cap 818 of the pump and in cooperating with a circular opening 820 if the top wall of the pump housing 816. A pump outlet 822 and electrical connector boss 824 protrude above the upper end of the pump housing 816. The side wall 825 of pump housing 816 is provided with one or more suitable elongated spaced slots (not shown) for free flow of main body tank fuel to and from the interior of pump housing 816, pump 14 having a large radial clearance with the interior of wall 824 for such circulation of tank fuel.

In accordance with one principal feature of the sixth embodiment module 800, the module base includes only two main components, namely a "push-on" filter bag/reservoir outlet valve subassembly 826 and a "snap-in" retainer disc 828. Filter bag 830 of the bag/valve subassemmly 826 is an envelope formed by bottom sheet 832 and a top sheet 834 of flexible plastic mesh screen filter material of the type described previously in conjunction with filter 18 of the first embodiment module 10, these sheets again being heat sealed or ultrasonically welded together around their periphery at the lap joint 836. Upper filter sheet 834 is provided with a mounting grommet 840 which carries an O-ring seal 842 having a push-on fluid sealing fit with the cylindrical pump inlet boss 16. Grommet 840 is suitably sealably affixed to upper sheet 834 as by embedment molding or adhesive. Sheet 834 also has a T-shaped spacer post 844 having its head flange 846 affixed by embedment molding to sheet 834. A shank 848 of post 844 protrudes downwardly therefrom and has a socket therein for telescopically receiving with a force fit a stem 850 of a cooperative spacer post 852 having its T-head 854 embedment molded with bottom sheet 832 of filler bag 830.

The valve components of the bag/valve subassembly 826 include a valve spring 860 in the form of a helical coil compression spring having its lowermost coil supported in a circular keeper channel of a plastic boss 862, the imperforate disc base portion of boss 862 being embedment molded in lower sheet 832. The uppermost coil of spring 860 rests in a circular keeper channel of an upper boss 864 having its disc portion embedment molded in upper sheet 834.

As best seen in the enlarged fragmentary views of FIGS. 52 and 53, upper boss 864 has a bullet nose retainer stem 866 affixed at its lower end to the disc portion of boss 864 and protruding coaxially upwardly therefrom into a circular reserve fuel outlet opening 868 formed in canister bottom wall 812. A circular valve disc 870 of rigid rubberized material is received on stem 866 and clamped by a conical stem flange 872 against a circular row of equally circumferentially spaced support bumps 874 protruding integrally from the upper surface of the disc portion of boss 864. Valve disc 870 preferably is imperforate, but optionally may have a calibrated restricted orifice(s) 876 therethrough for registry with the reservoir outlet opening 868 even in the closed condition of the valve shown in FIG. 52.

In construction of the bag/valve subassembly 826, preferably lower sheet 832 is first formed as a separate member with lower spacer post 852 and lower spring boss 862 affixed thereto. Likewise, upper sheet 834 of bag 830 is formed as a separate member with pump inlet grommet 840 and upper spring retainer boss 864 affixed thereto, with O-ring 842 loosely assembled on grommet 840, and with valve disc 870 assembled to boss 864 by guide stem 866. Then, with spring 860 inserted therebetween, the two bag sheets 832 and 834 are superposed in assembly and joined to one another by the heat seal seam 836 to form the filter envelope encapsulating spring 860 and spacer post 852.

Retainer 828 of base subassembly 804 preferably comprises an injection molded plastic circular disc having a central fuel inlet opening 880 and further fuel inlet openings 882 arrayed in a circular row concentric with opening 880. Retainer 882 has an outer cylindrical flange 884 of resilient material and provided with a series of locking tangs 886 arranged in a circumferentially spaced apart array for registry in assembly with corresponding locking apertures 888 in the cylindrical peripheral wall 805 of module base 804.

In the initial assembly of module 800, pump 14 is inserted endwise into the open bottom end of pump housing 816 and is supported at its upper end by the aforementioned grommet retention in housing upper opening 820. Then the filter bag/valve subassembly 826 is inserted into the open base of canister 802 with grommet 840 registered with pump inlet 16 and valve guide stem 866 registered with canister outlet opening 868. With O-ring 842 carried on grommet 840, the grommet is push-fit onto pump inlet 16 until it abuts the bottom of pump 14. In this position valve guide stem 866 will protrude upwardly through the canister outlet opening 868.

Then, all that is required to complete the module assembly is to slide retainer 828 telescopically into the base wall until locking tangs 886 register with the locking apertures 888. Due to the flexible nature of flange 884, and the camming surface on each locking tang 886, the same will be yieldably forced radially inwardly by the base wall until they register with the locking openings 888, whereupon the flange will snap out to hold the locking tangs in locking registry with openings 888. Once retainer 828 is thus removably snap-locked in place, spacer post 844/852 cooperates with the upper end of pump housing 816 to securely hold pump 14 axially in position in its housing 816. It is to be understood that one or more spacer posts 844/852 may be provided in a laterally spaced array beneath pump 14, out of registry with pump inlet 16 as well as with the fuel inlet openings 880/882 and retainer 828. The assembled position of retainer 828 relative to reservoir bottom wall 812 also is designed to slightly compress spring 860 to hold valve disc 870 in its closed, liquid sealing position against the undersurface of wall 812 to thereby close reservoir outlet 868.

When module 800 as so completely assembled is installed into fuel tank 12 the module is preferably supported by steel tubes 890 and 892 (FIG. 51) telescopically received in laterally protruding ears 894 and 896 of pump housing 816. Preferably the module supporting structure is of the conventional "bottom-seeking" type so that the canister feet 806 rest on the bottom wall of the tank or swirl pot, thereby spacing the inlet openings 880, 882 of retainer 828 above such bottom wall so fuel can flow freely thereto from the main body of tank fuel. The outlet flow from pump 14 can be hydraulically connected through any conventional means associated with bottom referencing fuel pump modules, such as hosing or sliding fuel configurations suitably connected to the pump outlet 822. Also, suitable conventional and ancillary components and subsystems, such as fuel level sensing components, low fuel warning components and noise isolation components can be mounted on or attached to canister 802. In addition, it will be understood that the capacity of reservoir 810 is expandable by initial design to any required volume by increasing the diameter and/or height of the module envelope.

Operation of Sixth Embodiment

Under normal conditions when at least the filter bag 830 is completely submerged below the level of the main body of fuel in tank 12 and pump 14 is energized, fuel surrounding filter bag is drawn by pump suction produced at pump inlet 16 along the flow path N/O shown diagrammatically in FIG. 52 by the flow path arrows (heavy black arrowheads). It will be seen that fuel is drawn upwardly through retainer openings 880/882 and then through the bottom filter sheet 832 into the interior of bag 80, which in turn defines the main filter chamber 898 of module 800. Likewise, fuel is also drawn downwardly through top sheet 834 of bag 830 from the clearance space between pump 12 and housing 816, which is wide open to the main body of the fuel in the tank through the aforementioned side openings in wall 824 (not shown). The filtered fuel is then drawn upwardly from chamber 898 into the pump inlet 16 for discharge from pump outlet 824 for delivery to a conventional fuel rail bypass regulator (not shown) in the manner of the previously described embodiments. It will be noted that seal 842 isolates the pump inlet from fuel disposed exteriorly of fuel bag 830. Reservoir 810 is filled with fuel along path R/F (FIG. 50) from unused engine return fuel, either from a remote fuel manifold mounted bypass pressure regulator, or from a bypass regulator mounted directly in module 800, in the manner of the previous embodiments. The reserve fuel supply volume is normally retained in reservoir 810 by valve disc 870 being maintained in the closed position of FIG. 52 by the force of spring 860.

During the reserve fuel supply operation of module 800, as when fuel is not surrounding filter bag 830 under low fuel or adverse vehicle maneuvering or inclination conditions as described previously, a capillary seal is created at the pores of the filter material of bag 830 by being wet with liquid fuel, thereby causing negative pressure increase in filter chamber 898 in response to pump suction flow. This draws down the upper sheet 834 of the filter bag so that boss 864 further compresses spring 860, thereby moving disc seal 870 downwardly away from wall 812 to thereby open reservoir outlet 868. This allows reserve fuel R/F (FIG. 53) to flow downwardly along the flow path R/O diagrammatically shown in FIG. 53 by the flow path arrows (large black arrowheads), from reservoir 810 through outlet 868 onto the outside surface of the upper layer 830 of filter material. This reserve fuel flow R/O then passes through upper filter sheet 834 into the main filter chamber 898 and then flows into pump inlet 16. Thus, as in the previous embodiments, reserve fuel volume is provided on demand to maintain pump output flow. It is to be noted that guide pin 866 maintains sealing orientation of disc 870 relative to reservoir outlet opening 868 through the full range of vertical travel movement of valve disc 870 between its closed position of FIG. 52 and fully open position of FIG. 53.

It is to be further understood that, as in the case of modules 110 and 300 of the second and third embodiments described previously, valve disc 870 may be made completely imperforate by omitting the calibrated orifice or orifices 876 so that no leakage of reserve fuel R/F can occur from reservoir 810 during system shut down. On the other hand, if the previously described backwash flow is desired through the lower sheet 832 of filter bag 830 during system shut down, the calibrated orifice 876 can be provided in disc 870 to provide a controlled leak down of reserve fuel into the bag through the upper layer 834, thence into filter chamber 898 and then through lower sheet 832 to drain out retainer openings 880/882. With this option the spacing between valve disc 870 and the upper spring boss 864 created by the row of support bumps 874 provides a flow path from orifice 876 laterally out between the support bumps onto the upper surface of sheet 834.

Likewise, as in the case of the modules of the first, second and third embodiments described previously, parallel intake fuel flow paths can be provided by the aforementioned "balancing" effect between reservoir fuel head and the head of the main body of fuel in tank 12. Again this can be accomplished by suitable design and empirical selection of spring 860 such that variations in the negative pressure existing in main filter chamber 898 during pump fuel delivery and bypass return operation can be balanced against valve closing force to cause a draw of reserve fuel along path R/O concurrently with a draw of fuel along the normal fuel flow path N/O to maximize use of twice-filtered fuel provided in reservoir 810. The sixth embodiment also provides the aforementioned advantage of the "fountain-washing" effect of fuel out flow from reservoir outlet 870 across the exterior surface of the upper filter sheet 834. The vertical spacing of the upper sheet 834 from the lower sheet 832 of filter bag 830 also provides the advantage of the secondary filter formed by upper sheet 834 being less subject to clogging from fuel tank contaminants similar to the "fail-safe" feature of the aforementioned secondary, upper filter sheets 52 and 160 of the previous embodiments.

Figure 54:
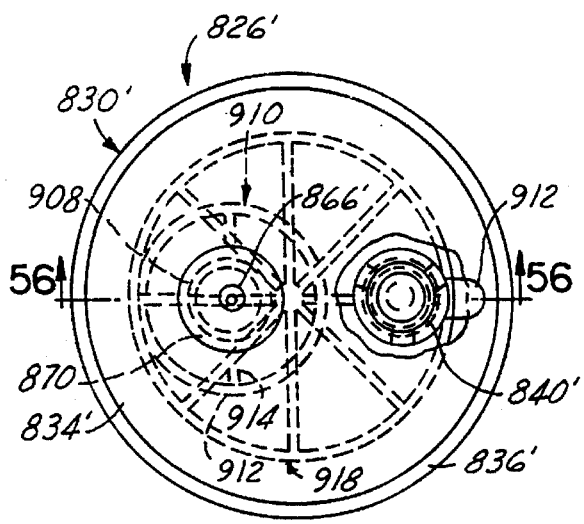
FIGS. 54 and 55 are respectively top and bottom plan views of a modified filter envelope subassembly of the invention.
Figure 56:
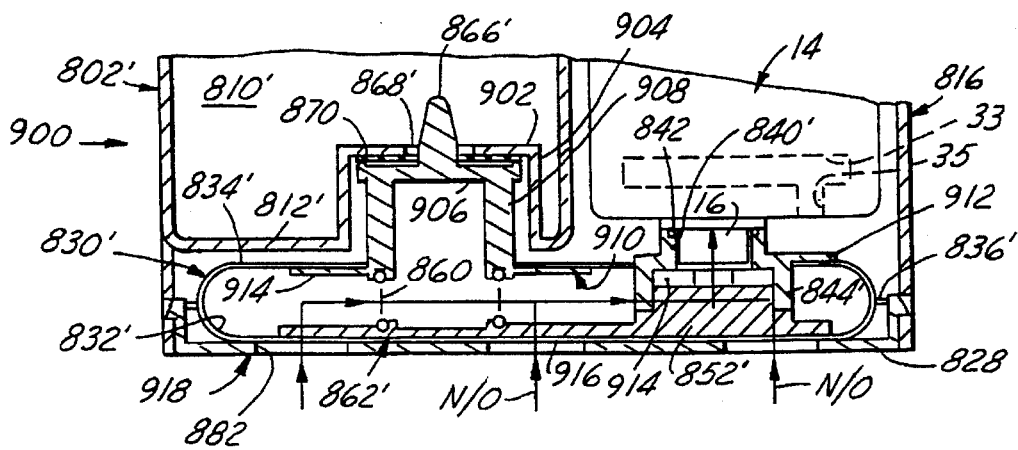
FIGS. 56 and 57 are fragmentary sectional views, similar to those of FIGS. 52 and 53, but illustrating the filter bag envelope subassembly of the seventh embodiment of FIGS. 54 and 55 assembled in a canister and pump module slightly modified from that of FIGS. 50 and 51.
Figure 57:
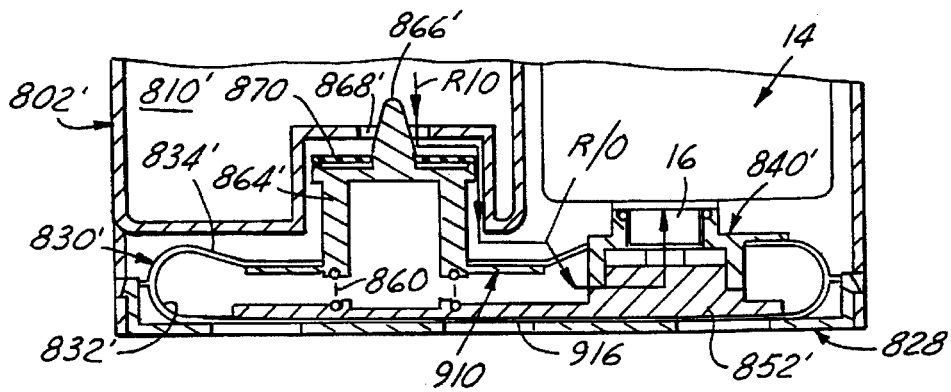

Additionally, it is also to be understood that grommet 840 may be provided with a radially outwardly extending integral finger baffle portion (such as finger 912 shown in FIGS. 54 and 56) designed to underlie in predetermined vertically spaced relationship the vapor purge outlet port 35 of the vapor purge system of pump 14. This baffle extension of grommet 840 thus prevents flow of pump purged liquid fuel and/or vapor directly against and into the upper sheet 834 of filter bag 830, and instead directs this purge flow radially outwardly beneath pump 14 and above sheet 834 out to the clearance volume between pump 14 and housing 824. Hence purge vapor ingestion into filter bag 830 is thereby avoided, but whatever small quantity of fuel is bypassed from the pump chamber through the pump purge outlet port 35 is still made directly available to the exterior of filter bag 830 to thereby prolong reserve fuel supply operation under fuel tank starvation conditions in the vicinity of filter bag 830.

As in the previous embodiments, pump 14, being located exteriorly of reserve fuel reservoir 810, enables the use of a turbine vane type fuel pump (as well as a positive displacement type fuel pump) even though provided with the aforementioned pump vapor purge system located generally at the elevation of pump inlet 16. Also, disposing pump 14 exteriorly of reservoir 810 again isolates the pump from hot fuel conditions in the reservoir, and by exposing the pump to main body of fuel in the tank through the large flow openings in pump housing 816 helps cool the pump.

Preferably filter bag 830 is made of an overall size to have a relatively close fit of its peripheral seam 836 within flange 884 of retainer 828 to thereby help prevent tank contaminants from reaching upper sheet 834 of the filter bag. If desired, the filter material of the upper sheet 834 may differ in pore size and/or flexibility from that of the lower sheet 832 to thereby introduce a controlled differential in bag collapsing forces between the upper and lower sheets for any given negative pressure seen in filter chamber 898. This additional parameter thus can be utilized in conjunction with designing the aforementioned balancing effect to maximize reserve fuel input to the pump from reservoir 810.

From the foregoing description, it will also be seen that the sixth embodiment module 800 provides additional advantages over the previously described embodiments. The entire filter and valve mechanism is encompassed in one subassembly 826 which has only one attachment point, namely to pump inlet 16. This results in reduced manufacturing, assembly and testing operations of the fuel pump module, with attendant cost savings. This simplification also eliminates potential failure modes because there are fewer potential leak points, which is important in preventing contaminants from reaching the pump inlet 16 as well as preventing impairment of the generation of adequate negative pressure in filter chamber 898 to cause proper actuation of reservoir outlet valve 870.

The sixth embodiment construction of module 800 also allows for filtration of fuel along the normal flow path N/O and/or along the reserve flow path R/O without the need of any additional filter components other than the single filter bag 830. The overall filter area of the module is increased because filter chamber 898 has a top surface 834 as well as bottom surface 832 which can be coextensive in lateral extent within the base of the module. The filter area can also be further increased because it is not limited by any specific diaphragm diameter.

There are fewer components in module 800 because each component has multiple functions. Filter 830 provides filtration of all reserve and primary fuel into pump inlet 16. The filter valve subassembly 826 also provides sensing to determine the need for reserve fuel. This is accomplished by sealing the bag outlet 840 to the pump inlet 16 and providing a capillary seal great enough to allow negative pressure in filter chamber 898 to compress spring 860. Filter bag subassembly 826 also locates and supports both ends of springs 860 as well as retaining seal valve member 870 while orienting the same relative to the reservoir orifice outlet 868. The one-piece, injection molded plastic canister body 802 functions to retain reserve fuel by providing reservoir 810, locates and supports pump 14 in the integrally attached housing 816 and provides a simple attachment and support structure for retainer 828. Retainer 828 in turn provides support to pump 14 and filter subassembly 826, while also loading spring 860 to seal the reservoir outlet 868 during normal operation. Thus the entire filter subassembly 828 is supported and located by retainer 828 which is removably snap-locked to module base 804. The rigid filter spacer(s) 844/852 provide support to pump 14 and also provide a flow path within filter chamber 898 to pump inlet 16 which is non-collapsible in the vicinity of pump inlet 16.

Additionally, no special assembly or testing operations are required due to snap fit of retainer 828 to base 804 of canister shell 802, and due to the press fit of filter grommet 840 to pump inlet 16. This feature allows the filter to be readily servicable and if it becomes restricted by tank contamination. Moreover filter restriction by tank contaminants will not create any premature failure modes such as may occur from extraneous vapor leak pathways through interfitting joints of more complex multiple component diaphragm actuated modules.

Seventh Embodiment

FIGS. 54-57 illustrate a seventh embodiment of the invention which is similar in function to the sixth embodiment module 800, and wherein like elements are given like reference numerals raised by a prime suffix and their description not repeated. In the seventh embodiment module 900, the canister reservoir 802' (FIGS. 56 and 57) has a modified bottom wall 812' with the reservoir outlet 868' provided in the top wall 902 of an imperforate inverted cup-like bottom wall boss 904. Valve disc 870 is carried by a modified filter boss 864' and retained thereon by a press fit on a modified boss pilot stem 866' that protrudes integrally upwardly from the imperforate boss top wall 906. Boss 864 has an imperforate cylindrical skirt wall 908 integrally joined to wall 906, and the encircling portion of the filter upper layer sheet 834' is embedment molded in the lower edge of the boss skirt. A wagon-wheel-type fabric support 910 (FIGS. 54 and 55) has an circular rim 912 integrally connected to skirt wall 908 by four spokes 914 spaced at 90° increments from one another. Wagon wheel 910 is either adhesively affixed to the undersurface of filter upper sheet 834' or embedment molded therewith.

Upper sheet 834' of modified filter envelope bag 830' also has a modified pump inlet attachment grommet 840' carrying O-ring 842 and press fit on inlet pump 16 in the manner of grommet 840. Envelope upper sheet 834' is also sealably secured to grommet 840', as by embedment molding in the shoulder wall thereof. The aforementioned vapor purge outlet baffle comprises finger extension 912 (FIGS. 54 and 56) that extends integrally radially outwardly from grommet 840' below and in alignment with the vapor purge outlet port 35 of pump 14, to thereby divert pump purge outlet discharge from direct impact onto filter upper sheet 834'. Grommet 840' has three equally annular spaced dependent spacer legs 844' which telescopically receive therein with a press fit the reduced diameter head of a modified lower spacer post 852'. Preferably lower envelope sheet 832' is embedment molded into post 852'. The upper face of spacer 852' is spaced below pump inlet 16 so that inlet 16 is open to fuel flow from the interior of filter chamber 898' of filter envelope 830' via the three spaces 914 between the three spacer legs 844'.

Figure 55:
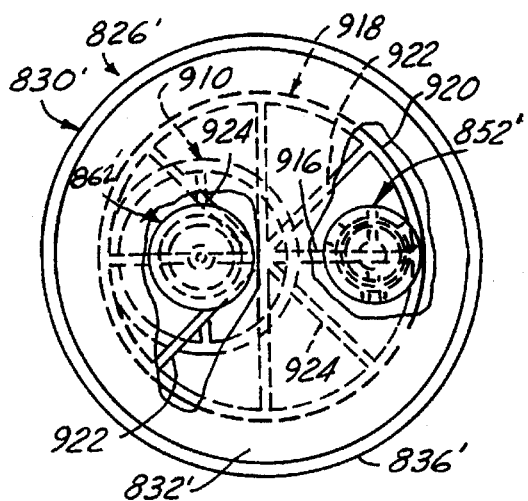

The modified lower spring keeper boss 862' (FIGS. 55–57) is integrally joined by a center spoke 916 of a wagon-wheel-type filter retainer 918 to spacer post 852' (best seen in bottom plan view of FIG. 55). Retainer 918 has a circular rim 920 integrally joined at a tangent junction with the outer edge of lower spacer 852'. Retainer 918 also has two additional diametrically spokes 922 and 924 extending perpendicular to one another and oriented at 45° to center spoke 916. Spring base 862' is integrally joined to a left hand portion of spokes 922, 924 as well as the left hand extremity of center spoke 916 which leads out to rim 920, as viewed in FIG. 55. Preferably retainer 918, spring boss 862' and lower spacer post 852' are integrally molded from plastic as a one-piece part, with lower sheet 832' of filter envelope 830' embedment molded therewith.

The modified filter and valve subassembly 826' of the seventh embodiment is assembled to canister 802' and pump 14 in the manner of the sixth embodiment in conjunction with the assembly of retainer 828 to the base of module. Likewise filter/valve subassembly 826' functions in the manner of subassembly 826 of the sixth embodiment to provide the normal fuel flow path N/O shown in FIG. 56, and the reserve operation flow path R/O shown in FIG. 57, as described previously in conjunction with the sixth embodiment.

However, the wagon wheel retainer 918 of subassembly 826' operates to maintain the filter lower sheet 832' held down against retainer 828 even when pump suction and the capillary seal present at envelope sheets 832' and 834' is effective to draw downwardly against the yieldable bias of compression spring 860, the annular portion of upper sheet 834 concentrically surrounding upper spring boss 864'. When valve 870 is thereby moved downwardly to open the reservoir outlet 868' reservoir reserve fuel can flow (as indicated by flow arrows R/O) in FIG. 57 downwardly between cup wall 904 and skirt 908 and onto the annular surrounding zone of upper filter sheet 834', and thence therethrough into the interior filter chamber 898'. It will be seen that retainer 918 allows substantially unimpeded flow of fuel upwardly through filter lower sheet 832' and to the interior filter chamber 898' while maintaining sheet 832' from collapsing upwardly under reserve fuel draw conditions.

Likewise, the upper sheet wagon wheel retainer 910 allows substantially unimpeded flow of fuel downwardly through upper filter sheet 834' into filter chamber 898'. Retainer 910 also cooperates with the bellows-like annular flexing portion 835 of sheet 834' surrounding retainer 910 to provide a sensitive and vertically movable diaphragm construction for controlling the opening and closing of valve 870. With this filter envelope construction of filter bag 830' the plastic mesh filter material of sheets 832' and 834' may be constructed of the same materials as set forth with respect to the filter envelope 18 of the first embodiment of FIGS. 1 and 2.

What is claimed is:

1. An in-tank fuel pump and reservoir canister module assembly comprising, an electric fuel pump having an inlet and an outlet and constructed to be mounted in a fuel tank, a primary fuel filter of a material having a plurality of openings through which fuel can flow from the tank to an interior main filter chamber having an outlet connected with the pump inlet for supplying fuel from the filter chamber to the pump inlet, said primary filter being constructed and arranged to be received immediately adjacent the bottom of the fuel tank, a fuel reservoir canister extending with its major dimension generally vertically in the tank and having adjacent its upper end an opening constructed to communicate canister overflow with the interior of the fuel tank, a closed lower end, and immediately adjacent the lower end a flow controlling outlet means for communicating the lower and of the reservoir canister with the interior of the filter chamber for the flow of fuel from the reservoir through the interior of the filter chamber to the inlet of the pump, said fuel pump being mounted in said module assembly outside of said reservoir canister adjacent thereto with its axis extending generally vertically and its inlet generally at the elevation of the lower end of said canister, and a bypass passageway connected with the outlet of the pump and the interior of the reservoir canister for passing some of the fuel from the outlet of the pump into the reservoir canister, whereby when the supply of fuel from the tank to the filter is momentarily interrupted fuel from the reservoir canister will flow through said flow controlling means and the interior of the filter chamber and its outlet into the inlet of the fuel pump.

2. The module assembly of claim 1 wherein said flow controlling means comprises a restricted orifice.

3. The module assembly of claim 2 which also comprises a secondary filter overlying said orifice for filtering fuel flowing from said reservoir canister through said orifice.

4. The module assembly of claim 3 wherein said secondary filter has a plurality of openings through which fuel flows with an average opening size not greater than about 60 microns.

5. The module assembly of claim 4 wherein the openings of said primary filter have an average size not greater than about 70 microns and the openings of said secondary filter have an average size not greater than about 40 microns.

6. The module assembly of claim 2 wherein said orifice has a diameter not greater than about 0.20 of an inch.

7. The module assembly of claim 2 wherein said orifice has a diameter in the range of about 0.10 to 0.20 inches.

8. The module assembly of claim 2 wherein said primary filter comprises an envelope of a sheet of plastic filter material having a pair of generally vertically opposed walls, said filter outlet opening through one of said walls, said orifice communicating with the interior of said envelope through said one wall, and a baffle received in said envelope between said walls and spacing the other of said walls from said orifice and said filter outlet.

9. The module assembly of claim 8 wherein said reservoir is attached to one of said walls of said filter.

10. The module assembly of claim 8 which also comprises a plate which closes the lower end of said reservoir, said orifice is in and opens through said plate, and a secondary filter received in said reservoir canister and over said orifice.

11. The module assembly of claim 1 which also comprises a pressure regulator received in said bypass passage for regulating and controlling the pressure of fuel supplied from the outlet of said pump to the exterior of the fuel tank for delivery to an engine when the pump is operating by varying and controlling the quantity of fuel flowing through the bypass passage into the fuel reservoir canister.

12. The module assembly of claim 11 wherein said module is constructed to fit at its lower end into the laterally narrow confines of a swirl pot basin at the bottom of the fuel tank, and wherein said reservoir canister comprises a relatively narrow diameter elongate tube with its major dimension constituting its axis extending generally vertically in the fuel tank and said pressure regulator projects at least partially through a side wall of said tube and into the interior of said tube, said primary filter comprising an elongate envelope having its overall length and width dimensions oriented generally in a first plane perpendicular to a second plane defined by the axes of said tube and pump whereby the outside thickness dimension of said entire pump module assembly perpendicular to said second plane is relatively narrow compared to the overall height and width dimensions of said module.

13. The module assembly of claim 1 wherein said reservoir canister has its lower end attached to the primary filter and its upper end opening into the tank, a plate closing the lower end of said canister and retaining the primary filter envelope thereto, said flow controlling means comprising a restricted orifice received in and opening through said plate to the interior of the primary filter envelope, and said filter includes spacer baffle means disposed within said envelope for preventing collapse of said envelope.

14. The pump assembly of claim 1 wherein said pump comprises a turbine vane type pump with a rotary vane impeller operable in a rotary pumping chamber of said pump and having means forming a circumferentially localized vapor purge port passageway open at an inlet and to said pumping chamber and at an outlet end to the outside of said pump to allow vapor in said pumping chamber to be expelled via said purge passageway directly to the interior of the fuel tank.

15. The pump assembly of claim 1 wherein said fuel pump comprises a rotary pump mounted in said assembly outside of said reservoir and exposed directly in the fuel tank, said pump having an internal vapor purge system including a passageway having an inlet end communicating with a pumping chamber of said rotary pump and an outlet end adapted to communicate directly with the interior of the fuel tank.

16. The module assembly of claim 15 wherein said flow controlling means comprises a valve adjacent the bottom of the reservoir canister operable to admit fuel to the inlet of said pump via the filter chamber, and means to open said valve in response to absence of liquid fuel at the exterior surface of said filter.

17. The module assembly of claim 16 in which said means to open said valve comprises said primary fuel filter wherein said openings therein are constructed to be closed by capillary action of a liquid fuel present in the tank to resist passing of air or water from the exterior surface of filter into the filter chamber.

18. The module assembly of claim 17 wherein said canister has a septum wall above the bottom of said canister having an opening in which said valve is positioned and a valve seat cooperating with said valve to open and close communication between the bottom of the reservoir of said canister and the filter chamber.

19. The module assembly of claim 18 in which said primary filter comprises a diaphragm filter in the form of a fuel filter sheet permeably closing the bottom of said canister below said pump inlet and said canister lower end wall.

20. The module assembly of claim 19 wherein said valve has a valve opening and closing member movable in the space below said septum wall and said valve is biased against said seat by the gravity head of reserve fuel in the reservoir.

21. The module assembly pump as set forth in claim 20 further including spring means disposed in said filter chamber for biasing the valve to a closed position against said seat and operably connected with said diaphragm filter whereby movement of said diaphragm filter upwardly when closed by the aforesaid capillary action of wetting by liquid fuel and pressure of air and/or water present at the exterior side of the filter in response to pump suction exerted on the interior of the filter chamber will overcome the bias of said spring means and open said valve to thereby emit fuel from the bottom of the canister reservoir to the pump inlet via the filter chamber.

22. The module assembly set forth in claim 21 wherein said flow controlling means further includes an annular perforate rigid disc disposed in the filter chamber and lying on the interior surface of the filter material and centered on the filter relative to the pump assembly, wherein said valve comprises a poppet valve having a stem operably connected to the central hub of said disc for transmitting movement of the diaphragm filter via said disc to said valve, and said spring means comprises a coil spring disposed between said septum wall and said disc hub and encircling said valve stem.

23. The module assembly of claim 1 wherein said module assembly has an overall outside lateral dimension adapted for insertion through a mounting opening in the top wall of the tank, said module comprising a tank flange cover assembly adapted for fixed mounting to the top wall of the tank and having guide sleeve means dependent therefrom, a canister shell reserve fuel container having an open upper end and telescopically slidably received at its upper end with the guide sleeve means of said cover assembly, said canister shell container having indented sidewall portions nestably receiving said pump exteriorly thereof, and a base subassembly on which the bottom of said canister container is mounted and the bottom of the pump with its fuel inlet is likewise mounted, said base subassembly containing said primary filter and said flow controlling means and the filter chamber.

24. The module assembly of claim 23 wherein said pump outlet comprises a tubular member extending vertically thereabove and having an open upper end, said cover assembly having a dependent boss defining a chamber for receiving the upper end of said pump outlet tubular member, and a seal member affixed to the lower end of said cover boss slidably sealingly receiving through said pump outlet tubular member, and a fuel delivery outlet passage communicating with the upper end of said chamber of said cover boss adapted for delivering fuel from the pump to a fuel delivery line for supplying fuel to the engine.

25. The module assembly of claim 1 wherein said pump comprises a turbine type rotary vane pump.

26. The module assembly of claim 15 wherein said pump comprises a turbine type rotary vane pump.

27. The module assembly of claim 22 wherein said primary filter further comprises a circular sheet of filter material having an outer peripheral portion extending radially beyond and encircling said disc, a filter mounting ring having the outer edge of said sheet mold embedded therein, and encircling said disc in radially outwardly spaced relation, a base plate defining said canister septum wall and said valve seat and having an opening therethrough in which said pump inlet is mounted, said base plate laterally encompassing the lower end wall of said canister and said pump and having an upwardly protruding boss defining said valve seat and a flow passageway therethrough controlled by said valve and said valve seat, said canister lower end wall having a upwardly protruding boss opening to the lower end of the canister reservoir and receiving said base plate boss for mounting said base plate to said canister lower end wall, said base plate having an annular channel for receiving and mounting said filter mounting ring thereto to suspend said filter sheet and disc therebelow and thereby define said filter chamber therebetween.

28. The module assembly of claim 27 further including an annular perforate rigid guard having a peripheral flange encompassing and mounted to the periphery of said base plate and a flat annular centrally open foot portion disposed below said filter sheet and slightly radially overlapping the periphery of said disc and adapted to support said module on the tank bottom wall with said disc spaced below the lower end of said valve stem in normal operation with said filter sheet submerged in tank fuel.

29. The module assembly of claim 28 wherein said canister has a floating back check valve ball and ball valve seat disposed slightly above and mounted upstream of said valve operable for blocking communication between said valve and the canister reservoir when the level of reserve fuel in the reservoir falls to generally the elevation of said ball valve seat.

30. The module assembly of claim 1 wherein said flow controlling means being constructed and arranged to cause a variable flow rate varying directly with the head differential between the level of bypass reserve fuel in said canister above the level of fuel in the tank so that bypass reserve fuel can be returned to the pump inlet whenever tank fuel level drops below reserve fuel level in the canister during operation of said fuel pump to thereby maximize reserve fuel head height in said canister and return of bypass fuel to the pump inlet while minimizing reserve fuel overflow to the tank.

31. The assembly of claim 30 wherein said flow controlling means comprises a restricted orifice.

32. The assembly of claim 30 wherein said canister has a bottom outlet opening and said flow controlling means comprises a secondary filter diaphragm communicating with the tank and main filter chamber and underlying said canister bottom outlet for filtering fuel flowing from said reservoir canister through said bottom outlet into the main filter chamber, and valve means operably associated with said secondary filter diaphragm and biased by a spring upwardly toward said canister bottom outlet, said valve means being movable between positions tending to open and close bypass reserve fuel flow from the canister bottom outlet into the main filter chamber in response to varying pressure differential acting downwardly on said diaphragm filter as such occurs between the tank and main filter chamber.

33. The assembly of claim 30 wherein said secondary filter diaphragm has a plurality of openings through which fuel flows with an average opening size not greater than about 62 microns.

34. The assembly of claim 33 wherein the openings of said primary filter have an average size not greater than about 70 microns.

35. The assembly of claim 30 wherein said valve means includes an always-open restricted orifice.

36. The assembly of claim 30 wherein said orifice comprises an opening in a spring cup bearing on and between said secondary filter diaphragm and the biasing spring.

37. The assembly of claim 1 including a support base subassembly having a mounting flange with said fuel pump and canister mounted upright on its upper side, and open at its bottom side, said primary filter comprising a sheet of plastic filter material spanning the open bottom side of said base flange and spaced therefrom to define the main filter chamber therebetween so as to be exposed to the main body of fuel in the tank, and including a baffle received on the upper side said primary filter sheet and spacing the same from pump inlet.

38. The assembly of claim 31 wherein a secondary filter is attached to said base flange above said primary filter sheet and is spaced therefrom to define a portion of the main filter chamber therebetween, said secondary filter also being exposed to the main body of fuel in the tank.

39. The assembly of claim 37 wherein said secondary filter comprises a movable diaphragm and said base flange also includes a perforate support stand disposed over said secondary filter diaphragm and on which said canister is supported, said canister bottom outlet communicating through said support stand with said valve means and defining a fixed valve seat engageable with said filter diaphragm when the latter is in closed position.

40. The assembly of claim 37 which also comprises a pressure regulator mounted between said pump and canister and operably connected to said bypass passageway for regulating and controlling the pressure of fuel supplied from the outlet of said pump to the exterior of the fuel tank for delivery to an engine when the pump is operating by varying and controlling the quantity of fuel flowing through the bypass passageway into the fuel reservoir canister.

41. The assembly of claim 40 wherein said module is constructed to fit at its lower end into the laterally narrow confines of a swirl pot basin at the bottom of the fuel tank, and wherein said reservoir canister and said pump are generally cylindrical and have their major dimensions constituting their central axes extending generally vertically in the fuel tank, said pressure regulator being top mounted on said pump and having its bypass discharge outlet projecting at least partially through a side wall of said canister and into the interior thereof, said primary filter comprising a disc sheet having its diameter oriented generally in a first plane perpendicular to a second plane defined by the axes of said canister and pump whereby the outside thickness dimension of said entire assembly perpendicular to said second plane is relatively narrow compared to the overall height and width dimensions of said module assembly.

42. The assembly of claim 1 wherein said reservoir canister has its lower end operably attached to an assembly support base attached to the primary filter and its upper end opening into the tank, said base communicating with the lower end of said canister and retaining the primary filter therebeneath, said flow controlling means comprising a restricted orifice disposed in and opening through said base to the interior of the main filter chamber, said primary filter including spacer baffle means disposed within said main filter chamber for preventing collapse of said primary filter upwardly toward said base.

43. The assembly of claim 15 and further including a secondary filter disposed at higher elevation than said primary filter and also being constructed of a material having a plurality openings through which fuel can flow from an exterior surface thereof exposed to the tank to an interior surface thereof communicating with the filter chamber.

44. The assembly of claim 43 wherein said flow controlling means comprises a valve for controlling a bottom outlet of the reservoir canister and operable to admit fuel to the inlet of said pump via the main filter chamber, and means to open said valve in response to absence of liquid fuel at the exterior surfaces of said primary and second filters.

45. The assembly of claim 44 wherein said secondary filter is constructed and arranged to operate as a diaphragm and to function as said means to open said valve, said primary and secondary filter openings being constructed to be closed by capillary action of a liquid fuel present in the tank to resist passing of air or water from the exterior surfaces of said filters into the main filter chamber.

46. The assembly of claim 45 wherein said canister closed lower end comprises a bottom wall and said canister bottom outlet comprises a neck opening below which said valve is positioned and wherein a valve seat on said canister outlet neck cooperates with said valve to open and close communication between the bottom of the reservoir of said canister and the main filter chamber.

47. The assembly of claim 46 in which said primary filter comprises a fuel filter sheet permeably closing the bottom of the filter chamber below said pump inlet and below said canister bottom outlet.

48. The assembly of claim 47 wherein said valve has a valve opening and closing member movable in the space below said valve seat and said valve is biased in a direction downwardly away from said valve seat by the gravity head of reserve fuel in the canister reservoir.

49. The assembly of claim 48 further including spring means disposed in the filter chamber for biasing the valve to a closed position against said valve seat and operably connected with said secondary filter diaphragm such that movement of said secondary filter diaphragm downwardly when closed by the aforesaid capillary action of wetting by liquid fuel and presence of air and/or water at the exterior side of said secondary filter diaphragm in response to pump suction exerted on the interior of the main filter chamber overcomes the bias of said spring means and opens said valve to thereby emit fuel from the bottom of the canister reservoir to the pump inlet via the filter chamber.

50. The assembly of claim 49 wherein said flow controlling means further includes an annular perforate rigid spring retainer disc fixedly disposed in the filter chamber and centered below the interior surface of said secondary filter, wherein said valve comprises a central area of the secondary filter material movably responsive to flexing movement of said secondary diaphragm filter, and wherein said spring means comprises a coil spring disposed between said central area of said secondary filter diaphragm and a central hub of said disc for yieldably biasing said valve toward said seat.

51. The assembly of claim 43 wherein said module assembly has an overall outside lateral dimension adapted for insertion through a mounting opening in the top wall of the tank, said canister comprising an open top shell container having indented sidewall portions nestably receiving said pump exteriorly thereof, and a base subassembly on which the bottom of said canister container with its bottom outlet is mounted and the bottom of the pump with its fuel inlet is likewise mounted, said base subassembly containing said primary filter, said secondary filter, said flow controlling means and the filter chamber.

52. The assembly of claim 43 wherein said pump comprises a turbine type rotary vane pump.

53. The assembly of claim 49 wherein said primary filter further comprises a circular sheet of filter material having an outer peripheral edge portion and a primary filter retainer ring having the outer edge portion of said primary filter sheet affixed thereto, said module assembly including a base subassembly having a flange with an opening therethrough in which said pump inlet is mounted, said base flange laterally encompassing said canister bottom wall and said pump and having an upwardly protruding perforate canister mounting boss below said valve seat, said base flange also having a flow passageway therethrough communicating with said valve and said valve seat, said canister bottom wall neck protruding downwardly from the lower end of the canister reservoir and being received in said base flange mounting boss for connecting said base flange to said canister, said base flange having an annular peripheral wall for receiving and mounting said primary filter retainer ring thereto to thereby suspend said primary filter sheet therebelow and thereby define the main filter chamber therebetween.

54. The assembly of claim 43 wherein the exterior surface of said secondary filter is constructed and arranged relative to the outlet end of said pump purge passageway to receive pump fuel expelled from the outlet end of the pump vapor purge passageway and thereby channel communicate such pump expelled purge fuel into the filter chamber via said secondary filter.

55. A system for delivering fuel to an engine comprising an electric fuel pump having an inlet and an outlet mounted in a fuel tank, a primary fuel filter of a material having a plurality of openings through which fuel can flow from the tank to a filter chamber having an outlet connected with said pump inlet for supplying fuel from the filter chamber to said pump inlet, said primary filter being arranged adjacent the bottom of the fuel tank, a fuel reservoir canister in the tank having an opening for canister overflow to tank interior, a flow controlling outlet for communicating the lower end of the canister with the interior of the filter chamber for the flow of fuel from the reservoir through the interior of the filter chamber to said pump inlet of a bypass passageway connected with said pump outlet and the interior of the reservoir canister for bypassing fuel in excess of engine demand from said pump outlet into the reservoir canister, means for causing a flow of reserve fuel from the reservoir canister through the flow controlling outlet and the interior of the filter chamber into said pump inlet, and means for controlling such flow of reserve fuel at a variable flow rate varying directly with the head differential between the level of bypass reserve fuel in the canister above that of fuel in the tank such that bypass reserve fuel is returned to the pump inlet whenever tank fuel level drops below reserve fuel level in the canister during operation of the fuel pump to thereby maximize reserve fuel head height in the canister and return of bypass fuel to the pump inlet while minimizing reserve fuel overflow to the tank.

56. The system of claim 55 wherein said means for controlling reserve fuel flow comprises a restricted orifice in the flow controlling outlet calibrated to cause the variable flow rate.

57. The system of claim 55 wherein said means for controlling reserve fuel flow comprises a secondary filter diaphragm communicating with the tank and filter chamber and filtering fuel flowing from the reservoir canister into the filter chamber, and a valve operably associated with the secondary filter diaphragm and yieldably biased upwardly toward said canister bottom outlet, to move between positions tending to open and close bypass reserve fuel flow from the canister into the filter chamber in response to varying pressure differential acting on said secondary diaphragm filter as such occurs between the tank and filter chamber.

58. The system of claim 57 wherein the valve includes a restricted orifice arranged to be open in both open and closed positions of the valve and calibrated for assisting the valve in controlling reserve fuel flow.

59. The system of claim 55 comprising a pressure regulator operably connected to the bypass passageway for regulating and controlling the pressure of fuel supplied from the outlet of the pump to the exterior of the fuel tank for delivery to an engine when the pump is operating by varying and controlling the quantity of fuel flowing through the bypass passageway into the fuel reservoir canister.

60. The system of claim 55 wherein said means for controlling flow of reserve fuel comprises a valve for controlling a bottom outlet of the reservoir canister and operable to admit fuel to the inlet of the pump via the filter chamber, and means for causing the valve to open in response to absence of liquid fuel at the exterior surface of the primary filter.

61. The system of claim 60 wherein said means for causing the valve to open comprises a secondary filter directly communicating with the filter chamber and main body of fuel in the tank and constructed and arranged to operate as a diaphragm and to function to open the valve when closed by capillary action of a liquid fuel present in the tank resisting passing of air or water from the exterior of both primary and secondary filters into the filter chamber.

62. The system of claim 61 further including a spring disposed in the filter chamber for biasing the valve to a position closing reserve fuel flow from the canister and operably connected with the secondary filter diaphragm to resiliently yield to secondary filter diaphragm movement when closed by the aforesaid capillary action of wetting by liquid fuel and presence of air and/or water at the exterior tank side of the secondary filter diaphragm in response to pump suction exerted on the interior of the filter chamber overcoming the bias of the spring and opening the valve to thereby emit fuel from the canister reservoir to the pump inlet via the filter chamber.

63. An in-tank fuel pump and reservoir canister module assembly for delivering fuel to an engine comprising an electric fuel pump having an inlet and an outlet constructed to be mounted in a fuel tank, a flexible fuel filter of a material having a plurality of openings through which fuel can flow from the tank to a filter chamber defined by the interior of said filter, said filter comprising generally vertically opposed upper and lower wall sheets, said filter having an outlet connected with said pump inlet for supplying fuel from the filter chamber to said pump inlet, said filter being constructed and arranged to be received adjacent the bottom of the fuel tank, a fuel reservoir canister for disposition in the tank having an opening adapted for canister overflow to tank interior and a flow controlling outlet superposed to said filter for communicating the lower end of the canister with the exterior of said filter for the flow of fuel from the reservoir through the filter material into the interior of the filter chamber and thence to said pump inlet, a bypass passageway connected with said pump outlet and the interior of the reservoir canister adapted for bypassing fuel in excess of engine demand from said pump outlet into the reservoir canister, said filter upper wall sheet having a flexible filter diaphragm portion constructed and arranged to communicate with the tank and filter chamber and filtering fuel flowing from said reservoir canister outlet into the filter chamber, a valve operably coupled with said filter diaphragm portion for movement therewith, a spring disposed within said filter chamber for yieldably biasing said valve upwardly toward said canister outlet whereby said filter diaphragm portion is operable to move between positions tending to open and close said canister outlet for controlling flow of bypass reserve fuel flow from the canister onto said filter upper sheet and thence therethrough into the filter chamber in response to varying pressure differential acting on said filter diaphragm portion as such occurs between the tank and filter chamber in response to capillary action of liquid fuel wetting the filter material and thereby resisting passing of air or water from the exterior of said filter into said filter chamber.

64. The assembly of claim 63 wherein said valve includes a restricted orifice arranged to be open in both open and closed positions of the valve and calibrated for assisting the valve in controlling reserve fuel flow.

65. The assembly of claim 63 wherein said filter comprises an envelope of plastic filter material formed by joinder of said generally vertically opposed upper and lower wall sheets, said filter outlet opening through said upper wall sheet, said lower wall sheet adapted to communicate primarily with the interior of the tank through said lower wall sheet, and a spacer means received in said envelope between said wall sheets and spacing said lower wall sheet at least from said filter outlet.

66. The assembly of claim 65 wherein said pump inlet is sealably attached to said upper wall sheet of said filter at said filter chamber outlet by a filter chamber outlet-pump attachment member secured to said upper wall sheet.

67. The assembly of claim 66 wherein said filter envelope, exteriorly disposed valve, said pump inlet attachment member, and said interiorly disposed spring and said spacer means are constructed as a separate unitary subassembly adapted for removable attachment thereof by said filter chamber outlet member to said pump inlet and oriented with said valve registered with said canister reservoir outlet, said reservoir canister having a removable perforate retainer member underlying and retaining said filter envelope adjacent said pump and canister reservoir and compressing said spring for developing spring bias for moving said valve to closed position with said canister reservoir outlet.

68. An in-tank fuel pump and reservoir canister module assembly comprising, an electric fuel pump having an inlet and an outlet and constructed to be mounted in a fuel tank, a fuel filter of a material having a plurality of openings through which fuel can flow from the tank to an interior filter chamber defined by said filter and having an outlet connected with the pump inlet for supplying fuel from the filter chamber to the pump inlet, said filter being constructed and arranged to be received immediately adjacent the bottom of the fuel tank, a fuel reservoir canister extending with its major dimension generally vertically in the tank and having adjacent its upper end an opening constructed to communicate canister overflow with the interior of the fuel tank, a closed lower end, and immediately adjacent the lower end a flow controlling outlet means for communicating the lower and of the reservoir canister with said filter for the flow of fuel from the reservoir through the interior of the filter chamber to the inlet of the pump, said fuel pump being mounted on said module assembly with its axis extending generally vertically and its inlet generally at the elevation of the lower end of said canister, said pump comprising a rotary pump having an internal vapor purge system including discharge passageway means having an inlet end communicating with a pumping chamber of said rotary pump and an outlet end generally at the elevation of said pump inlet and adapted to communicate directly with the interior of the fuel tank to thereby isolate discharge of said purge system from the interior of said canister reservoir.

69. An in-tank fuel pump and reservoir canister module assembly comprising, an electric fuel pump having an inlet and an outlet and constructed to be mounted in a fuel tank, a primary fuel filter of a material having a plurality of openings through which fuel can flow to the interior of the filter from the tank with an average opening size not greater than about 100 microns and having an outlet connected with the pump inlet for supplying fuel from the interior of the filter to the pump inlet, said filter being constructed and arranged to be received immediately adjacent the bottom of the fuel tank, a fuel reservoir canister extending with its major dimension generally vertically in the tank and having adjacent its upper end an opening constructed to communicate with the interior of the fuel tank, a closed lower end, and immediately adjacent the lower end a flow controlling means for communicating the lower and of the reservoir canister with the interior of the filter for the flow of fuel from the reservoir through the interior of the filter to the inlet of the pump, said fuel pump being mounted in said module assembly outside of said reservoir canister adjacent thereto with its axis extending generally vertically and its inlet generally at the elevation of the lower end of said canister, and a by-pass passage connected with the outlet of the pump and the interior of the reservoir canister for passing some of the fuel from the outlet of the pump into the reservoir canister, whereby when the supply of fuel from the tank to the filter is momentarily interrupted fuel from the reservoir canister will flow through said flow controlling means and the interior of the filter and its outlet into the inlet of the fuel pump, said pump comprising a turbine vane type pump with a rotary vane /repeller operable in a rotary pumping chamber of said pump and having means forming a circumferentially localized vapor purge port passageway open at an inlet end to said pumping chamber and at an outlet end to the outside of said pump to allow vapor in said pumping chamber to be expelled via said purge passageway directly to the interior of the fuel tank.

70. The pump assembly of claim 68 wherein said flow controlling means comprises a restricted orifice.

71. The pump assembly of claim 70 which also comprises a secondary filter overlying said orifice for filtering fuel flowing from said reservoir canister through said orifice.

72. The pump assembly of claim 70 wherein said secondary filter has a plurality of openings through which fuel flows with an average opening size not greater than about 60 microns.

73. The pump assembly of claim 72 wherein the openings of said primary filter have an average size not greater than about 70 microns and the openings of said secondary filter have an average size not greater than about 48 microns.

74. The pump assembly of claim 70 wherein said orifice has a diameter not greater than about 0.20 of an inch.

75. The pump assembly of claim 70 wherein said orifice has a diameter in the range of about 0.10 to 0.20 inches.

76. The pump assembly of claim 70 wherein said primary filter comprises an envelope of a sheet of plastic filter material having a pair of generally vertically opposed walls, said filter outlet opening through one of said walls, said orifice communicating with the interior of said envelope through said one wall, and a baffle received in said envelope between said walls and spacing the other of said walls from said orifice and said filter outlet.

77. The pump assembly of claim 76 wherein said reservoir is attached to one of said walls of said filter.

78. The pump assembly of claim 76 which also comprises a plate which closes the lower end of said reservoir, said orifice is in and opens through said plate, and a secondary filter received in said reservoir canister and over said orifice.

79. The pump assembly of claim 69 which also comprises a pressure regulator received in said by-pass passage for regulating and controlling the pressure of fuel supplied from the outlet of said pump to the exterior of the fuel tank for delivery to an engine when the pump is operating by varying and controlling the quantity of fuel flowing through the by-pass passage into the fuel reservoir canister.

80. The pump assembly of claim 69 wherein said module is constructed to fit at its lower end into the laterally narrow confines of a swirl pot basin at the bottom of the fuel tank, and wherein said reservoir canister comprises a relatively narrow diameter elongate tube with its major dimension constituting its axis extending generally vertically in the fuel tank and said pressure regulator projects at least partially through a sidewall of said tube and into the interior of said tube, said primary filter comprising an elongate envelope having its overall length and width dimensions oriented generally in a first plane perpendicular to a second plane defined by the axes of said tube and pump whereby the outside thickness dimension of said entire pump module assembly perpendicular to said second plane is relatively narrow compared to the overall height and width dimensions of said module.

81. The pump assembly of claim 80 wherein said reservoir canister tube has its lower end attached to the primary filter and its upper end opening into the tank, a plate closing the lower end of said tube and retaining the primary filter envelope thereto, said flow controlling means comprising a restricted orifice received in and opening through said plate to the interior of the primary filter envelope, and said filter includes spacer baffle means disposed within said envelope for preventing collapse of said envelope.

82. An in-tank fuel pump and reservoir canister module assembly comprising, an electric fuel pump having an inlet and an outlet and constructed to be mounted in a fuel tank, a primary fuel filter defining with said assembly a filter chamber and constructed of a material having a plurality of openings through which fuel can flow from an exterior surface of said filter exposed to the main body of fuel in the tank to the interior surface side of the filter, the filter chamber having an outlet connected with the inlet of the pump for supplying fuel from the interior side of the filter to the pump inlet, said filter being constructed and arranged to be received immediately adjacent the bottom of the fuel tank, a fuel reservoir canister having its major dimension extending generally vertically in the tank and having adjacent its upper end an opening constructed to communicate with the fuel tank, a closed lower end wall, and adjacent said lower end wall a flow controlling means for communicating the lower end of said canister reservoir with the interior of the filter chamber for the flow of fuel from the lower end of the canister reservoir through the interior of the filter chamber to the inlet of the pump, said fuel pump comprising a rotary pump mounted in said assembly outside of said reservoir and exposed directly in the fuel tank, said pump having an internal vapor purge system including a passageway having an inlet end communicating with a pumping chamber of said rotary pump and an outlet end adapted to communicate directly with the interior of the fuel tank, a by-pass passage communicating with the outlet of the pump and the interior of the reservoir canister for passing some of the fuel delivered via the outlet of the pump into the canister reservoir, whereby when the supply of fuel from the tank to the primary filter is interrupted fuel from the canister reservoir will flow through said flow controlling means, the interior of filter chamber and via its outlet into the inlet of the fuel pump.

83. The pump assembly of claim 82 wherein said flow controlling means comprises a valve adjacent the bottom of the reservoir canister operable to admit fuel to the inlet of said pump via the filter chamber, and means to open said valve in response to absence of liquid fuel at the exterior surface of said filter.

84. The pump assembly of claim 83 in which said means to open said valve comprises said primary fuel filter wherein said openings therein are constructed to be closed by capillary action of a liquid fuel present in the tank to resist passing of air or water from the exterior surface of filter into the filter chamber.

85. The pump assembly of claim 84 wherein said canister has a septum wall above the bottom of said canister having an opening in which said valve is positioned and a valve seat cooperating with said valve to open and close communication between the bottom of the reservoir of said canister and the filter chamber.

86. The pump assembly of claim 85 in which said filter comprises a diaphragm in the form of a fuel filter sheet fuel permeably closing the bottom of said canister below said pump inlet and said canister lower end wall.

87. The pump assembly of claim 86 wherein said valve has a valve opening and closing member movable in the space below said septum wall and said valve is biased against said seat by the gravity head of reserve fuel in the reservoir.

88. The fuel pump as set forth in claim 87 further including spring means disposed in said filter chamber for biasing the valve to a closed position against said seat and operably connected with said diagraphm filter whereby movement of said diaphragm filter upwardly when closed by the aforesaid capillary action of wetting by liquid fuel and pressure of air and/or water present at the exterior side of the filter in response to pump suction exerted on the interior of the filter chamber will overcome the bias of said spring means and open said valve to thereby emit fuel from the bottom of the canister reservoir to the pump inlet via the filter chamber.

89. The pump assembly set forth in claim 88 wherein said flow controlling means further includes an annular perforate rigid disc disposed in the filter chamber and lying on the interior surface of the filter material and centered on the filter relative to the pump assembly, wherein said valve comprises a poppet valve having a stem operably connected to the central hub of said disc for transmitting movement of the diaphragm filter via said disc to said valve, and said spring means comprises a coil spring disposed between said septum wall and said disc hub and encircling said valve stem.

90. The module assembly of claim 82 wherein said module assembly has an overall outside lateral dimension adapted for insertion through a mounting opening in the top wall of the tank, said module comprising a tank flange cover assembly adapted for fixed mounting to the top wall of the tank and having guide sleeve means dependent therefrom, a canister shell reserve fuel container having an open upper end and telescopically slidably received at its upper end with the guide sleeve means of said cover assembly, said canister shell container having indented sidewall portions nestably receiving said pump exteriorly thereof, and a base subassembly on which the bottom of said canister container is mounted and the bottom of the pump with its fuel inlet is likewise mounted, said base subassembly containing said primary filter and said flow controlling means and the filter chamber.

91. The pump assembly of claim 90 wherein said pump outlet comprises a tubular member extending vertically thereabove and having an open upper end, said cover assembly having a dependent boss defining a chamber for receiving the upper end of said pump outlet tubular member, and a seal member affixed to the lower end of said cover boss slidably sealingly receiving through said pump outlet tubular member, and a fuel delivery outlet passage communicating with the upper end of said chamber of said cover boss adapted for delivering fuel from the pump to a fuel delivery line for supplying fuel to the engine.

92. The pump assembly of claim 82 wherein said pump comprises a turbine type rotary vane pump.

93. The pump assembly of claim 83 wherein said pump comprises a turbine type rotary vane pump.

94. The pump assembly of claim 84 wherein said pump comprises a turbine type rotary vane pump.

95. The pump assembly of claim 85 wherein said pump comprises a turbine type rotary vane pump.

96. The pump assembly of claim 86 wherein said pump comprises a turbine type rotary vane pump.

97. The pump assembly of claim 87 wherein said pump comprises a turbine type rotary vane pump.

98. The pump assembly of claim 88 wherein said pump comprises a turbine type rotary vane pump.

99. The pump assembly of claim 89 wherein said pump comprises a turbine type rotary vane pump.

100. The pump assembly of claim 90 wherein said pump comprises a turbine type rotary vane pump.

101. The pump assembly of claim 91 wherein said pump comprises a turbine type rotary vane pump.

102. The module assembly of claim 89 wherein said primary filter further comprises a circular sheet of filter material having an outer peripheral portion extending radially beyond and encircling said disc, a filter mounting ring having the outer edge of said sheet mold embedded therein, and encircling said disc in radially outwardly spaced relation, a base plate defining said canister septum wall and said valve seat and having an opening therethrough in which said pump inlet is mounted, said base plate laterally encompassing the lower end wall of said canister and said pump and having an upwardly protruding boss defining said valve seat and a flow passageway therethrough controlled by said valve and said valve seat, said canister lower end wall having a upwardly protruding boss opening to the lower end of the canister reservoir and receiving said base plate boss for mounting said base plate to said canister lower end wall, said base plate having an annular channel for receiving and mounting said filter mounting ring thereto to suspend said filter sheet and disc therebelow and thereby define said filter-chamber therebetween.

103. The module assembly of claim 102 further including an annular perforate rigid guard having a pheriphal flange encompassing and mounted to the periphery of said base plate and a flat annular centrally open foot portion disposed below said filter sheet and slightly radially overlapping the periphery of said disc and adapted to support said module on the tank bottom wall with said disc spaced below the lower end of said valve stem in normal operation with said filter sheet submerged in tank fuel.

104. The module assembly of claim 103 wherein said canister has a floating back check valve ball and ball valve seat disposed slightly above and mounted upstream of said valve operable for blocking communication between said valve and the canister reservoir when the level of reserve fuel in the reservoir falls to generally the elevation of said ball valve seat.

105. An in-tank fuel pump assembly comprising, an electric fuel pump having an inlet and an outlet and constructed to be mounted in a fuel tank, a primary fuel filter of a material having a plurality of openings through which fuel can flow to the interior of the filter with an average opening size not greater than about 100 microns and an outlet connected with the pump inlet for supplying fuel from the interior of the filter to the pump inlet, said filter being constructed and arranged to be received immediately adjacent the bottom of the fuel tank, a fuel reservoir extending generally vertically in the tank and having immediately adjacent its upper end an opening constructed to communicate with the interior of the fuel tank, a closed lower end, and immediately adjacent the lower end a restricted orifice communicating the reservoir with the interior of the filter for the flow of fuel from the reservoir through the orifice and the interior of the filter to the inlet of the pump, said fuel pump being outside of said reservoir, and a by-pass passage connected with the outlet of the pump and the interior of the reservoir adjacent the upper end of the reservoir for passing some of the fuel from the outlet of the pump into the reservoir, whereby when the supply of fuel from the tank to the filter is momentarily interrupted fuel from the reservoir will flow through the orifice and the interior of the filter and its outlet into the inlet of the fuel pump.

106. The pump assembly of claim 105 which also comprises a second filter overlying said orifice for filtering fuel flowing from said reservoir through said orifice.

107. The pump assembly of claim 106 wherein said second filter has a plurality of openings through which fuel flows with an average opening size not greater than about 60 microns.

108. The pump assembly of claim 107 wherein the openings of said primary filter have an average size not greater than about 70 microns and the openings of said second filter have an average size not greater than about 40 microns.

109. The pump assembly of claim 105 wherein said orifice has diameter not greater than about 0.20 of an inch.

110. The pump assembly of claim 105 wherein said orifice has a diameter in the range of about 0.10 to 0.20 of an inch.

111. The pump assembly of claim 105 wherein said primary filter comprises an envelope of a sheet of a plastic filter material having a pair of generally opposed walls, said filter outlet opening through one of said walls, said orifice communicating with the interior of said envelope through said one wall, and a baffle received in said envelope between said walls and spacing the other of said walls from said orifice and said filter outlet.

112. The pump assembly of claim 111 wherein said reservoir is attached to one of said walls of said filter.

113. The pump assembly of claim 111 which also comprises a plate which closes the lower end of said reservoir, said orifice is in and opens through said plate, and a second filter received in said reservoir and over said orifice.

114. The pump assembly of claim 105 which also comprises a pressure regulator received in said by-pass passage for regulating and controlling the pressure of fuel supplied from the outlet of said pump to the exterior of the fuel tank when the pump is operating by varying and controlling the quantity of fuel flowing through the by-pass passage into the fuel reservoir.

115. The pump assembly of claim 114 wherein said reservoir comprises an elongate tube with its axis extending generally vertically in the fuel tank and said pressure regulator projects at least partially through a side wall of said tube and into the interior of said tube.

116. The pump assembly of claim 105 wherein said reservoir comprises an axially elongate tube with its axis extending generally vertically in the fuel tank.

117. The pump assembly of claim 105 wherein said reservoir comprises an axially elongate tube with its axis extending generally vertically in the fuel tank and having its lower end attached to the primary filter and its upper end opening into the tank, a plate closing the lower end of said tube and said orifice being received in and opening through said plate to the interior of the primary filter.

118. An in-tank fuel pump assembly comprising, an electric fuel pump having an inlet and an outlet and constructed to be mounted in a fuel tank, a primary fuel filter of a material having a plurality of openings through which fuel can flow to the interior of the filter with an average opening size not greater than about 100 microns and an outlet connected with the inlet of the pump for supplying fuel from the interior of the filter to the pump inlet, said filter being constructed and arranged to be received immediately adjacent the bottom of the fuel tank, a fuel reservoir extending generally vertically in the tank and having immediately adjacent its upper end an opening constructed to communicate with the fuel tank, a closed lower end, and immediately adjacent the lower end a restricted orifice communicating the reservoir with the interior of the filter for the flow of fuel from the reservoir through the interior of the filter to the inlet of the pump, said fuel pump being outside of said reservoir, a by-pass passage connected with the outlet of the pump and the interior of the reservoir adjacent the upper end of the reservoir for passing some of the fuel from the outlet of the pump into the reservoir, and a pressure regulator communicating with said by-pass passageway for regulating and controlling the pressure of fuel supplied from the outlet of the pump to the exterior of the tank for an engine when the pump is operating by varying and controlling the quantity of fuel flowing from the outlet of the pump through the by-pass passageway to the interior of the reservoir, whereby when the supply of fuel from the tank to the primary filter is interrupted fuel from the reservoir will flow through the orifice, interior of the filter and its outlet into the inlet of the fuel pump.

119. A fuel delivery system for an engine comprising an in-tank fuel pump and reservoir canister module assembly operable for delivering fuel to the engine comprising, an electric fuel pump having an inlet and an outlet and constructed to be mounted in a fuel tank, a primary fuel filter defining with said assembly a filter chamber and constructed of a material having a plurality of openings through which fuel can flow from an exterior surface of said filter exposed to the main body of fuel in the tank to the interior surface side of the filter exposed to the filter chamber, the filter chamber having an outlet connected with the inlet of the pump for supplying fuel from the interior side of the filter to the pump inlet, said filter being constructed and arranged to be received immediately adjacent the bottom of the fuel tank, a fuel reservoir canister having its major dimension extending generally vertically in the tank and having adjacent its upper end an opening constructed to overflow and communicate with the fuel tank, a closed lower end and adjacent said lower end a flow controlling canister outlet means for communicating the lower end of said canister reservoir with the interior of the filter chamber for the flow of reserve fuel from the lower end of the canister reservoir through the interior of the filter chamber to the inlet of the pump, said fuel pump comprising a rotary pump mounted in said assembly outside of said reservoir canister and exposed directly in the fuel tank, said pump having an internal vapor purge system including a purge passageway having an inlet end communicating with a pumping chamber of said rotary pump and an outlet end adapted to communicate directly with the interior of the fuel tank, said system also including a bypass passageway communicating with the outlet of the pump and the interior of the reservoir canister for bypassing into the canister reservoir that quantity of the fuel delivered via the outlet of the pump and not taken by engine demand, whereby when the supply of fuel from the tank to the primary filter is interrupted, bypassed reserve fuel in the canister reservoir will flow through said flow controlling means, the interior of filter chamber and via its outlet into the inlet of the fuel pump, and further including a secondary filter disposed at higher elevation than said primary filter and also being constructed of a material having a plurality of openings through which fuel can flow from an exterior surface thereof exposed to the tank to an interior surface thereof communicating with the filter chamber.

120. The system of claim 119 wherein said pump comprises a turbine type rotary vane pump.

* * * * *

UNITED STATES PATENT AND TRADEMARK OFFICE
CERTIFICATE OF CORRECTION

PATENT NO. : 5,647,329
DATED : July 15, 1997
INVENTOR(S) : George H. Bucci et al It is certified that error appears in the above-indentified patent and that said Letters Patent is hereby corrected as shown below:

Col 32, Line 17, change "and" to "end".

Col 36, Line 7, after "side" insert "of".

Col 36, Line 8, after "from" insert "said".

Col 36, Line 59, after "plurality" insert "of".

Col 40, Line 49, change "and" to "end".

Col 41, Line 10, change "and" to "end".

Col 41, Line 25, change "vane/repeller" to "vane impeller".

Col 44, Line 37, change "a" to "an".

Col 44, Line 45, change "pheriphal" to "peripheral".

Col 45, Line 37, change "wails" to "walls".

Signed and Sealed this

Twenty-eighth Day of October, 1997

Attest:

BRUCE LEHMAN

Attesting Officer     Commissioner of Patents and Trademarks